(12) United States Patent
Caren et al.

(10) Patent No.: US 6,321,531 B1
(45) Date of Patent: *Nov. 27, 2001

(54) METHOD AND APPARATUS FOR USING FREE RADICALS TO REDUCE POLLUTANTS IN THE EXHAUST GASES FROM THE COMBUSTION OF A FUEL

(75) Inventors: Robert P. Caren, San Jose, CA (US); Jack A. Ekchian, Belmont, MA (US); Tony Dekelaita, Flint, MI (US); Ray Hallenbeck, Metamora, MI (US); Victor J. Nowak, Beverly Hills, MI (US); John Pietrasik, Clarkston, MI (US); Gregory J. Roth, Los Gatos, CA (US); Jeff Taus, Holly; Mike Tyle, Ortonville, both of MI (US); Josef Yampolsky, Torrance, CA (US)

(73) Assignee: Litex, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/513,474

(22) Filed: Feb. 25, 2000

Related U.S. Application Data

(63) Continuation-in-part of application No. 08/947,287, filed on Oct. 7, 1997, now Pat. No. 6,029,442, which is a continuation-in-part of application No. 08/768,833, filed on Dec. 18, 1996, now Pat. No. 5,863,413.
(60) Provisional application No. 60/121,803, filed on Feb. 26, 1999, and provisional application No. 60/142,318, filed on Jul. 2, 1999.

(51) Int. Cl.[7] ....................................................... F01N 3/00
(52) U.S. Cl. ................... 60/275; 60/274; 60/287; 60/288; 60/299; 204/168; 204/173; 204/179; 422/186.04
(58) Field of Search ........................ 60/275, 274, 287, 60/288, 299, 301, 303, 304, 308; 204/173, 179, 168; 422/168, 169, 186.04

(56) References Cited

U.S. PATENT DOCUMENTS

| 1,333,836 | 3/1920 | Csanyi . |
| 1,725,661 | 8/1929 | McPartland . |

(List continued on next page.)

FOREIGN PATENT DOCUMENTS

| 4400653 | 7/1995 | (DE) . |
| 0 366 876 A1 | 5/1990 | (EP) . |
| 0 824 952 A2 | 2/1998 | (EP) . |
| 1364714 | 5/1964 | (FR) . |

(List continued on next page.)

OTHER PUBLICATIONS

Rogers et al., "The Removal of Nitric Oxide using a Non–Thermal Plasma Discharge Device", http://www.gnt.nct/rogersjw/nox/noxohtm1.

(List continued on next page.)

Primary Examiner—Thomas Denion
Assistant Examiner—Binh Tran
(74) Attorney, Agent, or Firm—Pennie & Edmonds LLP

(57) ABSTRACT

The invention is directed to an apparatus and a method for the reduction of pollutants in a gas stream containing gas formed from the oxidation of fuel, such as, in the exhaust stream of a combustion engine. Radicals are produced using a corona discharge in the combustion gas stream of the engine, either in the precombustion gas stream or from water in the exhaust gas. When the radicals are produced from the exhaust gas stream, the radicals may be produced using a corona discharge placed directly in the exhaust stream leading to or within the catalytic converter, or a portion of the exhaust stream may be diverted to a remote corona discharge radical generator. The corona discharge in the generator produces radicals in the diverted exhaust gas, and the exhaust gas containing radicals is then conveyed to the exhaust gas stream at a point upstream of the outlet of the catalytic converter.

66 Claims, 40 Drawing Sheets

U.S. PATENT DOCUMENTS

| | | | |
|---|---|---|---|
| 1,982,484 | 11/1934 | Runge | 123/119 |
| 3,188,167 | 6/1965 | Specht | 23/2 |
| 3,896,616 | 7/1975 | Keith et al. | 60/274 |
| 3,979,193 | 9/1976 | Sikich | 55/123 |
| 3,983,021 | 9/1976 | Henjs | 204/164 |
| 4,041,922 | 8/1977 | Abe et al. | 123/191 |
| 4,118,193 | 10/1978 | Neti et al. | 422/94 |
| 4,185,316 | 1/1980 | Fleck . | |
| 4,195,606 | 4/1980 | Wallis, Jr. et al. | 123/119 E |
| 4,309,199 | 1/1982 | Suzuki | 55/127 |
| 4,434,771 | 3/1984 | Slomnicki | 123/539 |
| 4,519,357 | 5/1985 | McAllister | 123/539 |
| 4,780,277 | 10/1988 | Tanaka . | |
| 4,902,487 | 2/1990 | Cooper . | |
| 4,945,721 | 8/1990 | Cornwell et al. | 60/274 |
| 4,954,320 | 9/1990 | Brimingham . | |
| 4,968,396 | 11/1990 | Harvey | 204/131 |
| 4,979,364 | 12/1990 | Fleck | 60/274 |
| 5,053,914 * | 10/1991 | Wessel et al. | 361/235 |
| 5,097,665 | 3/1992 | Kammel | 60/275 |
| 5,154,807 | 10/1992 | Harvey | 204/131 |
| 5,284,556 | 2/1994 | Rich | 204/164 |
| 5,402,639 | 4/1995 | Fleck | 60/275 |
| 5,410,871 | 5/1995 | Masters et al. | 60/274 |
| 5,419,123 | 5/1995 | Masters | 60/274 |
| 5,433,832 | 7/1995 | Rich et al. | 204/164 |
| 5,440,876 | 8/1995 | Bayliss et al. | 60/274 |
| 5,474,747 | 12/1995 | Hayashi et al. | 422/177 |
| 5,487,874 | 1/1996 | Gibboney, Jr. | 422/186.03 |
| 5,549,795 | 8/1996 | Gregoire et al. | 104/64 |
| 5,609,736 | 3/1997 | Yamamoto . | |
| 5,623,819 | 4/1997 | Bowker et al. | 60/39.06 |
| 5,645,745 * | 7/1997 | Hartwick et al. | 219/497 |
| 5,649,507 | 7/1997 | Gregoire et al. | 123/143 |
| 5,655,210 | 8/1997 | Gregoire et al. | 422/186 |
| 5,695,619 | 12/1997 | Williamson et al. | 204/65 |
| 5,711,147 | 1/1998 | Vogtlin et al. | 60/274 |
| 5,746,984 | 5/1998 | Hoard | 422/169 |
| 5,753,087 | 5/1998 | Wang et al. | 204/164 |
| 5,771,683 | 6/1998 | Webb | 60/274 |
| 5,806,305 | 9/1998 | Miller et al. | 60/274 |
| 5,807,466 | 9/1998 | Wang et al. | 204/177 |
| 5,822,981 | 10/1998 | Williamson et al. | 60/275 |
| 5,827,407 | 10/1998 | Wang et al. | 204/164 |
| 5,836,154 | 11/1998 | Williamson et al. | 60/275 |
| 5,843,288 | 12/1998 | Yamamoto . | |
| 5,843,383 | 12/1998 | Williamson et al. | 422/186.04 |
| 5,845,488 | 12/1998 | Hancock et al. | 60/275 |
| 5,847,494 | 12/1998 | Bayliss et al. | 313/231.31 |
| 5,855,855 | 1/1999 | Williamson et al. | 422/186.04 |
| 5,866,081 | 2/1999 | Williamson et al. | 422/186.04 |
| 5,891,409 | 4/1999 | Hsiao et al. | 423/239.1 |
| 5,893,267 | 4/1999 | Vogtlin et al. | 60/274 |
| 5,904,905 | 5/1999 | Dolezal et al. | 422/186.04 |
| 6,003,304 * | 12/1999 | Swanson et al. | 60/274 |
| 6,007,682 | 12/1999 | Hancock et al. | 204/164 |
| 6,029,442 * | 2/2000 | Caren et al. | 60/275 |
| 6,119,455 | 9/2000 | Hammer . | |

FOREIGN PATENT DOCUMENTS

| | | | |
|---|---|---|---|
| 1364716 | 5/1964 | (FR) . | |
| 2481945 | 11/1981 | (FR) . | |
| 04-276167 | 10/1992 | (JP) . | |
| 5-332128 | 12/1993 | (JP) | 3/20 |
| 98/09699 | 3/1998 | (WO) . | |
| WO 98/08592 | 3/1998 | (WO) . | |

OTHER PUBLICATIONS

Southwest Research Institute (SwRI) News release, 1996, "SwRI nonthermal plasma reactor neutralizes harmful emissions", htpp://www.swri.org/9what/release/plasma.htm.

Kintaichi, et al., "Selective Reduction of Nitrogen Oxides with Hydrocarbons Over Solid Acid Catalysts in Oxygen Rich Atmoshperes", Catalysis Letters 6 (1990) 239–244.

*Plasma Exhaust Aftertreatment*, SAE SP–98/1395, Library of Congress Card No.: 98–86679, Copyright © 1998 Society of Automotive Engineers, Inc.

Suhr et al., "Reduction of Nitric Oxide in Flue Gases by Point to Plane Corona Discharge with Catalytical Coatings on the Plane Electrode," Combust. Sci. and Tech., vol. 72. pp. 101–115.

Penetrante et al., "Comparison of Electrical Discharge Techniques for Nonthermal Plasma Processing of NO in $N_2$, " IEEE Transactions on Plasma Science, vol. 23, No. 4, Aug. 1995, 679–687.

Whealton et al., "971718 Non–Thermal Plasma Exhaust Aftertreatment: A Fast Rise–Time Concept," Manuscript based on work performed at the Oak Ridge National Laboratory, managed by Lockheed Martin Energy Research Corporation for the U.S. Dept. of Energy under contract No. DE–AC05–96OR22464, 1–14.

Fanick et al., "Simultaneous Reduction of Diesel Particulate and $NO_x$ Using a Plasma," SAE Technical Paper Series 942070, 239–246.

Hepburn et al., "The Pulse Flame Combustor Revisited," 962118 Ford Motor Co., 1–36.

Sztenderowicz et al., of Chevron Research and Technology Co. et al., "Effects of Fuel Sulfur Level on Emissions from Transitional Low Emission Vehicles," 952561, 2067–2082.

Burch et al., "Mechanism of the Selective Reduction of Nitric Oxide by Propene on Platinum–Based Catalysts in the Presence of Excess Oxygen," Symposium on Nox Reduction before the Division of Petroleum Chemistry, Inc. $207^{th}$ National Meeting, American Chemical Society, San Diego, CA, Mar. 13–18, 1994, pp150–153.

Liu et al., "In Situ XANES Characterization of Cu in Cu–ZSM–5 during Selective Catalytic Reduction of NO by Hydrocarbon," Symposium on Nox Reduction Presented before the Division of Petroleum Chemistry, Inc. $207^{th}$ National Meeting, American Chemical Society, San Diego, CA, Mar. 13–18, 1994, pp107–111.

Yasuda et al., "IR Study of Catalytic Reduction of Nitrogen Monoxide by Propene in the Presence of Oxygen over Ce–Exchanged ZSM–5 Zeolite," Symposium on $NO_x$ Reduction Presented before the Division of Petroleum Chemistry, Inc. 207th National Meeting, American Chemical Society, San Diego, CA, Mar. 13–18, 1994, pp 99–102.

Yamamoto, T. et al., "Control of Volatile Organic Compounds by an ac Energized Ferroelectric Pellet Reactor and a Pulsed Corona Reactor," *IEEE Transactions on Industry Applications*, vol. 128. No. 3, pp528–534 (1992).

Chang, M.B. et al., "Gas–Phase Removal on NO from Gas Streams via Dielectric Barrier Discharges," *Environ. Sci. technol.*, vol. 26, pp777–781 (1992).

Chang, J–S. Et al., "Corona Discharge Processes," *IEEE Transaction on Plasma Science*, vol. 19, pp1152–1165 (1991).

Eliasson, B., "Nonequilibrium Volume Plasma Chemical Processing," *Environ. Sci. Tehcnol.*, vol. 19 pp1063–1077 (1991).

Hamada et al., "Selective reduction of nitrogen monoxide with propane over alumina and HZSM–5 zeolite," "Effect of oxygen and nitrogen dioxide intermediate," Applied Catalysis, 70(1991) L15–L20.

Hamada et al., "Transition metal–promoted silica and alumina catalysts for the selective reduction of nitrogen monoxide with propane," Applied Catalysis, 70 (1991) L1–L8.

Mizuno, A., et al., "A Method for the Removal of Sulfur Dioxide from Exhaust Gas Utilizing Pulsed Streamer Corona for Electron Energization," IEEE Transactions on Industry Applications, 1986, vol. 22, p516.

Penetrante, et al., "Non–Thermal Plasma Techniques for Pollution Control—Part A: Overview, Fundamentals and Supporting Technologies", (1993) p. 65 (Springer–Verlag, Berlin).

* cited by examiner

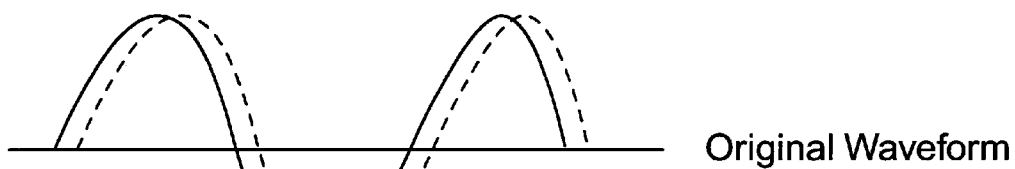
FIG. 43 — Original Waveform
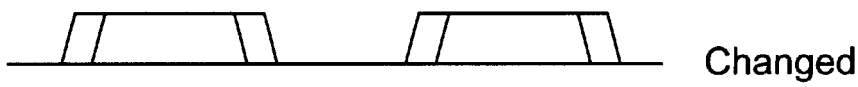
FIG. 44 — Changed
X or
FIG. 45
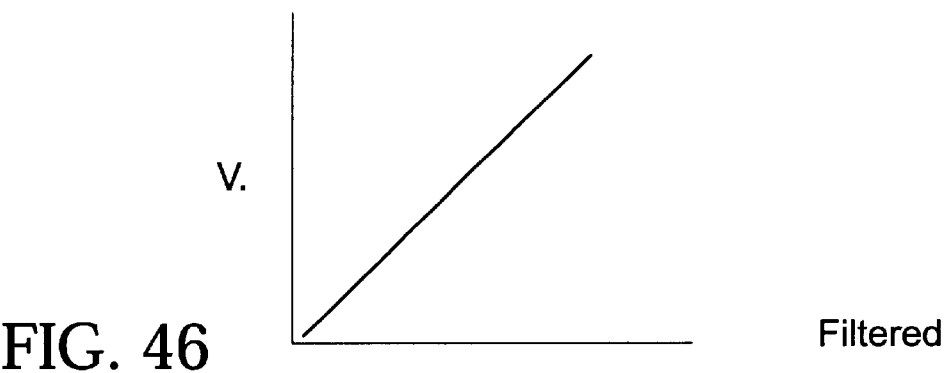
FIG. 46 — Filtered
V.
Phase & Lift

METHOD AND APPARATUS FOR USING FREE RADICALS TO REDUCE POLLUTANTS IN THE EXHAUST GASES FROM THE COMBUSTION OF A FUEL

CROSS-REFERENCE TO RELATED APPLICATIONS

The present application is a continuation-in-part of co-pending U.S. application Ser. No. 08/947,287, filed Oct. 7, 1997 now U.S. Pat. No. 6,029,442, which is a continuation-in-part of application Ser. No. 08/768,833, filed Dec. 18, 1996, now U.S. Pat. No. 5,863,413. This application also claims priority to U.S. Provisional Application Nos. 60/121,803, filed Feb. 26, 1999 and 60/142,318, filed Jul. 2, 1999. The teachings and disclosures of the provisional and non-provisional patent applications, referenced above, are incorporated herein in their entirety by reference.

FIELD OF THE INVENTION

The present invention is directed to a method and apparatus for reducing pollutants in gas streams, such as the gases produced by the combustion of fuel in an engine, in a fuel cell reformer, in effluent gas from manufacturing processes, etc. More particularly, the invention is directed to a method and apparatus for the reduction of pollutants by improving the efficiency of a catalyst by introducing highly reactive free radicals and related reactive gaseous species into a combustion gas stream upstream of the outlet of a catalyst. The radicals and related gaseous species are produced from gaseous species in the gas stream by means of a corona discharge generated by a corona discharge device. The invention is further directed to a method of improving the performance of a catalytic converter in treating gas streams to reduce pollutants as well as reducing and reversing the poisoning or contamination of catalytic converters by for example sulfur, phosphorous, and carbon compounds.

BACKGROUND OF THE INVENTION

As is well-known in the art, an internal combustion engine mixes air with fuel, and ignites and burns the mixture of air and fuel in a controlled manner to produce work. The resulting exhaust gases, which may be treated to remove pollutants, are then expelled into the atmosphere. Ignition of the air/fuel mixture in the cylinder is typically achieved by an ignition device, typically, a spark plug or the like, or by the adiabatic compression of the air/fuel mixture, which heats the mixture to a temperature above its ignition point.

In gasoline powered internal combustion engines commonly in use today, ambient air is conveyed via an air intake duct or port to a carburetor or a fuel injection system, which is used to mix the air with the fuel to create the air/fuel mixture. For engines with some types of fuel injection systems, as well as those equipped with carburetors, the air/fuel mixture is then conveyed via an intake manifold to the combustion chamber or cylinder of the engine. In gasoline engines equipped with port injection type fuel injection systems, the air is directed through the intake manifold to the intake port of the combustion chamber before the fuel is mixed with the air. In diesel-type engines and some gasoline engines using in-cylinder fuel-injection systems, the air and fuel are conveyed separately to the combustion chamber or cylinder of the engine where they are mixed.

After the combustion of the air/fuel mixture, the resulting exhaust gases are expelled from the combustion chamber to an exhaust manifold. In almost all modern gasoline powered engines, the exhaust gases are then conveyed by an exhaust pipe to a catalytic converter where pollutants are substantially removed from the exhaust gas. However, during the operation of an internal combustion engine, even one equipped with pollution control devices, such as a catalytic converter, some pollutants, as described below, remain in the exhaust stream, and are expelled into the atmosphere through a tailpipe.

In addition to complete combustion products, such as carbon dioxide ($CO_2$) and water ($H_2O$), internal combustion engines also produce exhaust gases containing a number of pollutants, e.g., carbon monoxide (CO), a direct poison to human life, and hydrocarbons (HC), that result from incomplete combustion. Also, due to the very high temperatures produced by the burning of the hydrocarbon fuels followed by rapid cooling, thermal fixation of nitrogen in the air results in the detrimental formation of nitrogen oxides ($NO_x$), an additional pollutant. The amount of CO, HC, $NO_x$ and other pollutants produced by an internal combustion engine varies with the design and operating conditions of the engine. Other pollutants that can be produced by a combustion engine include particulates, which may include solid carbon and, possibly, various heavy hydrocarbons.

Although the presence of pollutants in the exhaust gases of internal combustion engines has been recognized since 1901, the control of internal combustion engine emissions in the United States only became required by law with the passage of the 1970 Clean Air Act. Engine manufacturers have explored a wide variety of technologies to meet the requirements of this Act, including exhaust gas recirculation, electronically controlled fuel injection systems, which receive data from various sensors in the combustion stream, allowing the accurate control of the air/fuel ratio, and catalytic converters. Catalysis has proven to be the most effective passive system.

The purpose of a catalytic converter is to oxidize certain pollutants, such as CO and HC to $CO_2$ and $H_2O$, and, in a three way catalyst, to additionally reduce $NO/NO_2$ to $N_2$. In modern three way catalytic converters (TWC), all three pollutants are reduced simultaneously. $NO_x$ reduction is most effective in the absence of oxygen, while the abatement of CO and HC requires oxygen. Therefore, to prevent the production of these emissions from presently available vehicles requires the operation of the engine at or near the stoichiometric air-to-fuel ratio.

Today, nearly all automobile catalytic converters contain noble metal catalysts, held in honeycomb monolithic structures, which have excellent strength and crack-resistance under thermal shock. The honeycomb construction and the geometries chosen provide a relatively low pressure drop and a large total surface area that enhances the mass transfer controlled reactions that remove pollutants from the exhaust. The honeycomb is set in a steel container, and protected from vibration by a resilient matting.

An adherent washcoat, generally made of stabilized gamma alumina into which the catalytic components are incorporated, is deposited on the walls of the honeycomb. TWC technology for simultaneously converting all three pollutants typically utilizes the precious or noble metals platinum (Pt) and rhodium (Rh), where Rh is primarily responsible for the reduction of $NO_x$, while also contributing to CO oxidation, and Pt is primarily responsible for CO oxidation. Recently palladium, Pd, has been substituted for or used in combination with Pt and Rh.

While considerable gains have been made in recent years to reduce the pollutants emitted in the exhaust gases from automobile and truck engines, further reductions in the amount of pollutants in the exhaust gases of the internal combustion are required under present and planned government regulations.

Increasing the efficiency of the catalytic converter or catalysis is highly desirable. The conversion efficiency of a catalytic converter is measured by the ratio of the rate of mass removal of the particular constituent of interest to the mass flow rate of that constituent into the catalytic converter. The conversion efficiency of a catalytic converter is a function of many parameters including aging, temperature, stoichiometry, the presence of any catalyst poisons, such as lead, sulfur, carbon and phosphorous, the type of catalyst, and the amount of time the exhaust gases reside in the catalytic converter.

Prior art attempts to increase the efficiency of catalytic converters have not been sufficiently successful. Modern catalytic converters significantly reduce CO, HC, and $NO_x$, but use expensive noble metal catalysts, and may have difficulty in meeting future emission requirements. Moreover, commercially available catalytic converters have a limited performance lifetime, and have a low conversion efficiency until the catalyst reaches operating temperature.

Therefore, a need exists for a simple, inexpensive means of reducing the amount of pollution released into the environment from gas streams, such as the gases produced by the combustion of fuel in an engine, in a fuel cell reformer, in effluent gas from manufacturing processes, etc., that can be installed on systems presently in use that release pollution, as well as on newly manufactured systems. The present invention provides such a means.

SUMMARY OF THE INVENTION

One object of the present invention is to provide a method and apparatus for reducing pollutants in gas streams in general and, in particular, in the exhaust gases of an internal combustion engine by improving the performance of the catalyst without the need for major modifications to the internal combustion engine or the catalytic converter.

Another object of the invention is to provide a method and apparatus, which are inexpensive to employ and manufacture, and simple in structure and operation, for reducing pollutants in a gas stream, such as the exhaust gas stream of a combustion engine.

The present invention is directed to an apparatus and a method for reducing at least one pollutant in a gas stream formed, e.g., from the oxidation or combustion of fuel. The apparatus comprises a catalyst, having an inlet and an outlet, where the catalyst is positioned so that at least a portion of the gas stream passes through the catalyst; a corona discharge device for producing a corona discharge, i.e., a non-thermal plasma or silent discharge, in at least a portion of the gas stream, the corona discharge device comprising at least one first electrode, at least one second electrode positioned a distance from the first electrode or electrodes, and at least one dielectric material positioned between the first electrode and the second electrode or electrodes; and a power supply adapted to provide electrical power to the corona discharge device. To minimize the size of the power supply and the corona discharge device, it is desirable that the frequency of the power supply be high, preferably, at least about 1,000 Hz. At least a portion of the gas stream is exposed to the corona discharge to produce radicals from gaseous species in the gas stream, and the radicals are introduced into the gas stream at a point upstream of the outlet of the catalyst.

The present invention is further directed to an apparatus and method of increasing the performance of a catalytic converter. The method and apparatus comprising a corona discharge device for producing a corona discharge, i.e., a non-thermal plasma, silent discharge or dielectric barrier discharge and a power supply to provide electrical power to the corona discharge device. At least a portion of the gas stream is exposed to the corona discharge to produce radicals from gaseous species in the gas stream, and the radicals are introduced into the gas stream at a point upstream from the outlet of the catalytic converter.

Preferably the corona discharge device and power supply require low power, and in the case of internal combustion engines preferably less than about 0.1 percent, more preferably less than 0.05 percent of the rated output of the engine. The corona discharge device preferably is compact and comprises at least one electrode, at least one second electrode positioned a distance from the first electrode, and at least one dielectric material positioned between the first electrode and the second electrode. Preferably, the frequency of the power supply is high, preferably at least about 1,000 Hz and more preferably about 10 to about 30 Kilohertz. Preferably the power supply requires no more than 50 watts to drive one corona discharge device for a motor vehicle application, more preferably no more than about 30 watts, and no more than about 100 watts, more preferably no more than about 60 watts to drive a pair of corona discharge devices.

Although much of the description in this disclosure is directed to an apparatus for reducing at least one pollutant in an exhaust stream of an engine, the apparatus and method of the invention are useful in other applications, such as removing contaminants from the feed gas of fuel cells or the effluent from a chemical process. In particular, the is corona discharge devices disclosed herein may be advantageously used with fuel cells in the manner disclosed in co-pending U.S. application Ser. No. 09/122,394, filed Jul. 24, 1998, the contents of which are incorporated herein in their entirety by reference.

In vehicular applications, where the engine has a combustion stream, which comprises a precombustion gas stream and an exhaust gas stream or postcombustion gas stream, the apparatus of the invention comprises a catalytic converter, having an inlet and an outlet, and a corona discharge device for producing a corona discharge in the exhaust gas, such that radicals are produced from gaseous species, such as, e.g., water or oxygen ($O_2$), in the exhaust gas. Useful corona discharge devices include, but are not limited to, corona discharge devices of the type described below, and those disclosed in co-pending U.S. application Ser. No. 08/947,287, filed Oct. 7, 1997, the contents of which are incorporated herein in their entirety by reference. At least one catalytic converter is positioned such that at least a portion of the exhaust stream from the engine passes through the catalytic converter. The radicals produced by the corona discharge device are introduced into the combustion gas stream, preferably the exhaust gas stream, at a point upstream of the outlet of the catalytic converter, such as, e.g., within the combustion chambers or exhaust ports of the engine, in the exhaust stream upstream of the catalytic converter, or within the catalytic converter. However, the radicals may also be introduced into the precombustion gas stream.

In an alternate embodiment, radicals are produced remotely by the corona discharge device from gaseous species in the exhaust gas from the exhaust stream, and are introduced back into the exhaust stream at a point upstream of the outlet of the catalytic converter. Typically, however, an exhaust pipe is attached to the inlet of the catalytic converter, such that at least a portion of the exhaust stream passes through the exhaust pipe to and through the catalytic converter, and the exhaust pipe comprises a fitting for positioning the corona discharge device in the exhaust stream, so that a corona discharge is produced in the exhaust stream in the exhaust system upstream of the outlet of the catalytic converter.

Radicals may also be produced in exhaust gas in a remote corona discharge radical generator. In this embodiment, an exhaust pipe or manifold attached to the inlet or outlet of the catalytic converter has an exhaust gas takeoff for conveying a portion of the exhaust stream to the remote radical generator. The corona discharge device in the generator is used to produce radicals, such as hydroxyl radical from water in the exhaust gas, in the portion of the exhaust stream conveyed to the remote radical generator. Exhaust gas containing radicals from the remote radical generator is then introduced into the exhaust stream or the precombustion gas stream at a point upstream of the outlet of the catalytic converter.

It is preferable that the corona discharge device and associated power supply consume little power particularly in applications including motor vehicles. As discussed above, it is desirable that the corona discharge device and power supply require less than about 0.1 percent, more preferably, less than 0.05 percent of the rated output of the engine. Embodiments of the corona discharge device and power supply of the present invention have been developed that are at least 50 percent efficient, that is, e.g., for a corona discharge device developing about 15 watts, the system requires no more than about 30 watts. Under certain circumstances, such as cold starts and particular exhaust conditions, the corona discharge device system may require more power, i.e., up to about 1,000 watts, in which case the system can be scaled by appropriate design. Such a design could be, e.g., more than one corona discharge device, a larger device, a higher output wattage power supply, or the like.

Preferably, in each vehicular embodiment described above, an oxygen sensor is positioned between the inlet of the catalytic converter and a point upstream of the catalytic converter where the exhaust gases containing radicals are introduced, either by in situ generation or addition, into the exhaust stream or precombustion gas stream. Such an oxygen sensor is mounted upstream of the catalytic converter of virtually all modern spark ignition engines, and allows the fuel injection system of the engine to maintain a stoichiometric air/fuel ratio.

In another embodiment, the corona discharge device is positioned in a shunt attached to the exhaust pipe, such that at least a portion of the exhaust stream enters the shunt from the exhaust pipe at a first point upstream of the catalytic converter, and re-enters the exhaust pipe at a second point upstream of the outlet of the catalytic converter. To reduce the operating temperature of the corona discharge device, the shunt may also comprise one or more extended surfaces or other cooling devices, which radiate or otherwise remove heat, and reduce the temperature of the shunt and the exhaust gas that passes through the shunt.

A typical corona discharge device may comprise generally concentric electrodes, such that a corona discharge is formed in the air gap between the electrodes when the device is operating. The concentric electrodes typically include an inner electrode, an outer electrode, which may be formed from a wire mesh, and at least one dielectric material, preferably having a dielectric constant in the range of from about 2 to about 10. The dielectric material forms a layer on at least one of the inner electrode or the inner surface of the outer electrode. The outer electrode may include a top portion, so that the air gap is totally enclosed by the electrodes and the dielectric, such that the outer electrode functions as a flame arrester. At least one flame arrester may also be positioned in the exhaust pipe to prevent the propagation of flame in the exhaust pipe; e.g., downstream of the corona discharge device and upstream of the catalytic converter to prevent exposure of the catalytic converter to flame from the combustion of residual fuel. A corona discharge device may be constructed such that the exhaust pipe functions as a distant ground electrode for the corona discharge device.

To insure that fresh exhaust gases from the exhaust stream are constantly exposed to the corona, the corona discharge device may be positioned such that naturally occurring pressure fluctuations in the exhaust stream provide a pumping action that forces exhaust gas into the corona discharge device, and scavenges gases containing radicals produced in the corona discharge from the corona discharge device. This pumping action may be augmented by positioning a properly sized plenum adjacent to the corona discharge device, in a manner that allows the exhaust gas to pass from the exhaust pipe, through the corona discharge, into the plenum, and back into the exhaust pipe.

The apparatus of the invention may further comprise a device for injecting air into the exhaust stream during fuel rich cold start operating conditions, such that the corona discharge causes the oxidation of fuel in the exhaust stream.

The present invention is also directed to a method for the reduction of at least one pollutant in a gas stream comprising gas formed from the combustion or oxidation of fuel, such as, e.g., in an engine having an exhaust pipe attached to an inlet of a catalytic converter. The method comprises passing the gas stream through the catalytic converter; forming radicals in at least a portion of the precombustion or post-combustion gas stream using a corona discharge; and introducing the radicals into the gas stream upstream of the catalyst. The radicals are typically produced from at least one of water or $O_2$ in the gas. The radicals may then react with gaseous species in the gas stream to form other gaseous species, including other radicals. Radicals and gaseous reactive species that can be produced in the corona discharge and by secondary reactions include, but are not limited to, OH, O, H, $HO_2$, $H_2O_2$, $NO_2$, or $O_3$. In vehicular applications, the radicals may be formed in at least a portion of the exhaust stream of the engine, and introduced into the exhaust pipe at a point upstream of the outlet of the catalytic converter. Alternatively, a portion of the exhaust gas may be diverted from the exhaust stream, and conveyed to a remote radical generator, where radicals are formed in a corona discharge. The radicals are then introduced into the exhaust stream or precombustion gas stream at a point upstream of the outlet of the catalytic converter. In each embodiment, an oxygen sensor may be positioned in the exhaust pipe between the catalytic converter and at a point upstream of the catalytic converter where the radicals are formed in the exhaust stream in the exhaust pipe. Preferably, the oxygen sensor is positioned at a point downstream of the location where the radicals are formed or introduced into the exhaust stream.

Introducing radicals into the exhaust gas stream upstream of the outlet of the catalytic converter has also been found to remove catalytic poisons from surfaces of the catalytic converter by the reaction of the poisons with at least one of the radicals or gaseous reactive species formed in the exhaust stream. The catalytic poisons removed include compounds of sulfur, phosphorus, or carbon.

The corona discharge may also be used to initiate oxidation of residual fuel or hydrocarbons in the exhaust stream during cold start or misfire conditions, thereby reducing the amount of residual fuel and hydrocarbons before they reach the catalytic converter. A controlled amount of air should be introduced into the exhaust stream during cold start conditions to provide the oxygen required for the combustion of the extra fuel in the exhaust.

In some engines, Exhaust Gas Recirculation ("EGR") is used as part of the emission control system of the engine. In an EGR system, a portion of the exhaust gas from the engine is split off from the exhaust stream, added to the precombustion gas stream, and directed back to the combustion chambers of the engine. This provides several benefits, e.g., the introduction of exhaust gases into the combustion chamber lowers the combustion temperature, reducing the production of $NO_x$. The performance of a catalytic converter may be improved by producing a corona discharge within the EGR path by means of a corona discharge device, or exposing at least a portion of the EGR stream to a corona discharge. For use within the EGR stream or in other applications where a small amount of the gas stream is to be treated with the corona discharge, a corona discharge device with one or more hollow electrodes may be used, such that the hollow electrode acts as a conduit to deliver a portion of the gas stream to the region where the corona discharge is formed.

In a further embodiment, the invention is directed to a method for improving the life and performance of an oxygen sensor, which is subject to poisoning by sulfur, phosphorus, and carbon, where the oxygen sensor is positioned in the exhaust stream upstream of a catalytic converter. As in the case of the catalytic converter, the highly reactive radicals produced by the corona device can displace these poisons, thereby preserving the proper oxygen sensor function. The method comprises producing radicals in the combustion gas stream using a corona discharge, and introducing the radicals into the combustion gas stream upstream of the oxygen sensor. The radicals may be formed in the precombustion gas stream, or from water or oxygen in at least a portion of the exhaust gas from the exhaust gas stream. As described above, a portion of the exhaust gas from the exhaust gas stream may be diverted to a remote radical generator, where radicals are formed in the exhaust gas using a corona discharge. The radicals are then introduced into the exhaust stream at a point upstream of the oxygen sensor.

Corona discharge devices useful in the invention also include a compact corona discharge device, which comprises a first end or base, configured for attachment to a fitting in an exhaust system to allow exhaust gas from the exhaust system to enter into and exit from the corona discharge device, a second end, configured to prevent exhaust gas from leaking from the corona discharge device, preferably in the form of a metal cap, a generally cylindrical outer electrode, electrically and mechanically connected to the first end, an inner electrode, mounted concentric with, and partially surrounded by the outer electrode, and a dielectric insulator, mounted concentric with, and positioned between the inner and outer electrodes, forming an air gap between the electrodes, and having a diameter that defines the corona discharge device diameter, where the inner electrode has a length that is greater than that of the outer electrode to provide a corona region in the air gap near the first end and a ullage volume in the air gap near the second end. Preferably, each dimension of the corona discharge device is minimized, such that shunt resistive and capacitive power losses of the corona discharge are substantially minimized. Preferably, the inner electrode has a length that is at least about twice, preferably 4 times, that of the outer electrode and at least about 4 times, preferably 6 times, that of the diameter of the compact corona discharge device defined by the dielectric insulator.

A compact corona discharge device in accordance with the invention may further comprise an extended skirt section positioned between the base and the outer electrode to provide a lower temperature environment for the compact corona discharge device. To improve heat rejection from the compact corona discharge device, the extended skirt preferably comprises at least one extended surface to radiate or otherwise remove heat, and cool the corona discharge device.

The compact corona discharge device may further comprise an orifice, which may be sonic, in the second end or cap to supply a controlled air flow through the compact discharge device for cooling. In this embodiment, the base of the compact corona discharge device is typically attached to a Venturi section in the exhaust system to provide a low pressure in the device to draw air through the orifice.

To protect the corona discharge device from the hostile environment in which it operates, and to further control electro-magnetic interference (EMI) due to the operation of the corona discharge device, the corona discharge device may include a shroud or protective covering. The shroud may be designed to attach to the power cable or cord by a threaded connector or by other means. The shroud or protective covering is typically metal which has the disadvantage of conducting heat to the electrical connector which attaches to the corona discharge device. To lower the temperature at the electrical connection where the corona discharge device is connected to a power source, the cross-sectional area of the shroud is reduced to lower heat conduction while its heat exchange surface area is increased, such as by the use of fins, to improve heat rejection through convection, with the shroud simultaneously serving its protective and shielding functions. One example of a way to lower temperature at the electrical connector includes reducing the heat conduction cross-sectional area of the shroud to lower heat conduction. One method of reducing the cross-sectional heat conduction area is to reduce the thickness of the shroud while another method is to create louvers out of the shroud itself which also reduces the cross-sectional area of heat conduction. These louvers can also simultaneously act as cooling fins to improve heat rejection through convection.

The energy of one embodiment of the corona discharge device of the present invention per unit volume of exhaust gas treated (volumetric specific energy) is approximately 18 joules per liter of exhaust at idle and 4.5 joules/liter of exhaust at moderate acceleration, e.g., 2000 rpm, and 80 Nm, assuming 40 watts of input power are being utilized, and calculating the volume flow under standard atmospheric conditions, i.e. 1 atm pressure and 20° C. When the corona discharge device is positioned in the intake, the flow is twice as great, and the energy density is half that of a unit in the exhaust.

The amount of ozone produced by the device under a controlled atmosphere is indicative of the amount of plasma power produced by the device, and similarly, the number of radicals produced. Thus, by measuring the ozone produced, the amount of radicals produced by the device can be determined, and different designs can be rated according to their ozone output under identical conditions.

BRIEF DESCRIPTION OF THE DRAWINGS

FIGS. 43 to 46 are voltage diagrams that illustrate the operation of the third preferred embodiment of the second on-board-diagnostic system;

DETAILED DESCRIPTION OF THE PREFERRED EMBODIMENTS

Figure 1:
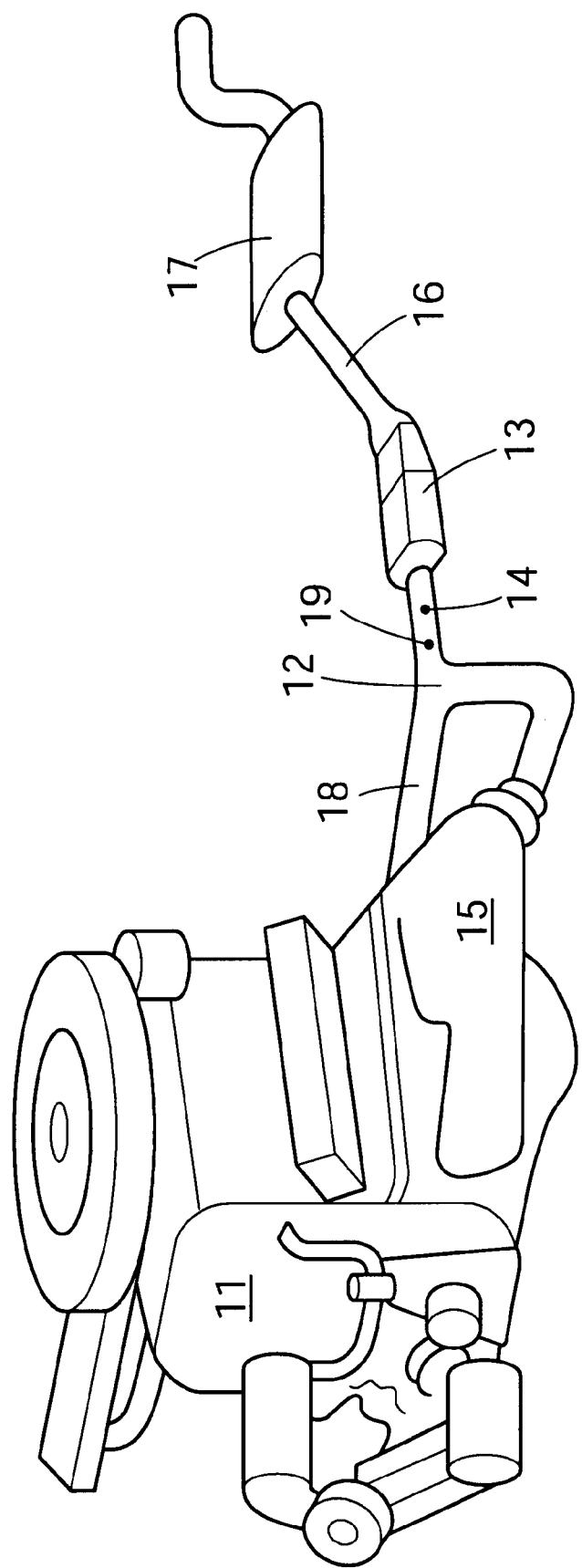
FIG. 1 is a side perspective view of an internal combustion engine having a catalytic converter.

As used herein, the term "precombustion gas stream" refers to the flow of air or of the air/fuel mixture prior to combustion, and, in vehicular applications, to the combustion chamber of an engine. The terms "postcombustion gas stream", "exhaust gas stream", and "exhaust gas", as used herein, refer to the resulting flow of exhaust gases following combustion, such as from the combustion chamber following combustion of the air/fuel mixture in an engine. The precombustion and postcombustion gas streams are collectively referred to as the "combustion gas stream".

In addition, the terms "radical" or "radicals" and "free radical" or "free radicals" refer to any atom or group of atoms having at least one unpaired electron and no net electrical charge; i.e., as used herein, these terms refer to electrically neutral species having equal numbers of electrons and protons.

As also used herein, the term "continuous operation", as applied to the operation of a corona discharge device, refers to producing a corona discharge by applying an alternating current ("AC") or a pulsed DC current at any frequency to the device without discontinuing the application of the current for more than about one second. As will be understood by one of ordinary skill in the art, an AC power supply changes polarity at twice the frequency of the supply, and thus the voltage must go to zero as the polarity changes. As a result, during those short periods when the voltage on the corona discharge device is below breakdown voltage, no corona discharge is produced. Instead, a series of corona discharges are produced at twice the power supply frequency. Similarly, with a pulsed DC power supply, the voltage may drop below the threshold required to produce a corona. Therefore, it is the continuous production of these corona discharges having alternating polarities or pulsed DC currents without discontinuing the application of the current for more than a period of about one second that is regarded herein as continuous operation.

The present invention relates to a method and an apparatus for increasing the efficiency of a catalyst, such as that used in a catalytic convertor, and for the reduction of the amount of pollutants, such as carbon monoxide (CO), hydrocarbons (HC), and oxides of nitrogen ($NO_x$), in the gas stream produced by the oxidation or combustion of fuel, in a fuel cell reformer, in effluent gas from manufacturing processes, or other process that produces pollutants in a gas stream. The method and apparatus of the invention are useful with, e.g., fuel cell reformers, as well as internal combustion engines, preferably, where equipped with at least one catalyst or catalytic converter in the exhaust system. Preferably, in vehicular applications, the method and apparatus of the invention are used with an internal combustion engine further comprising at least one oxygen sensor upstream of the catalytic converter that allows the fuel injection system of the engine to maintain a stoichiometric air/fuel ratio. However, the present invention is also useful with non-stoichiometric engines, such as lean burn engines. Such an oxygen sensor is mounted upstream of the catalytic converter in virtually all modern automobiles.

In the method of the invention, highly reactive free radicals, such as hydroxyl radical, OH, hydroperoxyl radical, $HO_2$, atomic hydrogen, H, and atomic oxygen, O, and related reactive gaseous species, such as hydrogen peroxide, $H_2O_2$, nitrogen dioxide, $NO_2$, and ozone, $O_3$, are produced in or added into the combustion gas stream at any point within the combustion gas stream, including within the combustion chamber of the engine. Preferably, the radicals and/or related gaseous species are produced in or introduced into the exhaust gas stream, upstream of the outlet of the catalytic converter. The radicals and related gaseous reactive species enhance the oxidation of CO and HC to carbon dioxide ($CO_2$) and water ($H_2O$), and the reduction of $NO_x$ to molecular nitrogen ($N_2$), so that, after passing through the catalytic converter, the exhaust stream is substantially free of any material other than $CO_2$, $H_2O$, $N_2$, and possibly methane ($CH_4$).

In accordance with the invention, free radicals and related gaseous molecular oxidizers are introduced into the combustion gas stream of an engine to reduce pollutants and contaminants, such as CO, HC, and $NO_x$. In particular, it has been observed that hydroxyl radical, OH, can react rapidly with CO to produce $CO_2$. It has also been observed that OH in the presence of oxygen can react rapidly with hydrocarbons (HC) to produce intermediary products, which then react with additional OH to form $H_2O$ and $CO_2$, and regenerate OH. Therefore, it appears that these reactions do not consume OH, but, instead, regenerate OH, so that OH acts as a homogeneous catalyst.

In the case of CO, the following reaction steps convert CO to $CO_2$ and regenerate OH:

$$CO+OH \rightarrow CO_2+H$$

$$H+O_2 \rightarrow HO_2$$

$$NO+HO_2 \rightarrow NO_2+OH,$$

where the dissociation of hydroperoxyl to hydroxyl occurs by thermal decomposition in the exhaust stream.

In the case of methane as a representative hydrocarbon, a reaction set may be described by the following steps:

$$CH_4+OH \rightarrow CH_3+H_2O$$

$$CH_3+O_2 \rightarrow CH_3O_2$$

$$CH_3O_2+NO \rightarrow CH_3O+NO_2$$

$$CH_3O+O_2 \rightarrow CH_2O+HO_2$$

$$HO_2+NO \rightarrow NO_2+OH$$

$$CH_2O+O_2 \rightarrow HO_2+CHO$$

$$HO_2+NO \rightarrow NO_2+OH$$

$$CHO+O_2 \rightarrow CO+HO_2$$

$$HO_2+NO \rightarrow OH+NO_2$$

$$CO+OH \rightarrow CO_2+H$$

$$H+O_2 \rightarrow HO_2$$

Depending upon the HC species, there may be branching reactions. In addition, other free radical intermediaries and oxidizers, such as, e.g., O, H, $NO_2$, $HO_2$ and $H_2O_2$, may be produced, and either enter into the reactions directly or through the products of other reactions such as:

$$NO+HO_2 \rightarrow NO_2+OH$$

$$O+O_2 \rightarrow O_3, \text{ or}$$

$$H_2O_2 \rightarrow 2OH$$

Again, it is particularly important to note that OH is regenerated in the course of these reactions, and, thus, acts as a catalyst. Moreover, the reaction sequence proceeds rapidly due to the high reactivity of free radicals and the nature of the free radical reactions.

It has been discovered that the presence of OH, as well as other free radical and gaseous molecular intermediates and oxidizers, such as, e.g. O, H, $NO_2$, $H_2O_2$, $HO_2$, and $O_3$, in the exhaust gases of a combustion engine, typically, in the presence of oxygen, provides a highly effective catalytic conversion of CO and hydrocarbons to non-polluting as species, such as, e.g., $CO_2$ and water vapor. The OH and other related free radical and gaseous molecular oxidizers created by reaction of OH with gaseous species in the exhaust stream act as catalysts independent of or in conjunction with the normal catalytic function of the catalytic converter.

Thus, the invention employs radicals, such as hydroxyl radical and its associated reactive species, O, H, $NO_2$, $H_2O_2$, $HO_2$, and $O_3$, to provide a catalytic cycle for reducing CO and HC outputs of engines to meet present and future Ultra Low Emissions Vehicle "ULEV" and Low Emissions Vehicle "LEV" standards. Because the OH and other associated free radicals and gaseous molecular reactive species act as catalysts, relatively small amounts of radicals need to be injected for several times more CO and hydrocarbons to be reduced to $CO_2$ and $H_2O$ in the presence of oxygen in the exhaust gas stream.

The introduction of radicals and related gaseous reactive species into the combustion gas stream upstream of the outlet of the catalytic converter results in the catalysis of the oxidation of CO and HC in the exhaust gas stream, and provides for the rapid removal of those pollutants. The catalytic conversion of CO to $CO_2$ and hydrocarbon to $CO_2$ and $H_2O$ by these reactive species occurs on the large washcoat surface in the catalytic converter, as well as in the gas phase in the exhaust stream. The conversion of CO and HC to $CO_2$ and $H_2O$ is substantially completed within a small region near the entrance of the catalytic converter, and, as a result, the bulk of the precious metal catalytic surface is freed from substantial participation in these competing reactions. The converter's precious metal sites no longer need to play such a strong role in catalyzing the less reactive hydrocarbon species, such as methane, ethane, ethene, benzene and formaldehyde, and, as a result, the catalytic activity at the precious metal sites can be directed toward reduction of nitrogen oxides to nitrogen and other non-polluting gas species. Therefore, because the removal of CO and HC are enhanced by the introduction of radicals with the present invention, the catalyst may be optimized for maximum $NO_x$ reduction. That is the amounts and distribution of the catalytic materials in the catalytic converter may be adjusted to maximize $NO_x$ reduction because the need for the removal of CO and HC by the catalytic converter is reduced.

Because the catalytic action of the radicals and related gaseous reactive species, such as hydroxyl radical, occurs throughout the volume of the exhaust gas, as well as on the surface of the catalytic converter, the present invention is significantly more effective than a catalytic converter operating in the conventional manner in reducing the emission of pollutants. The introduction of these radicals or reactive gaseous species upstream of the outlet of the catalytic converter also significantly reduces the emission of nitrogen oxides below the level obtained with conventional methods because the precious metal sites are freed from the conversion of CO and HC, and, thus, also allows a reduction in the amount of precious metals in the catalytic converter or the use of less costly metals or their oxides, while maintaining the reductions in $NO_x$ that are obtained with prior art methods.

In addition, it has been discovered that the generation of radicals and related gaseous reactive species by a corona discharge in the combustion gas stream, and their introduction into the exhaust stream upstream of the outlet of the catalytic converter, clean the catalytic converter by reacting with and removing poisons on the surfaces of the catalytic converter. Catalyst poisons that are removed by the oxidizing action of these free radicals and related gaseous reactive species include, but are not limited to, sulfur compounds, such as sulfates and sulfides of the noble metals in the catalyst, SO, and elemental sulfur, as well as phosphorous compounds, such as phosphides and phosphates of the noble metals, $PO_2$, $P_2O_3$, and elemental phosphorous, all of which can bind to the catalytic surface, forming a coating. Similarly, carbon compounds, such as carbon monoxide, may be adsorbed onto the surface. Once adsorbed onto the surface, the carbon compounds can dissociate into atomic species, resulting in carbonation.

The oxidation of catalytic poisons from the surfaces of the catalytic converter removes the poisons from the catalytic surfaces so that the efficiency of the catalyst is improved, allowing the effective use of a catalyst bed having a smaller volume than that used in a typical catalytic converter today. Therefore the introduction of free radicals and related gaseous reactive species by means of a corona generator has two independent effects that reduce the emission of pollutants. First, the catalytic action of the radicals and related gaseous reactive species directly removes pollutants from the exhaust gas stream. In addition, the removal of all or some of the poisons on the catalyst bed surfaces, in particular, the surfaces of the noble metals, improves the efficiency of the removal of pollutants, $NO_x$ in particular, by the catalytic converter.

Poisoning of catalysts by sulfur has been a particular problem with vehicular catalytic converters because of the sulfur content of automotive fuels. As discussed above, catalytic poisons, such as, e.g., sulfur and sulfur compounds, can bind to catalytic sites of a catalyst, reducing the efficiency of the catalyst, and, in vehicular applications, resulting in an increase in emission of pollutants, such as CO, HC, and $NO_x$. As the sulfur content of a fuel increases, the emission of pollutants by a vehicle also increases, eventually reaching a steady state level for a given fuel sulfur content. It is believed that this is the result of a dynamic equilibrium that controls the number of catalytic sites, that are poisoned. When a clean catalyst is first exposed to the exhaust from the combustion of fuel containing sulfur, all of the catalytic sites are available for poisoning. As a result, the rate at which catalytic sites are initially poisoned is rapid, reducing the number of sites available for the removal of pollutants, and causing an increase in emissions. However, as soon as any catalytic sites are poisoned, processes that cause the desorption of some of the adsorbed sulfur compounds start to occur. As the number of sites that are poisoned increases, the rate of adsorption decreases, and the rate of desorption increases, until the desorption rate equals the rate at which catalytic sites are poisoned. At this point, a steady state dynamic equilibrium is reached, and the number of poisoned catalytic sites and amount of pollutants emitted stabilize at a constant value.

Typically, with the prior art, converting back to a sulfur free fuel does not result in a substantial decrease to the level of pollutants emitted before the catalyst was poisoned. That is, a certain amount of the poisoning appeared to be permanent, resulting in a higher emission of pollutants than that of a catalyst that was never poisoned. Typically, even when the catalyst is subjected to high temperature regeneration, i.e., operation at a temperature of up to about 700° C., under such rich conditions, the emissions remain higher than those emitted before the catalyst was poisoned.

In contrast, where radicals are introduced into the gas stream that passes through the catalyst using the apparatus and method of the invention, the amounts of pollutants emitted are significantly reduced in all modes of operation. Reductions in the emissions of pollutants are obtained with both sulfur free fuel and fuel containing sulfur. With the method and apparatus of the invention, deleterious effects of sulfur and other poisons are more readily and to a greater extent reversed under normal operating conditions.

In addition, by exposing at least a portion of the exhaust gas to a corona discharge produced by means of a corona discharge device, the temperature at which a catalyst reaches the "light off" temperature, typically defined as 50 percent conversion efficiency, is significantly lower for the removal of HC, CO and $NO_x$ than the temperature required without a corona discharge device. Typically, there is a delay time during cold start before a catalyst becomes effective, as the catalyst must reach a certain temperature before it is able to remove pollutants. One approach being considered for rapidly increasing the temperature of a catalyst during cold start is retarded timing, as disclosed in U.S. Pat. No. 5,878,567, but which can cause the engine to operate roughly due to partial or total misfires. However, if the timing is retarded in only a fraction of the cylinders, e.g., two cylinders in a V-6 or four in a V-8, while maintaining the remainder at optimal timing, a rapid temperature rise in the exhaust is possible, while maintaining smooth operation. It should be noted that the retarded cylinders do not have to be the same and can be varied to maintain uniform value and cylinder temperatures across the engine.

The temperature of the catalyst can also be rapidly increased during cold start by using air pumps to add additional air to the exhaust stream to aid in the light-off of the catalyst. This may also be accomplished by reducing fuel to certain cylinders, e.g., two cylinders in a V-6, such that a certain amount of extra air is passed through the engine and to the exhaust system. The cylinders having reduced fuel can also be those where the spark is retarded. In this way some cylinders during cold start will be operated extra lean and with retarded timing.

It is also believed that improved catalyst performance will be obtained by preconditioning the catalyst with radicals before the catalyst is put into use. The catalyst may be preconditioned by passing a gas containing radicals formed with a corona discharge device over or through the catalyst prior to each occurrence of the combustion of fuel, e.g., before the engine is started in a vehicular application. The gas containing radicals may be any gas that will form radicals when exposed to a corona discharge. Useful preconditioning gases include, but are not limited to, air, humidified air, a simulated exhaust gas, actual exhaust gas, and a simulated fuel cell feed gas. Typically, the catalyst is at ambient temperature during preconditioning, but may be maintained at any temperature between about −20 and about 1000° C. or the maximum allowable catalyst temperature. In a typical automotive application, the corona discharge device will be turned on to produce radicals in whatever gas is present before the engine is started. Then, as the engine is started, the movement of the gas in the combustion gas stream caused by the rotation of the engine by the starter will force the radicals into the catalyst, resulting in a preconditioning of the catalyst.

Referring to FIG. 1, a typical configuration for a modern automobile engine 11 having a catalytic converter 13 is illustrated. The catalytic converter 13 is positioned at the underbody of the automobile (not shown), and is situated in the exhaust gas stream 18 from the engine, in the exhaust pipe 12 downstream from the exhaust manifold 15, and before the muffler 17. Although this is the configuration commonly used today, it should be noted that a growing number of automobiles are being produced with closely coupled catalytic converters that are positioned closer to the engine than shown in FIG. 1, such that the catalytic converter is adjacent to or part of the exhaust manifold of the engine. In most automobiles produced today, an oxygen sensor 14 is positioned in the exhaust system just upstream of the catalytic converter 13. Data from the oxygen sensor 14 are used by the electronic controller of the fuel injection system to maintain a stoichiometric air/fuel ratio. Often, a second oxygen sensor 16 is located just downstream of the catalytic converter to provide additional data for the fuel injection controller and the onboard diagnostics of the vehicle.

The catalytic converter 13, as contemplated for use in the present invention, includes any device which is provided for treating exhaust gases from the combustion of a fuel, such as, for example, gasoline, gasoline-based formulations, diesel fuel, alcohol, natural gas and any other fuel, where a catalytic converter can be used to reduce at least one pollutant from combustion, such as, for example, CO, HC, and/or $NO_x$, including, but not limited to, a three way catalyst ("TWC") typically used in today's modern automobile engines.

The catalytic converter 13 therefore comprises any device that catalytically removes or participates in the removal of at least one pollutant from an exhaust stream generated by burning a fuel, including, but not limited to, those with monolithic or granular ceramic substrates, metallic substrates, or substrates of any kind, and devices with noble metals or any other type of catalytic material. It would also include, without limitation, devices having semiconductor catalysts, such as oxides or sulfides of transition elements, and devices having ceramic-type catalysts, such as alumina, silica-alumina, and zeolites, individually, in combination with each other and oxygen storage media such as cerium oxide or in combination with metal catalysts.

In one embodiment of the invention, reactive radicals and related gaseous reactive species are introduced into the exhaust stream upstream of the outlet of the catalytic converter, and, preferably, as shown in FIG. 1, upstream of the oxygen sensor 14, which is installed in almost all modern cars and light trucks, at point 19. Typically, hydroxyl radicals, OH, and atomic hydrogen, H, are produced from gaseous species, such as water vapor, in the exhaust gas of the engine by an electrical corona discharge. Similarly, the corona discharge may also produce atomic oxygen, O, from oxygen, $O_2$, in the exhaust gas. Typically, these radical species then react with other gaseous species in the exhaust stream to form other reactive species, such as $NO_2$, $H_2O_2$, $HO_2$, and $O_3$.

Figure 2:
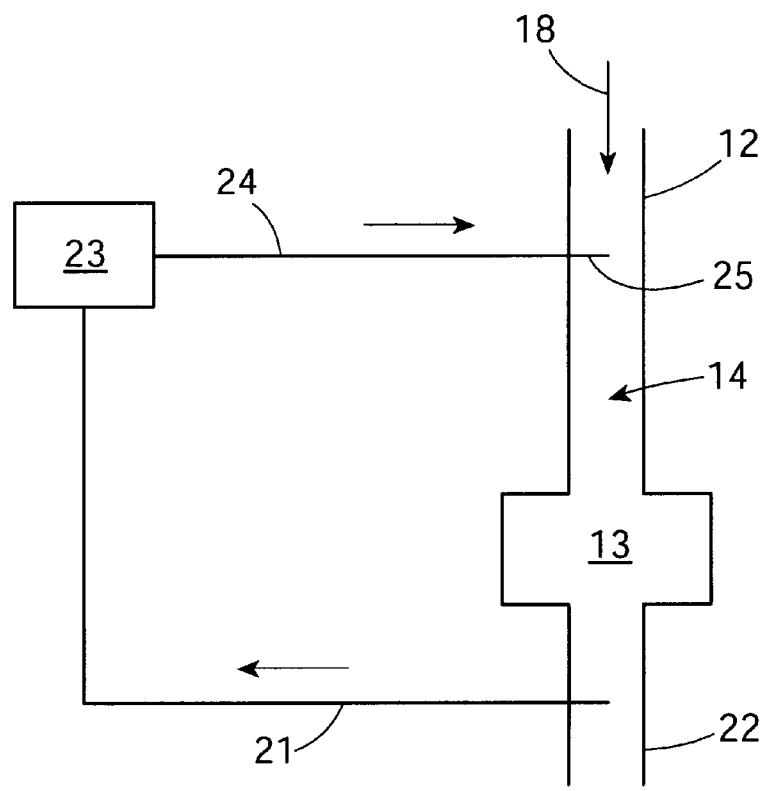
FIG. 2 is a schematic of an exhaust system incorporating a remote corona discharge radical generator.

The exhaust gas used to produce the free radicals may be taken from the downstream end of the catalytic converter by diverting a portion of the downstream exhaust to a radical generator, and introducing the output of the radical generator into the exhaust upstream of the outlet of the catalytic converter, as shown schematically in FIG. 2. By operating the corona discharge device in exhaust gas taken from the downstream end of the catalytic converter, the corona operates in a cleaner environment, substantially free from the pollutants removed by the action of the catalytic converter and the reactive radicals and related gaseous species, which are produced by the discharge, and introduced upstream of the outlet of the catalytic converter. This results in an improved discharge device lifetime, and substantially eliminates fouling problems that may occur when the corona discharge device is positioned upstream of the outlet of the catalytic converter. However, when used upstream, the corona discharge itself should naturally reduce or eliminate contamination of the device.

As shown in FIG. 2, a portion of the cleaned exhaust as stream 21 that has passed through the catalytic converter 13 is taken from the rear exhaust pipe 22, and diverted to the remote corona discharge radical generator 23. The output 24 of the remote corona discharge radical generator 23 is enriched with radicals as a result of the action of the corona on the exhaust gas 21, and is introduced into the exhaust gases in the tailpipe 12 upstream of the outlet of the catalytic converter 13. Preferably, an oxygen sensor 14, such as that found on most modern cars and light trucks, is positioned in the exhaust stream 18 upstream of the catalytic converter 13, but downstream of the point 25 where the reactive species are introduced into the exhaust stream. However, because of the higher pressures in the exhaust system, pumping, such as with a Venturi (not shown), is required to accomplish direct injection of the output of a remote generator into the exhaust gas stream.

Figure 3:
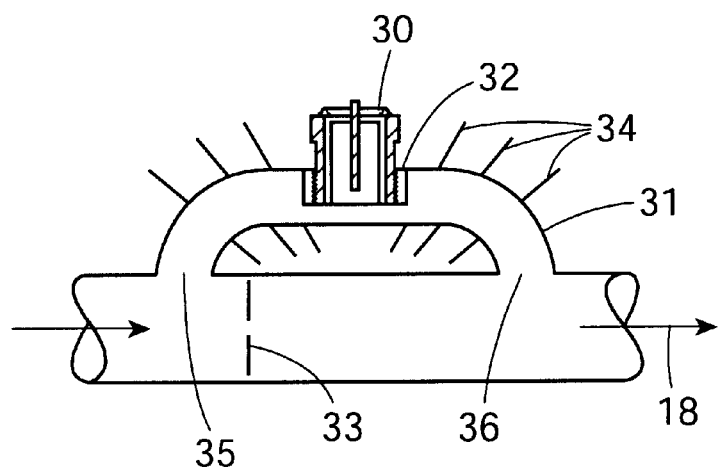
FIG. 3 illustrates a corona discharge device mounted in an exhaust shunt.

Direct, in situ production of free radicals by the action of a corona discharge on water vapor and oxygen in the exhaust stream is the most preferred method. Preferably, the radicals and related gaseous reactive species are produced in the exhaust upstream of the outlet of the catalytic converter by a corona discharge device, placed in either the main exhaust pipe or in a shunt path in parallel with the main exhaust gas stream, as shown in FIG. 3. As shown in FIG. 3, a corona discharge device 30 is mounted in an exhaust shunt 31 in mount 32. The exhaust shunt 31 allows a portion of the exhaust gas stream 18 to bypass a section of the exhaust pipe 12, by exiting the exhaust pipe 12 at a first point 35, typically upstream of the catalytic converter 13, and re-entering the exhaust pipe at a second point 36, which is typically upstream of the outlet of the catalytic converter 13. The exhaust shunt will preferably include a restrictive orifice 33 or other device into the shunt to regulate or control the exhaust gas flow rate. Such a shunt path is useful in that it allows the corona discharge device to be operated in a lower temperature environment than that of the exhaust gas stream. Preferably, the heat rejection of the shunt path is improved by providing an increased surface area with, e.g., cooling fins 34 or similar devices.

A lower temperature environment simplifies the design and choice of materials for the corona discharge device, particularly with regard to the electrical properties of the device during high temperature operation and its thermal design. This is particularly important, because the resistivity, loss tangent, and dielectric constant of the materials in the corona discharge device change with increasing temperatures. The change in these properties that occurs at high temperatures can seriously degrade the efficiency of the corona discharge device, decreasing the production of free radicals, and, thus, increasing the emission of pollutants. Where a corona discharge device is operated in a high temperature environment, the choice of materials is limited to those that experience a limited change in electrical properties with increasing temperatures. However, where the corona discharge device is operated in a lower temperature environment, such as that of a shunt path, other, less expensive materials that possess the desired electrical properties at lower temperatures, but lack the desired properties at high temperature may be used.

Operation at lower temperatures also reduces or eliminates problems related to a mismatch in the thermal coefficient of expansion of materials in the corona discharge device, its support, and the exhaust pipe. This reduces or eliminates strain induced material and seal failures, as well as failures caused by the numerous thermal cycles the corona discharge device will experience during the lifetime of the engine.

The free radicals may also be produced in the precombustion gas stream by a corona discharge upstream of the point that the air and fuel are mixed, such as in the intake manifold of an engine equipped with a port fuel injection system. A drawback of the production or injection of the reactive species in the intake manifold is that a significant fraction of the highly chemically active species may be destroyed in the combustion process, and only those active species that reside in the crevice regions and at the walls of the combustion chamber can effectively survive, and enter into the exhaust gas stream where they are useful in oxidizing CO and HC. In contrast, generators that inject free radical and gaseous molecular oxidizers directly into or which create these species in the exhaust (postcombustion) gas stream can more effectively deliver the active species into the exhaust stream where CO and HC need to be oxidized. Thus, the relative amount of radicals that must be produced to provide a given amount of radicals at the catalytic converter is significantly smaller when the reactive species are produced in or introduced into the exhaust gas stream than the amount required for other methods. This directly translates into proportionally lower electrical input demands for the radical generator.

The corona discharge device of the invention may also be positioned within the combustion chambers of an engine, such that intake air entering the combustion chamber is exposed to the corona discharge during the intake stroke and/or exhaust gas passing from the combustion chamber to the exhaust port is exposed to the corona discharge during the exhaust stroke of the engine. In one embodiment, the corona discharge device is placed adjacent to the exhaust port of the combustion chamber, so that, during the exhaust stroke, the corona discharge device is directly in the path of the exhaust gas produced during combustion of the fuel as the exhaust exits from the combustion chamber. In this embodiment, as in other embodiments, the operation of the corona discharge device need not be continuous. Instead, the operation of the corona discharge device may be timed to start and stop or increase or decrease power level at particular times during the operation of the engine. For example, in a spark ignition engine, the operation of the corona discharge device may be timed to begin operation at any time from shortly before the firing of the spark plug and to after the end of the exhaust stroke, but, preferably, before the next intake stroke begins. The timing of the operation of corona discharge device within a combustion chamber may be controlled with the same circuitry that controls the firing of the spark plug. In a further embodiment, the corona discharge device of the invention may be used in place of the spark plug. As will be readily understood by one of ordinary skill in the art, the timing of a corona discharge positioned within the combustion chamber of a spark ignition engine must be carefully adjusted to prevent detonation or "pinging", which, when severe, can cause damage to the engine.

In a compression ignition engine, such as a diesel engine, or in a continuous combustion engine, such as a gas turbine, a corona discharge device positioned within the combustion chamber may also be timed to operate at particular points or times in the operating cycle of the engine. Alternatively, the corona discharge device may also operate continuously in these applications. Furthermore, the corona discharge device of the invention may also be used as a "glow plug" to help in the cold start and operation of such engines. Operating a corona discharge device within the combustion chamber of a compression ignition engine for a period of time before the engine is started will increase the temperature of the combustion chamber, and assist in the ignition of the fuel in the cold engine when it is started. Similarly, continuous combustion engines often require a glow plug to ignite the air-fuel mixture entering the combustion chamber of the engine. The corona discharge device of the invention may also function in this manner in addition to introducing radicals into the combustion gas stream of the engine.

In a further embodiment, a corona discharge device may be placed in each of the exhaust ports of the engine, just downstream of the combustion chamber. In this embodiment the pumping effects of the exhaust pulses, as described above, are maximized, insuring maximum exposure of the exhaust gas to the corona discharge.

A corona discharge device for use with the invention should preferably be capable of functioning for up to about 5,000 in the high temperature environment of the exhaust stream of an internal combustion engine before replacement is required. Because of space limitations in modem automobiles, it is preferred that the corona discharge device have a small physical volume, i.e., on the order of the size of a typical spark plug, and a power supply for each corona discharge device that is no larger than about 1,500 cubic cm, preferably no larger than about 300 to about 400 cubic cm, and most preferably significantly smaller. In certain embodiments, in addition to operating at a temperature of at least about 850° C., with extremes of 1,000 to 1,100° C., the corona discharge device must meet automotive electromagnetic interference (EMI) requirements, be readily replaceable, and be capable of withstanding thousands of thermal swings of about 800° C. during start-up and cool down of the engine, as well as several million smaller thermal transients in which the change in temperature is on the order of about 200° C.

It is preferred that the power supplied to the corona discharge device operate at a high frequency, high voltage, the preferred range being from about 1,000 to about 1,000,000 Hz and from about 5,000 to about 30,000 V peak-to-peak. Most preferably the frequency will be from about 10 to about 30 kHz, and the voltage from about 10,000 to about 25,000 volts peak-to-peak. However, under some transient operating conditions, such as engine cold or warm starts, more radical production may be desired. In this case the corona device system may be operated at higher power levels than normally used, such as up to about 1,000 watts for short periods of time. This transient power condition can be met by increasing the frequency or voltage or both to the corona device by a factor of 5 to 10 for such periods, which may range from about 30 to about 100 sec. This can be accomplished through proper corona unit high voltage power system design, and the use of control signals from the engine controller or local startup temperature readings.

Figure 4:
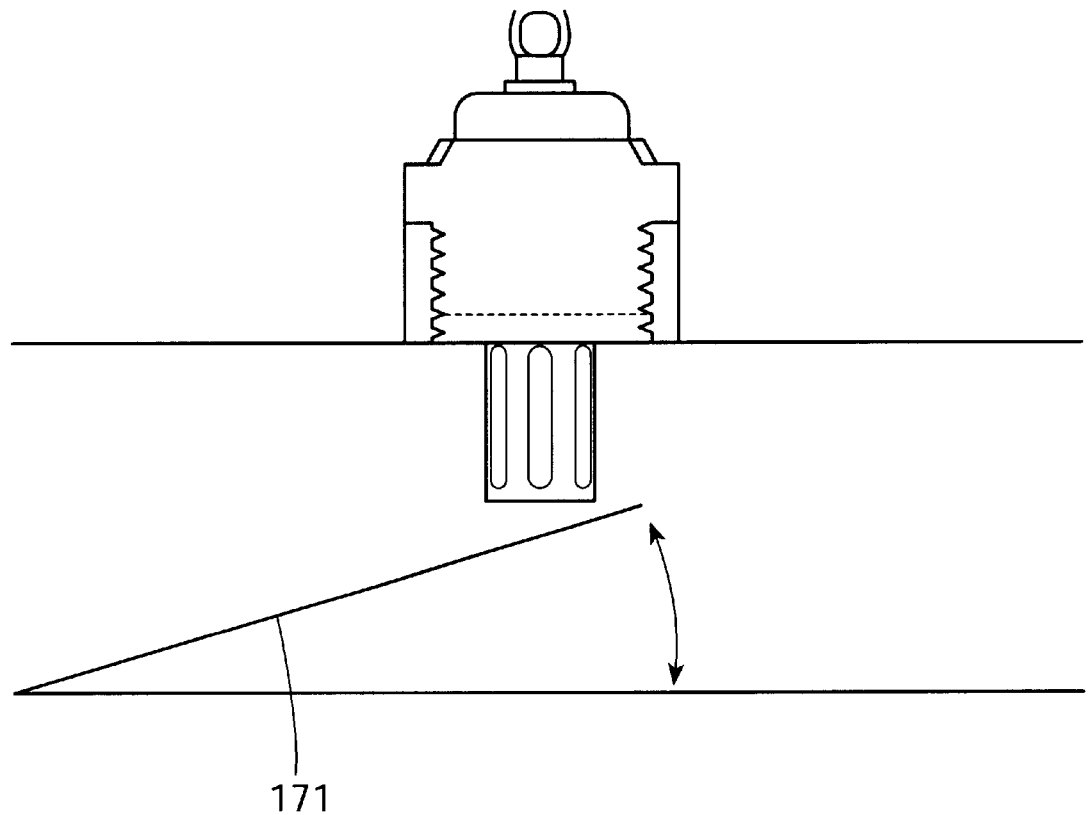
FIG. 4 illustrates a gas diverter used with an exhaust gas shunt.
Figure 5:
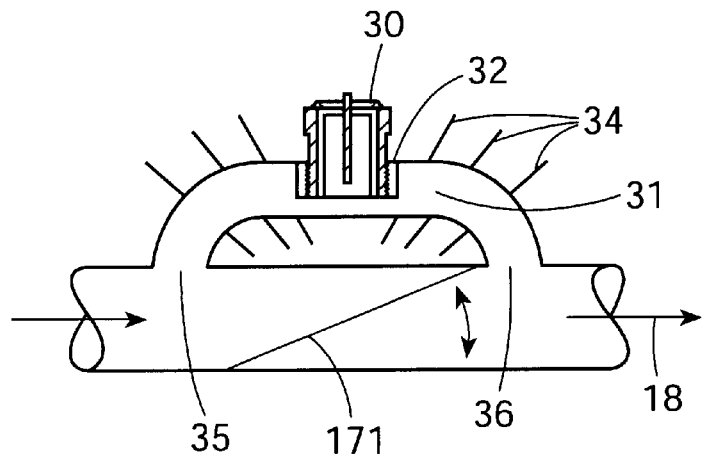
FIG. 5 illustrates a cold start gas diverter.

It is also anticipated that, during cold start operation, it may be desirable to expose a greater amount of the exhaust stream to the corona discharge produced by the corona discharge device. This may be accomplished by placing a cold start gas diverter 171 into the gas stream, as shown in FIGS. 4 and 5. This diverter 171 may be a simple flap in the exhaust stream that is positioned to divert a greater flow of gas through the corona discharge device when the exhaust system is cold. The diverter 171 may be controlled by electric servos or vacuum actuators and a temperature sensor. However, the diverter 171 may be most easily positioned by using a strip of bimetallic material. As the temperature of the exhaust system increases, one side of the bimetallic material will expand more than the other, causing the diverter 171 to open, as shown by the arrows in FIGS. 4 and 5, allowing more of the exhaust gas to pass through the main part of the exhaust pipe. Similarly, where a shunt 31 is used, such as that illustrated in FIGS. 3 and 5, the diverter 171 can be used to force a major portion of the exhaust gas through the shunt during cold start, but allow most of the gas to pass through the main pipe during normal operating conditions.

Furthermore, during certain portions of the cycle, e.g., where the engine is cold, it would be desirable to increase power to the corona discharge device to increase radical production, and, also, to increase thermal heating of the catalyst. This helps the catalyst to light off more rapidly. Moreover, a catalytic material may be added to the surface of at least one of the inner electrode, the outer electrode and the dielectric to promote reactions in and about the corona discharge device.

Figure 6:
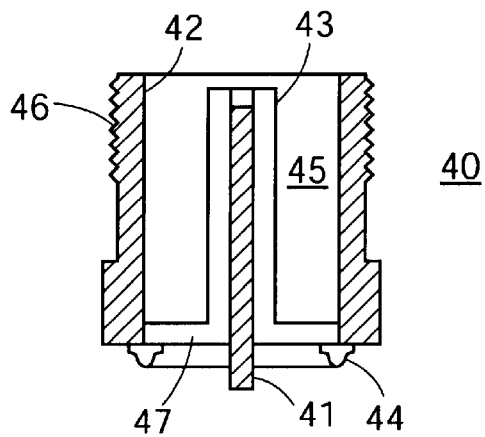
FIG. 6 illustrates a corona discharge device having concentric electrodes and a dielectric coated inner electrode.
Figure 7:
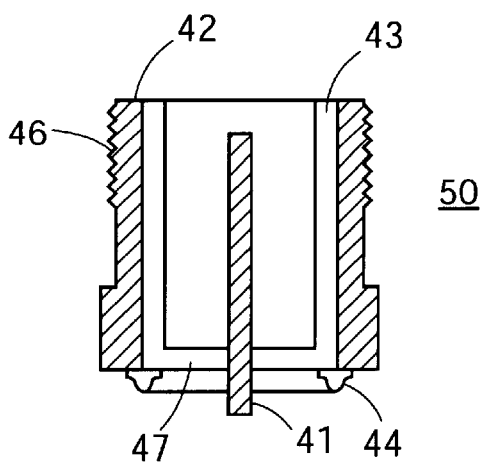
FIG. 7 illustrates a corona discharge device having concentric electrodes and a dielectric coated outer electrode.

Corona discharge devices useful in the invention include, but are not limited to, those having generally cylindrical symmetry and, in most cases, at least two concentric electrodes. Other useful configurations include parallel planer electrodes. At least three general design alternatives for corona discharge devices that have generally cylindrical symmetry exist. Three general design alternatives are illustrated in FIGS. 6 and 7. FIG. 6 is a cross-section of a cylindrical corona discharge device 40 having concentric cylindrical electrodes inner electrode 41 and outer electrode 42. The device 40 typically includes a ferrule 44 in the base 47, which provides a gas seal, and threads 46 or other means for mounting the device 40 in the exhaust pipe 12 or shunt 31. The inner electrode 41 is surrounded by a dielectric layer 43, which prevents breakdown, and maintains the corona discharge. It is important for the overall efficiency of the device to have the predominant voltage across the "air" gap 45 of the device. Because the dielectric layer 43 in the corona discharge device shown in FIG. 6 is located in a region where high electric fields occur, the dielectric constant of the layer should be in the range of from about 4 to about 10 to limit the voltage drop across the dielectric layer. As a result, most of the voltage is across the "air" gap of the corona discharge device, and the efficiency of the device is maintained.

Figure 53:
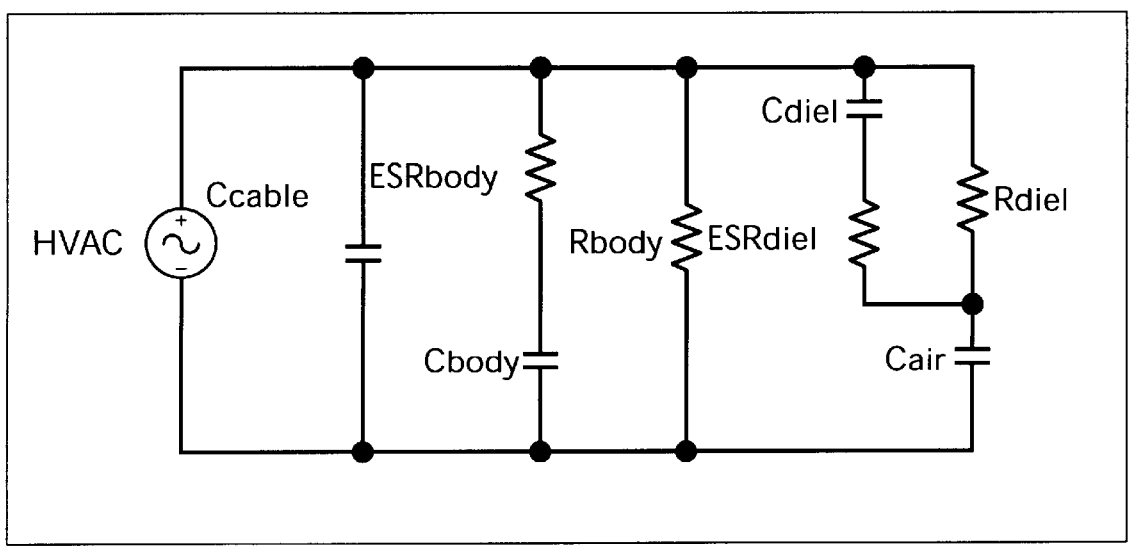
FIG. 53 is a schematic representation of a typical corona discharge device before breakdown.
Figure 54:
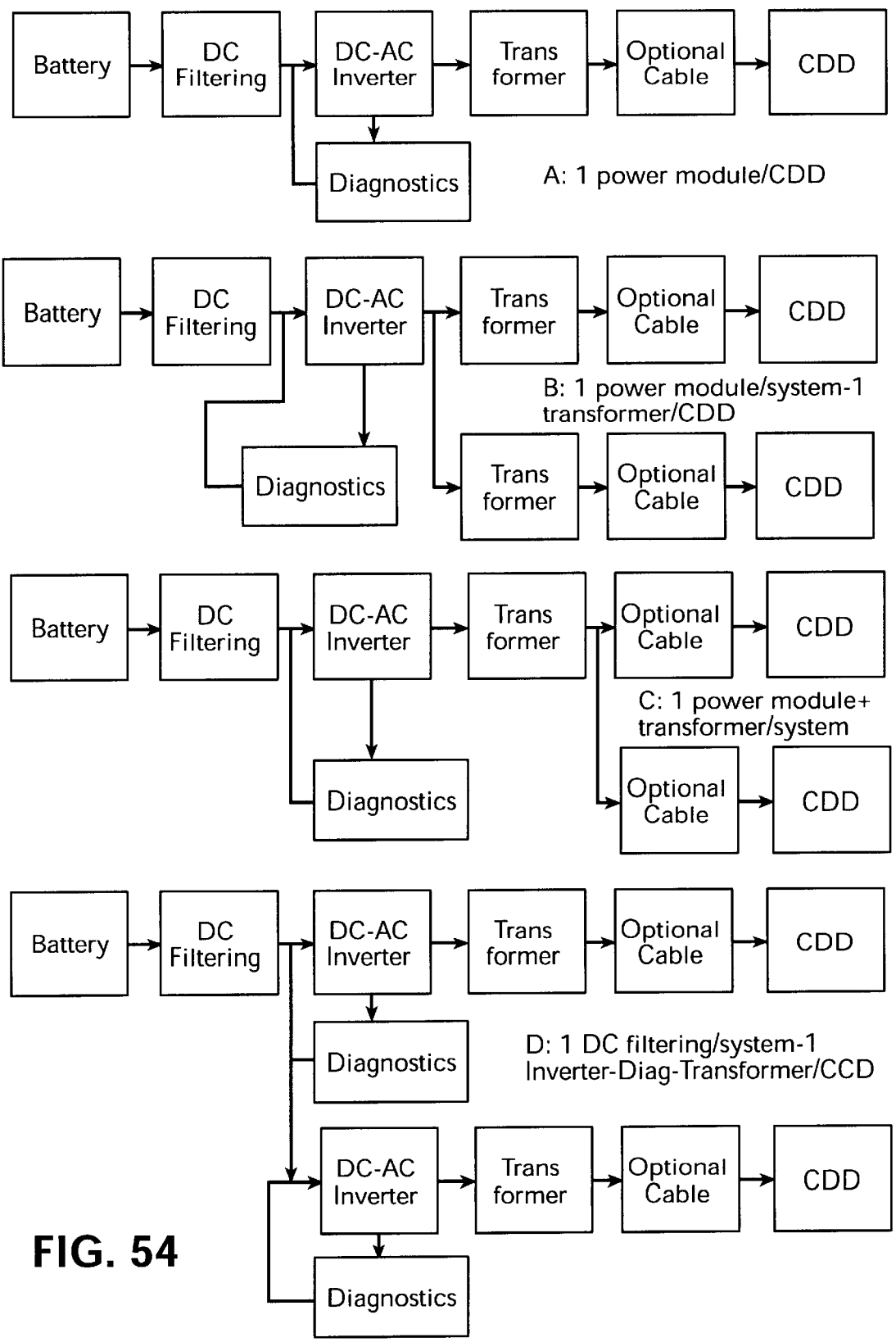
FIG. 54 is a schematic representation of various power supplies for driving more than one corona discharge device.

The schematic given in FIG. 53 is representative of a typical corona discharge device before breakdown. The body dielectric is defined as that portion of the dielectric that directly contacts the ground. This portion has a capacitance, an equivalent series resistance (ESR) that can be related to the dissipation factor (DF), and a parallel (shunt) resistance due to the finite resistivity of the material. The DF of a capacitor with capacitance C is defined as:

$$DF=ESR*(2\pi fC),$$

where f is the applied frequency.

The dielectric portion is the region of the dielectric that does not contact the ground, but instead contacts the corona region. Again, the dielectric has properties just as in the body region, however, a series capacitance due to the air gap is present in this region, not the In an ideal device, the ESR's=0, and the Rdiel=infinity. In practice, this is not the case, and the non-zero ESR and finite Rdiel create losses due to currents that flow them. These losses tend to increase as the temperature is increased. A dielectric material must be selected in which the losses are acceptably low, or the CDD must be operated in a chamber or shunt path off of the exhaust system to allow operation at a lower temperature.

Material selection should be based on high temperature behavior and the ability to withstand a corrosive environment that could limit the design life or performance of the device, e.g., high temperature diffusion of contaminants into the dielectric that could lower the resistivity of the dielectric below the required value for maximum efficiency, and possibly result in the formation of a partial or complete short circuit in the device. However, the corona discharge itself should naturally reduce or eliminate contamination of the device.

The principal difficulties with operation of compact corona discharge devices under the above high temperature/ fluctuating gas density conditions include: high temperature breakdown (failure) of the dielectric, surface breakdown around the edges of the dielectric, arcing from the high voltage electrode to the uncovered (by the dielectric) ground, resistive losses in the dielectric barrier, and the choice of design parameters to accommodate effective operation over a range of gas densities. Ceramics, which evidence good dielectric breakdown characteristics at normal temperatures, frequently exhibit poorer breakdown voltage characteristics at higher temperatures. Specifically, at temperatures greater than about 300° C., the breakdown voltage and the volume resistivity drop rapidly. The decrease in resistivity leads to larger power losses at high temperatures, and less efficient operation. Moreover, at the lower gas densities that occur at higher temperatures at a constant pressure, surface breakdown can become a problem, which is amplified in the presence of water vapor and soot. Water vapor is of course present in an amount of about ten percent in a typical combustion gas exhaust stream, which creates a potential problem during operation. Similarly, soot deposition can lead to surface breakdown problems.

Therefore, the dielectric used in the corona discharge device should have a high resistivity for satisfactory performance; preferably, greater than about $10^8$ Ohm-cm at 850° C. "Thermal runaway" occurs when the leakage current becomes so large that it heats the ceramic, which further causes the leakage current to increase, resulting in uncontrolled heating, which may result in catastrophic failure. For a resistivity of less than about $10^8$ Ohm-cm, leakage current can become significant, ultimately allowing the current to become sufficiently high as to induce self-heating, which results in "thermal run away".

The dielectric may be formed in any manner known in the art. For example, a solid piece of dielectric material, such as ceramic, may be machined into the proper form. In addition, the dielectric may be formed directly onto the surface of an electrode by anodizing a metal oxide onto the surface. Where the dielectric is an anodized layer, the electrode is preferably formed from stainless steel onto which an aluminum layer has been electroplated, although any metal having the required electrical properties and heat resistance may be used.

The need for a high dielectric constant can be reduced or eliminated by placing the dielectric layer 43 on the inner surface of the outer electrode 42. Such a device 50 is illustrated in FIG. 7. Because the electric fields that occur in the region of the outer electrode 42 are relatively low compared to those in the region of the center electrode 41, a dielectric material having a low dielectric constant, i.e., on the order of from about 2 to about 3, may be used for the dielectric layer. This reduces shunt capacitive losses, while maintaining a limited voltage drop across the dielectric layer.

Figure 8:
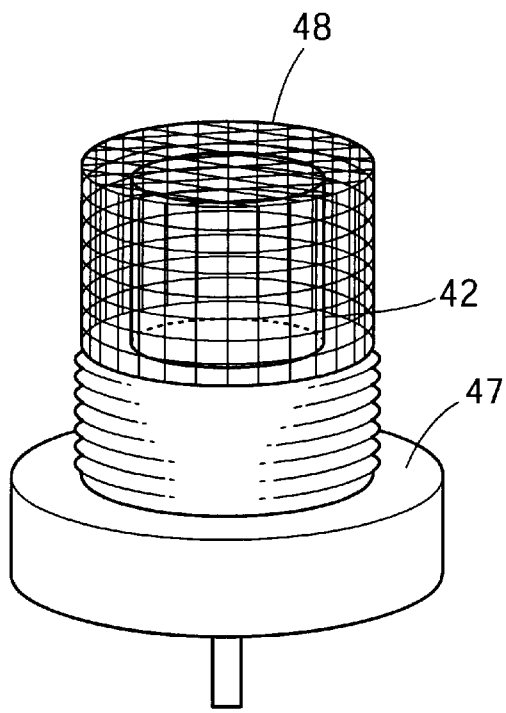
FIG. 8 illustrates a corona discharge device of the type depicted in FIG. 5 equipped with a flame arrester.

It may also be desirable in some applications to include one or more flame arresters in the design of the corona discharge device. Such a device is shown in FIG. 8, in which a corona discharge device 50 having an outer electrode 42 coated with a dielectric layer 43 is capped with a flame arrester 48 in the form of a wire screen. Such a flame arrester will prevent the ignition of exhaust gases containing fuel and oxygen during engine starts and misfires.

However, in some applications, the ignition of exhaust gases to initiate partial or complete combustion of residual fuel in the exhaust gases is desirable, thereby reducing harmful emissions, such as, e.g., during the cold start phase of the engine operation or under conditions where the engine misfires.

Under conditions where the engine misfires, the fuel air mixture will be substantially stoichiometric, and no additional air is required to initiate combustion of the resulting exhaust gas. However, to initiate combustion of the residual fuel in the exhaust during cold start conditions, additional air must be added to the exhaust gas stream upstream of the corona discharge device, as the exhaust gases are fuel rich under those conditions. The oxygen required for combustion can be provided through controlled injection of air, either by self pumping, such as through the pumping action of a Venturi section in the exhaust pipe, or by an upstream air pump. With a Venturi, a fast acting valve, such as an electromechanical valve or a valve based on MEMS (Micro Mechanical-Electronic Systems) technology would be required to terminate the air injection after the cold start period was complete. The rate of air injection is limited with a Venturi, and, thus, only partial combustion of residual fuel is possible with Venturi pumping. However, an air pump is not subject to such a limitation, and can provide sufficient air for complete combustion of any residual fuel in the exhaust gas stream.

Where the ignition of exhaust gases by the corona discharge is desired, it may also be desirable to use flame arresters, such as wire screen to control or limit the regions of the exhaust stream in which corona assisted combustion could occur to any of, e.g., upstream of the corona discharge device, downstream of the device, both upstream and downstream of the device, or in a limited volume in and around the corona discharge device.

The corona discharge devices shown in FIGS. 6 and 7 are sparkplug-like devices, having a small center electrode 41 with a diameter of about 0.1 to about 0.3 cm. The inner electrode 41, is inserted into and held in place by a hole in the dielectric layer 43 in the base 47. In devices where the dielectric layer 43 is positioned on the inner surface of the outer electrode 42, the dielectric layer 43 basically forms a cup having a hole in its base to position the inner electrode. The outer electrode has an inner diameter of about 1 to about 2 cm and a length of about 1.5 to 3 cm. The dielectric layer has a base and wall thickness of about 1 to about 3 mm, which is chosen to provide the desired dielectric strength at the operating voltage of the corona discharge device.

The dielectric layer adjacent to the interior wall of the outer electrode and the "air gap" between the dielectric layer and the inner electrode are essentially two series capacitances. For an arbitrary waveform, the average power dissipation in the corona is expressed as $$P = 4fC_{dtot}V_{br}(V_{pk} - V_{br}(C_a + C_{dtot})/C_{dtot}),$$

where f is the AC frequency of the applied sinusoidal voltage in Hertz, $C_{dtot}$ is the total series capacitance of the dielectric barriers used in the corona discharge device, $V_{br}$ is the breakdown voltage of the air gap of the device, $V_{pk}$ is the peak AC voltage, and $C_a$ is the capacitance of the air gap.

This means that a very compact, replaceable corona discharge unit can be produced, having the required power level.

The outer surface of the outer electrode is typically used to mount the corona discharge device in the exhaust pipe or manifold, an exhaust shunt path, in an anterior chamber to the exhaust pipe, a mounting plate on or in one of these devices, or any other simple means of mounting the corona discharge device that provides a good exhaust gas seal. This simple mounting scheme allows easy removal and installation of the corona discharge device in the exhaust system, and with a shunt path or slight recess in the exhaust system represents little or no interference to the main exhaust flow.

In each case, the corona discharge device is preferably placed in the exhaust gas of the engine, so that the desired free radicals are produced directly from water and oxygen in the exhaust.

The condensation of water during cool down could result in a short out of the corona discharge device, and, thus, the device is preferably mounted in the top of the exhaust pipe, so that the electrodes face down, minimizing the exposure to water during those times when the temperature is too low to drive off any water. In addition, vibration problems may be avoided by designing the device and its power supply and wiring to have natural resonant frequencies well above automobile vibrational frequencies.

Figure 9:
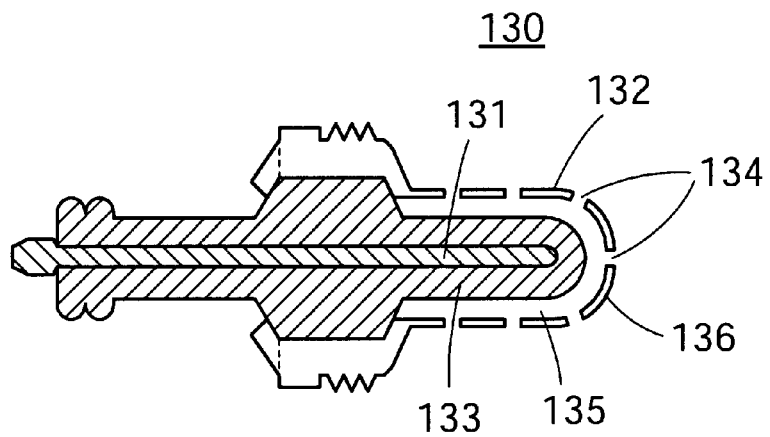
FIG. 9 is a cross section of a preferred embodiment of the corona discharge device of the invention.
Figure 10:
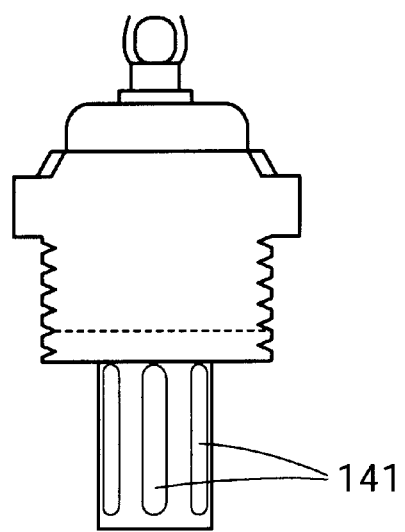
FIG. 10 illustrates a corona discharge device having slots for the exchange of gas between the corona discharge and the gas stream.
Figure 11A:
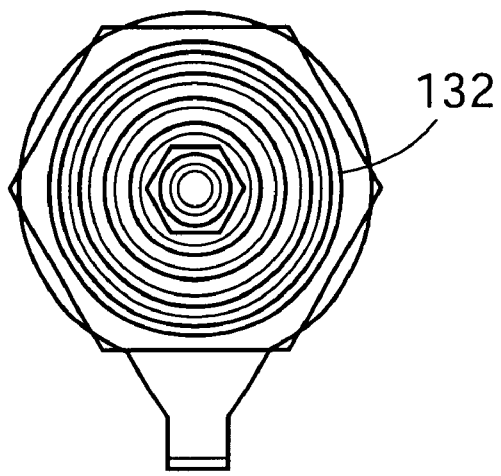
FIG. 11 is a corona discharge device having a configuration similar to an oxygen sensor.
Figure 11B:
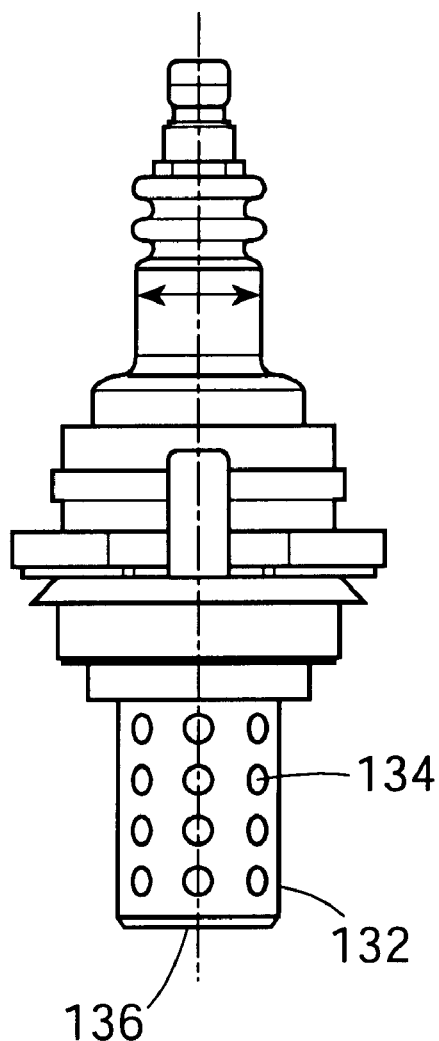

FIG. 9 is a cross section of an embodiment of the corona discharge device 130 of the invention. As with the corona discharge device shown in FIG. 6, the corona discharge device illustrated in FIG. 9 comprises generally cylindrical concentric electrodes 131 and 132 and at least one dielectric layer 133 between inner electrode 131 and outer electrode 132, which, again, prevents point breakdown and maintains the corona discharge. In this embodiment, outer electrode 132 is a perforated metal cylinder, where the perforations 134 may be of any form that allows for a sufficient amount of gas to pass through the perforations 134, and enter the corona discharge region 135. Preferably, as shown in FIG. 10, the perforations are in the form of slots 141. The end 136 of the corona discharge device 130 may be open in the manner illustrated in FIG. 6, but is preferably closed, as shown in FIG. 9. Most preferably, as shown in FIG. 9, the end 136 of corona discharge device 130 is curved in a manner that matches any curvature at the end of inner electrode 131. That is, the curvature of the end 136 of outer electrode 132 is substantially parallel to that of the end of inner electrode 131. A further embodiment of the corona discharge device shown in FIGS. 9 and 10 is shown in FIG. 11. The corona discharge device shown in FIG. 11 is similar in configuration to an oxygen sensor, having an outer electrode 132 that is a perforated metal cylinder, where the perforations 134 are a series of round holes, and the end 136 is open.

Figure 12:
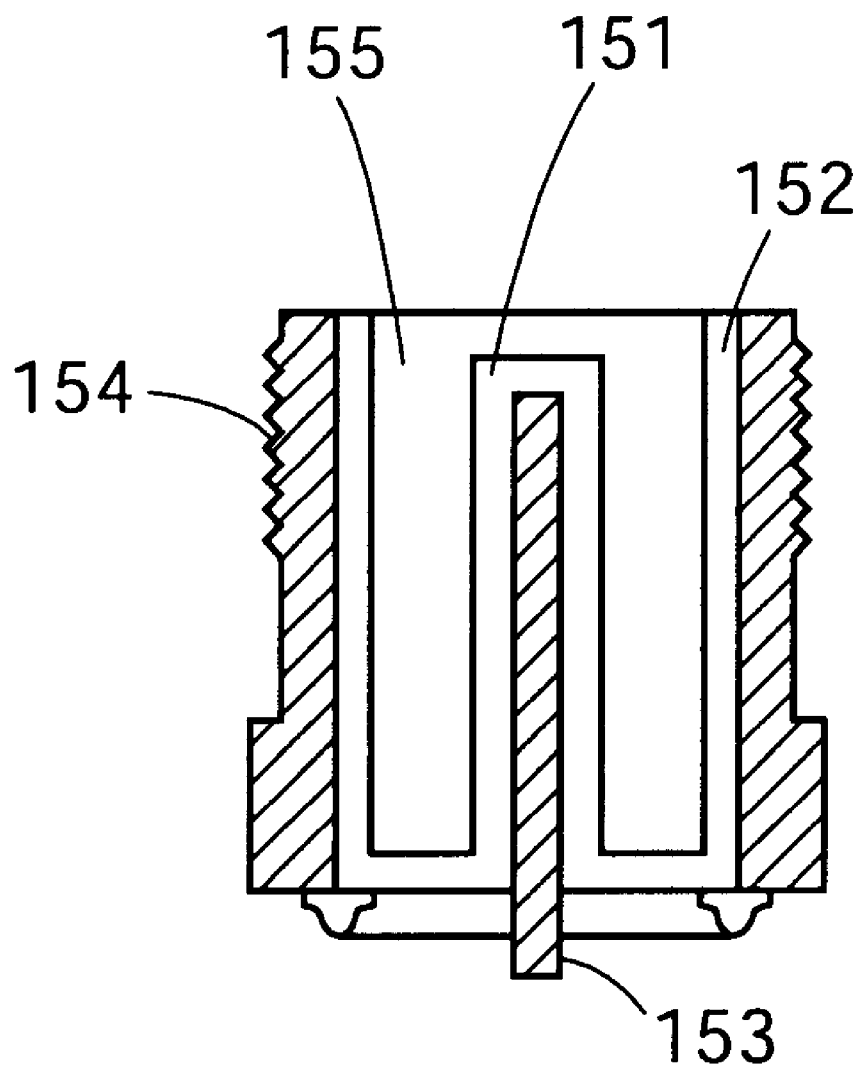
FIG. 12 illustrate a corona discharge device having dielectric material adjacent to both the inner electrode and the inner surface of outer electrode.

As with the other embodiments of the corona discharge device described above, the dielectric layer may be placed adjacent to either the inner electrode, as shown in FIG. 6 or the inner surface of the outer electrode, as shown in FIG. 7. In a preferred embodiment, two layers of dielectric 151 and 152 are used as shown in FIG. 12. In this embodiment, a first dielectric 151 is placed adjacent to, and preferably covers all of inner electrode 153. In addition, a second dielectric 152 is placed adjacent to the inner surface of outer electrode 154, such that the air gap 155 required to form the corona discharge is formed between the two dielectrics.

Figure 13:
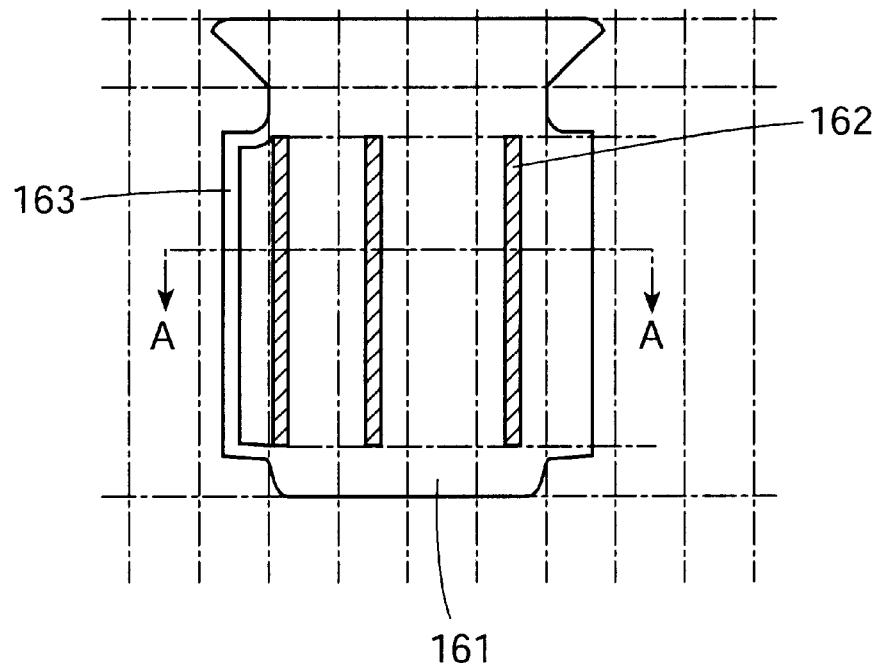
FIG. 13 illustrates an outer electrode having louvers to enhance the exchange of gas.
Figure 13A:
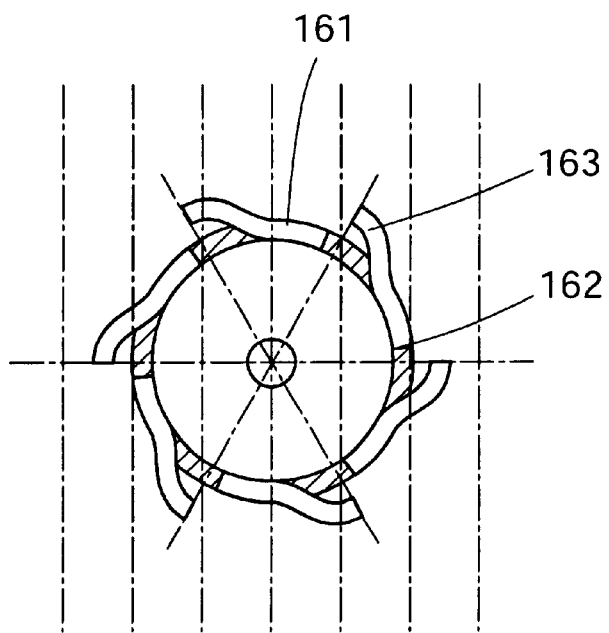

In a further embodiment of the corona discharge device, as shown in FIG. 13, the slots 162 in the outer electrode 161 may have louvers 163. The louvers 163 help to direct gas through the slots 162 and into the corona discharge device, enhancing the exchange of gas. Because the louvers 163 may make the operation of corona discharge device sensitive to its position within the gas stream, the corona discharge device may not include threads 46 shown in FIGS. 6 and 7. Instead, the corona discharge device may use an indexing device, such as a pin to align the corona discharge device properly. A cap nut or other securing device, such as a spring clamp, may then be placed over the corona discharge device and screwed into place on a mounting to hold the corona discharge device in place.

To reduce electrical noise, which could otherwise interfere with the electronics of the vehicle, an added resistor may be placed in series between the power supply, preferably as described below and near the corona discharge, and the inner electrode. Also, the power supply may be attached directly to or integrated with the corona discharge device, thereby eliminating or reducing the need for a power cable to carry the high frequency electrical power to the corona discharge device.

As discussed above, the resistive and capacitive shunt losses of the dielectric layer used to provide an insulating support between the two electrodes of a corona discharge device are a major consideration in the design of such a device. Any reduction in shunt capacitance allows operation of the discharge at higher frequencies at a given capacitive power loss, and, according to basic design principles for a corona device having a power output proportional to the frequency of the applied voltage, would allow a more compact design. A more compact design is advantageous in that it allows the use of a smaller corona gap, which, in turn, results in a lower breakdown voltage across the gap, and, thus, allows the use of a lower operating voltage. The lower operating voltage results in lower resistive and capacitive losses, increasing the efficiency of the corona discharge device. The smaller, more efficient corona discharge device will thus require a smaller power supply, which is a major advantage in modern vehicles where space is at a premium.

Figure 14:
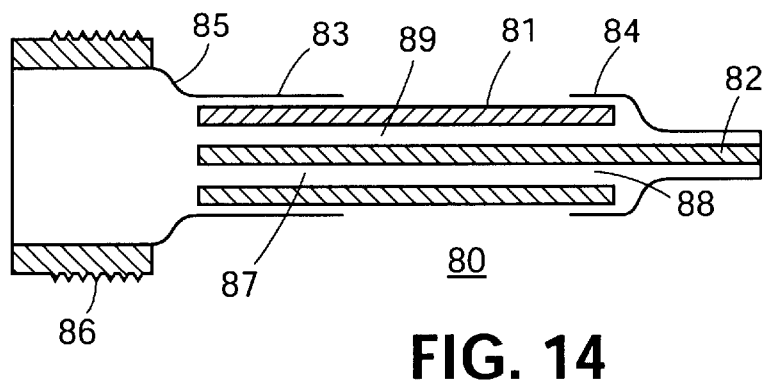
FIG. 14 illustrates a compact corona discharge device.

A representative design for such a compact corona discharge device is shown in FIG. 14. FIG. 14 illustrates the physical components of an efficient compact corona discharge device 80, as well as the important device operating and device design regions. The illustration, as well as the dimensions given below, is merely representative of a generic design, and one of ordinary skill in the art will recognize that many variants that fall within the scope of the general design principles illustrated and discussed here.

The key features of the embodiment illustrated in FIG. 14 include a long, thin-walled dielectric insulator 81 that, along with the proper selection of materials, provides a path of high resistance between the inner 82 and outer 83 electrodes that are supported by the insulator 81. A thin metal cap 84 is provided as a gas seal. The inner electrode 82 is typically substantially longer than the outer electrode 83, having a length that is at least about twice that of the outer electrode 83, and, preferably, at least about 4 times the length of the outer electrode 83. The outer electrode 83 is mechanically and electrically connected to the base 85 of the compact corona discharge device 80, where the base includes threads 86 or other similar mounting means to mount the device 80, such that exhaust gases may enter into the air gap 89. As a result of the difference in the length of the inner and outer electrodes 82 and 83, the air gap 89 is divided into a corona discharge region 87, i.e., that part of the air gap 89 where the inner and outer electrodes overlap, and a ullage volume 88, i.e., that portion of the air gap 89 that extends from the outer electrode 83 to the metal cap 84.

A typical compact discharge device 80 may have an outer electrode 83 with a length of about 1 to about 2 cm, preferably about 1.5 cm, and an inner electrode 82 with a length of about 4 to about 8 cm, preferably about 5 to about 7 cm, most preferably about 6 cm. The dielectric insulator 81 of such a device can be constructed from a ceramic material such as Fosterite or alumina, and will have a diameter of about 0.7 to about 1.3 cm, preferably about 1 cm, a length of about 3 to about 5 cm, preferably about 4 cm, and a thickness of about 0.1 to about 0.2 cm, preferably about 0.15 cm, can be used at a temperature of up to about 900° C. with resistive power losses of less than about 10 percent at a operating voltage of greater than about 5,000 V. In a relatively low temperature environment, such as that in an exhaust shunt, and because of the temperature variation along the ceramic dielectric insulator 81, an even higher operating voltage is possible, while maintaining an acceptable power loss. A corona discharge device system of this compact design would preferably operate with about 10 to about 25 W of continuous power operating at a frequency of about 15 kHz. However, under some transient operating conditions, such as engine cold or warm starts, more radical production may be desired. In this case, the corona device would require operation at higher power levels of up to 200 to 300 watts for a short period of time. This transient power condition can be met by increasing the frequency or voltage or both to the corona device by a factor of 5 to 10 for such periods, which typically range from about 30 to 100 sec. This can be accomplished through proper corona unit high voltage power system design and the use of control signals from the engine controller or local startup temperature readings. The long insulating path and thin walls of the insulator 81, minimize the capacitive shunt losses to less than about 10%, even for insulators having a dielectric constant of more than 10 at operating frequencies on the order of about 100 kHz. Such a high operating frequency allows the use of a very compact high voltage power supply.

As discussed above, the expression for the power dissipation in a corona is given by $$P = 4C_d \cdot V_s \cdot f \{ V_o - ((C_d + C_g)/C_d) \cdot V_s \},$$

where $C_d$ and $C_g$ are respectively the capacitance of the dielectric and the gap in the corona region, $V_s$ and $V_o$ are respectively the spark breakdown voltage of the gap and the applied peak voltage to the corona device, and f is the frequency of the voltage applied to the device. Taking values of these quantities as $V_o = 5,000$ V, $V_s = 3,000$ V, $C_d = 6 \times 10^{-12}$ farad, $C_g = 1 \times 10^{-12}$ farad; then at a frequency of $3 \times 10^5$ Hz, the power in the corona is about 27 W. The output can be scaled by frequency, applied voltage, or dielectric capacitance, e.g., by increasing the length of the corona discharge region. The output can be controlled by the frequency and/or voltage of the corona device power source.

Figure 15:
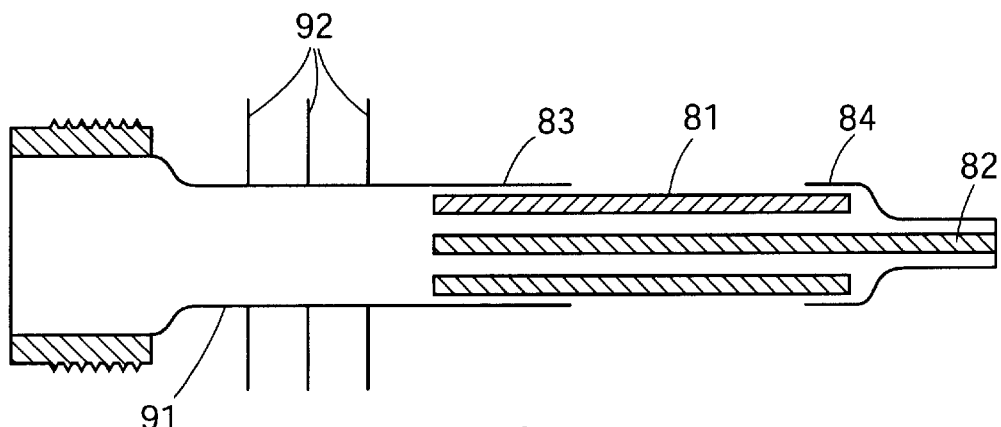
FIG. 15 illustrates a compact corona discharge device having an extended skirt.
Figure 16:
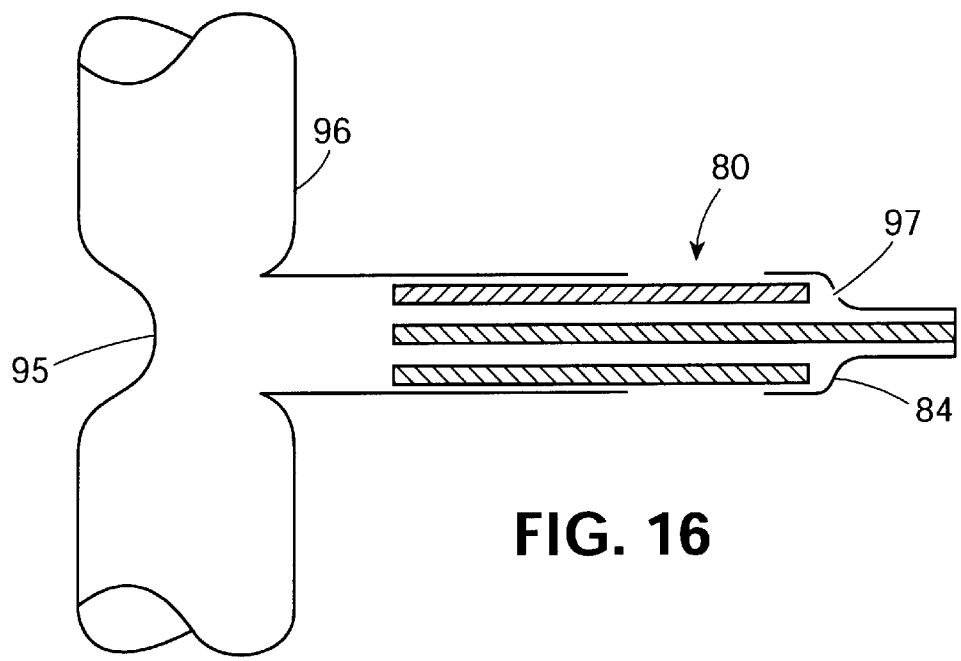
FIG. 16 illustrates a compact corona discharge device equipped with an orifice for injecting air.

The spark breakdown voltage is almost directly proportional to the density of the exhaust gas in the corona gap region, which is almost directly proportional to the temperature in the gap region. This breakdown voltage will vary in proportion to the temperature of the gas in the corona unit, and, therefore, its operating temperature. If, for example, the design were such that the gas temperature in the corona unit were half of the exhaust temperature, then the lower breakdown voltage would increase to 6,000V. FIGS. 15 and 16 show two design variants on the above design. In FIG. 15 the skirt section 91 is lengthened and extended surfaces 92 are employed to augment heat exchange to the ambient environment. The longer conduction path along with the heat exchangers provide for cooler operation of the dielectric material 81 in particular, thus providing for a wider selection of materials or better performance for this application with satisfactory resistance and capacitance at the resulting operating temperature. It has also been observed in tests that the injection of small amounts of air (<10 cc/sec) upstream of the engine side oxygen sensor results in no perceptible adverse engine performance or engine/catalyst emission performance. In FIG. 16 a pumping action is provided by the low pressure produced in a Venturi section 95 added to the exhaust system 96. This low pressure in conjunction with the orifice 97 in the metal cap 84 of the compact corona discharge device 80 provides for an air flow of less than about 10 cc/sec, which limits the temperature, which cools the ceramic dielectric section of the corona device, and aids in the injection of radicals generated in the corona discharge.

Figure 17:
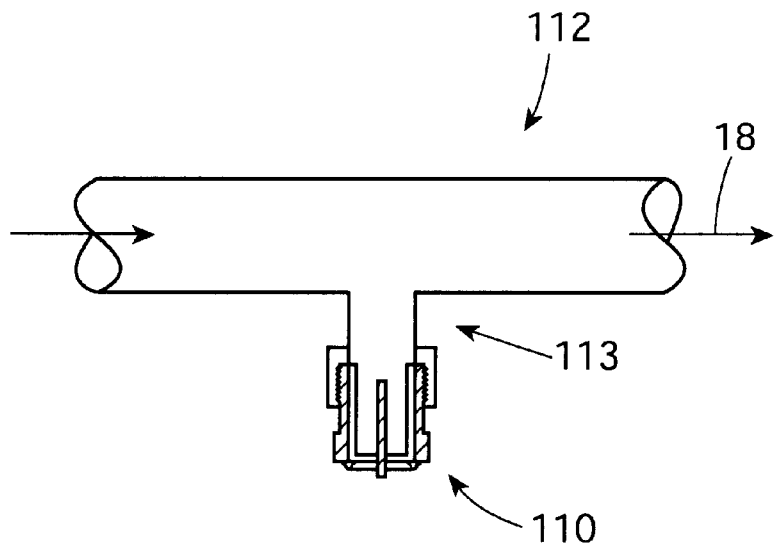
FIG. 17 illustrates a corona discharge device mounted in a manner that takes advantage of the pumping action of pressure variations in the exhaust gas stream.
Figure 18:
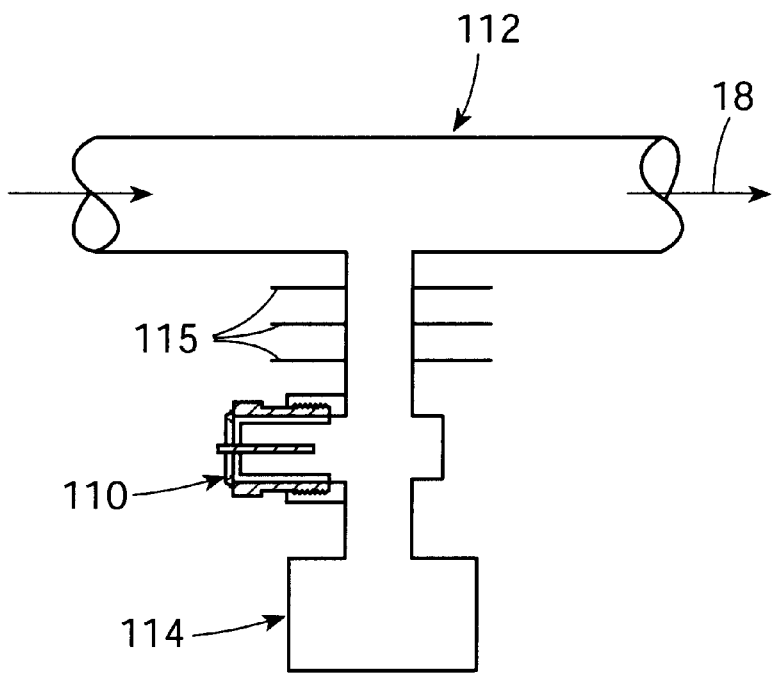
FIG. 18 illustrates a corona discharge device mounted in conjunction with a plenum that augments the pumping action of pressure variations in the exhaust gas stream.

Under normal operating conditions, the engine produces exhaust gas pressure oscillations having a frequency of about 30 to about 100 Hz and a peak to peak variation of about 20 to about 80%, depending upon the location in the exhaust system. These pressure oscillations in conjunction with the ullage volume 88 provide an effective, continuous pumping action of the radicals and other species produced in the corona discharge into the exhaust stream. The pumping effect of the exhaust gas pumping oscillations may be used with any of the corona discharge devices described above, such as in FIG. 17, where the discharge device 110 is installed on a simple "T" 113 off the side of the exhaust pipe 112 at a point on the exhaust pipe 112 where the oscillations occur. The pumping effect and the total gas motion can be augmented with a plenum 114 as shown in FIG. 18. In addition, cooling fins 116 may be added to lower the operating temperature for the discharge device 110. As noted above, a cooler operating environment improves the efficiency of the corona discharge.

Figure 19:
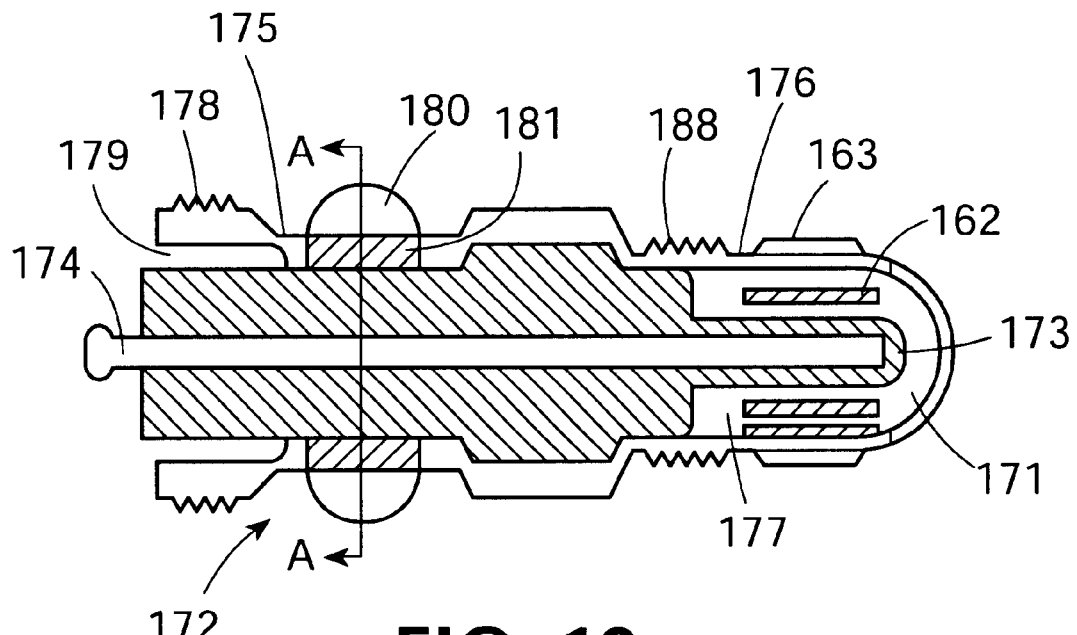
FIG. 19 illustrates a cross-section of a corona discharge device which has a shroud.
Figure 20:
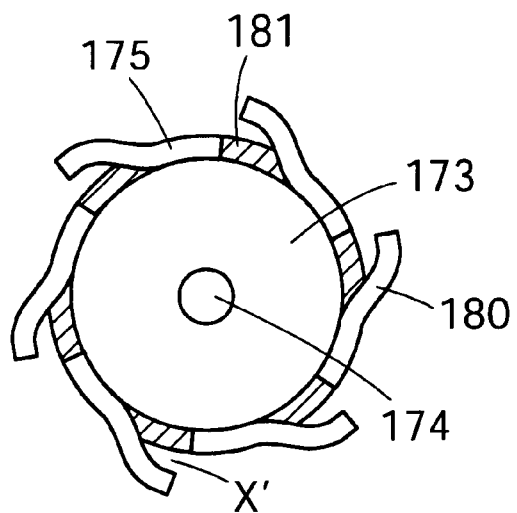
FIG. 20 is a cross-section of the corona discharge device of FIG. 23 taken along line A—A.

FIGS. 19 and 20 show another embodiment of a compact discharge device 172 which includes a shroud or cover 175 which protects the compact discharge from its hostile environment, and further controls electro-magnetic interference (EMI) due to operation of the corona discharge device. Shroud 175 is typically metal such as for example stainless steel, and covers the outside of the corona discharge device and is in electrical and physical contact with outer or ground electrode 176. Outer electrode 176 optionally may include slots 162 and louvers 163 as described above in connection with FIG. 13. Compact discharge device 170 includes a center electrode 174 with dielectric layer 173 and a gap 177 between the dielectric layer 173 and outer electrode 176 at the end 171. The corona discharge device 172 also may include a second dielectric layer as illustrated in FIG. 12 or dielectric layer 173 optionally may be included on outer electrode 176 as opposed to center electrode 174 as shown in FIG. 19. End 171 may be open as illustrated in FIG. 19 or closed as shown in FIG. 9. The corona discharge device 172 optionally may include threads 188 or other means for mounting the device.

Shroud or cover 175 also may include threads 178 or other means for making electrical connection to a power source. A gap 179 may be provided under threads 178 where the electrical connection is made in order to accommodate an insulator (not shown) which is part of the electrical connector (not shown). While shroud or cover 175 protects the corona discharge device from its environment which includes vibration, impact, high temperatures, rapid temperature change, and environmental elements such as for example, dirt, water, salt, etc., if constructed of metal or other materials which are conductors of heat, the electrical connection will be subjected to high temperatures which may be detrimental.

In order to protect the electrical connector from high temperatures the shroud or cover 175 should be made as thin as possible since heat traveling by conduction through the shroud is a function of its cross-sectional area. In addition, the surface area of the shroud or cover 175 should be increased to increase heat rejection through convection. Optional cooling fins as illustrated in FIG. 15 may be included on the shroud. It has been found that one exemplary way to lower the temperature at the electrical connector is to create louvers 180 out of and gaps 181 in the thin shroud or cover 175 by cutting the shroud and bending portions of it out to create extending louvers. Holes or gaps 181 also could be formed in the shroud with pieces of material connected at the gap edges to form the louvers 180. In this manner, there is less cross-sectional area for heat conduction through the shroud to the electrical connector because of the gaps and at the same time the louvers increase the surface area by acting as cooling fins which increase heat rejection through convection. When creating louvers in the shroud of the corona discharge device care should be taken to minimize the distance x' that the louvers extend so as to control electromagnetic interference (EMI). It is contemplated that the shroud 175, with or without the gaps or louvers, can be incorporated into corona discharge device embodiments other than as illustrated in FIGS. 19 and 20.

Preferably, the temperature of the upper part of the corona discharge is minimized, where 'the upper part' refers to that part of a corona discharge device that is not positioned within the gas stream, such as that found within a vehicle exhaust pipe. Due to constraints on the cable material used to provide power to the corona discharge device, the temperature of the corona discharge device where the power cable is connected is preferably less than about 225° C.

Figure 21:
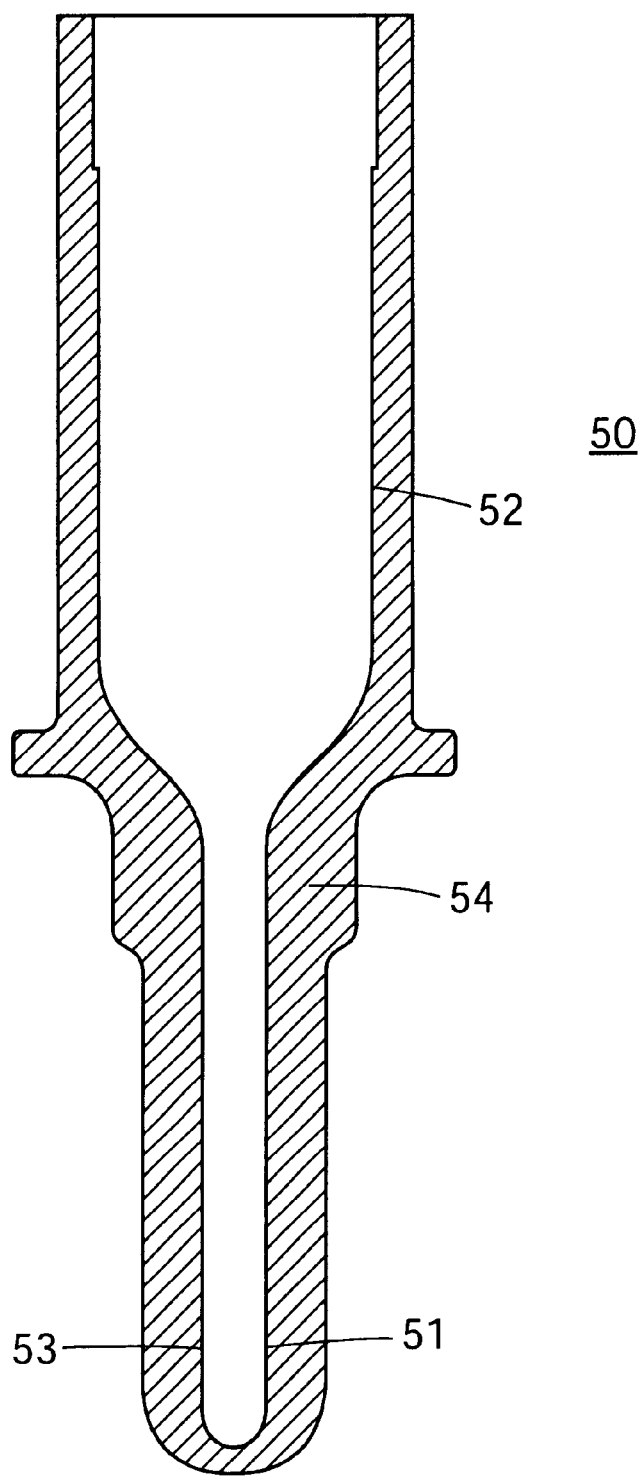
FIG. 21 is a metallized electrode.
Figure 22:
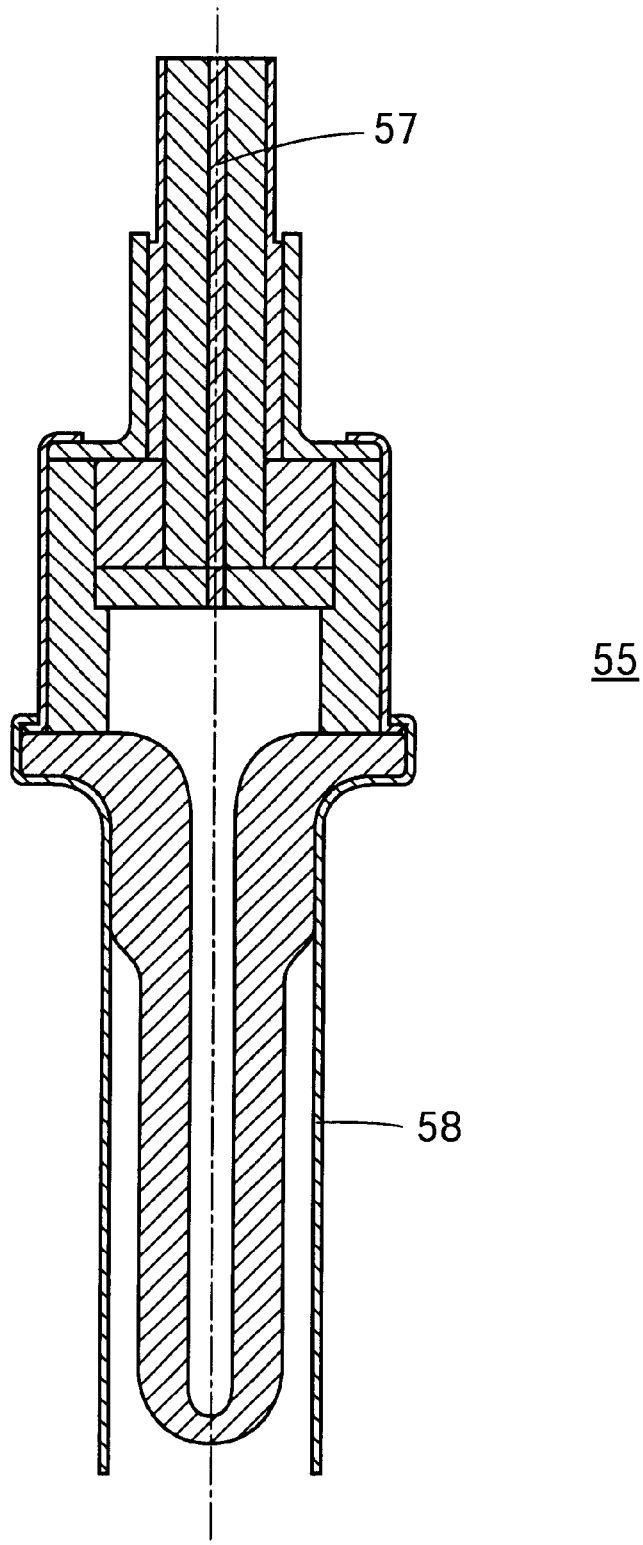
FIG. 22 is a corona discharge device having a metallized electrode.

FIG. 21 illustrates a metallized dielectric 50 that lowers the temperature of the upper part of a corona discharge device. The electrode 51 is formed by metallizing, i.e., applying a thin layer of metal 52, to the inner surface 53 of the dielectric 54. An example of a corona discharge device using a metallized dielectric as the high voltage electrode is illustrated in FIG. 22. The corona discharge device 55 illustrated in FIG. 22 comprises a internally metallized hollow ceramic inner electrode 56 in electrical contact with a high voltage lead 57 and a grounded outer electrode 58.

Metallization provides several benefits both thermally and electrically. The metallization has a larger thermal resistance than either rod or tubular electrodes. It also prevents air gaps between the internal electrode and surrounding dielectric. The corona that forms in this region is parasitic in nature, since it does not produce radicals in the exhaust. The metallization reduces the need for highly accurate tolerances for these air gaps, lowering the system cost. Being a thin layer, the radial expansion of the metallization layer is minor, and the difference in expansion between the layer and the dielectric is small. This minimizes the mechanical stress on the ceramic in the radial direction.

In addition, metallization can also lower the material cost of the corona discharge device by allowing a shorter electrode to be used, and allows for an easier connection from the cable to the center of the dielectric, since the electrode need only touch the metallization at one point.

Figure 23:
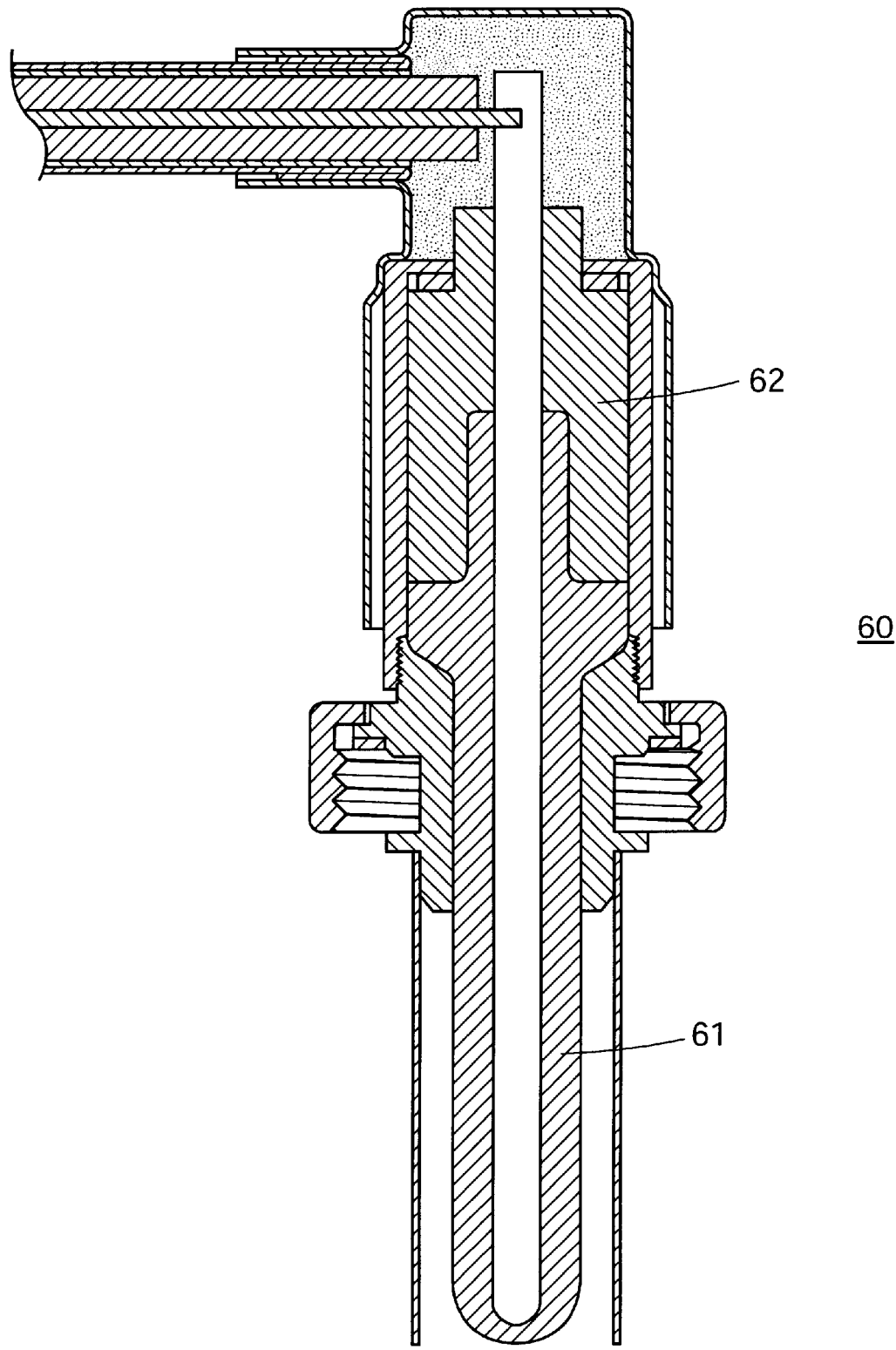
FIG. 23 is a corona discharge device having a two piece ceramic dielectric.

FIG. 23 illustrates a corona discharge device 60 having a two piece ceramic construction that can also be used to increase the thermal resistance of the corona discharge device. The two piece construction comprises a lower piece of dielectric 61 and a second, upper piece of dielectric 62. The lower piece of dielectric 61 is exposed to the exhaust gas, and is typically formed from a high quality alumina, having the electrical characteristics required for temperatures on the order of 850° C. The second, upper piece of dielectric 62 has a low thermal conductivity and the necessary electrical and thermal expansion properties for proper corona discharge device operation, and is positioned above the lower piece of dielectric 61. A material such as L5 or L6 steatite that has a thermal conductivity that is a factor of ten lower than that of the lower piece of dielectric 61, but a similar coefficient of thermal expansion and good electrical properties to 600° C., is preferable for the upper piece of dielectric 62.

The factor of ten lower thermal conductivity of the steatite is a major advantage. The ceramic acts as a thermal barrier, trapping the heat below itself, and, assuming the alumina has good contact to a convecting surface, the temperature of the upper area of the steatite will be lowered considerably. The pieces of alumina and steatite can be attached through a ceramic adhesive, or by simply pressing them together in a geometry that minimizes the probability of surface tracking. The adhesive is preferred for strength and durability, but pressing is more cost effective.

Figure 24:
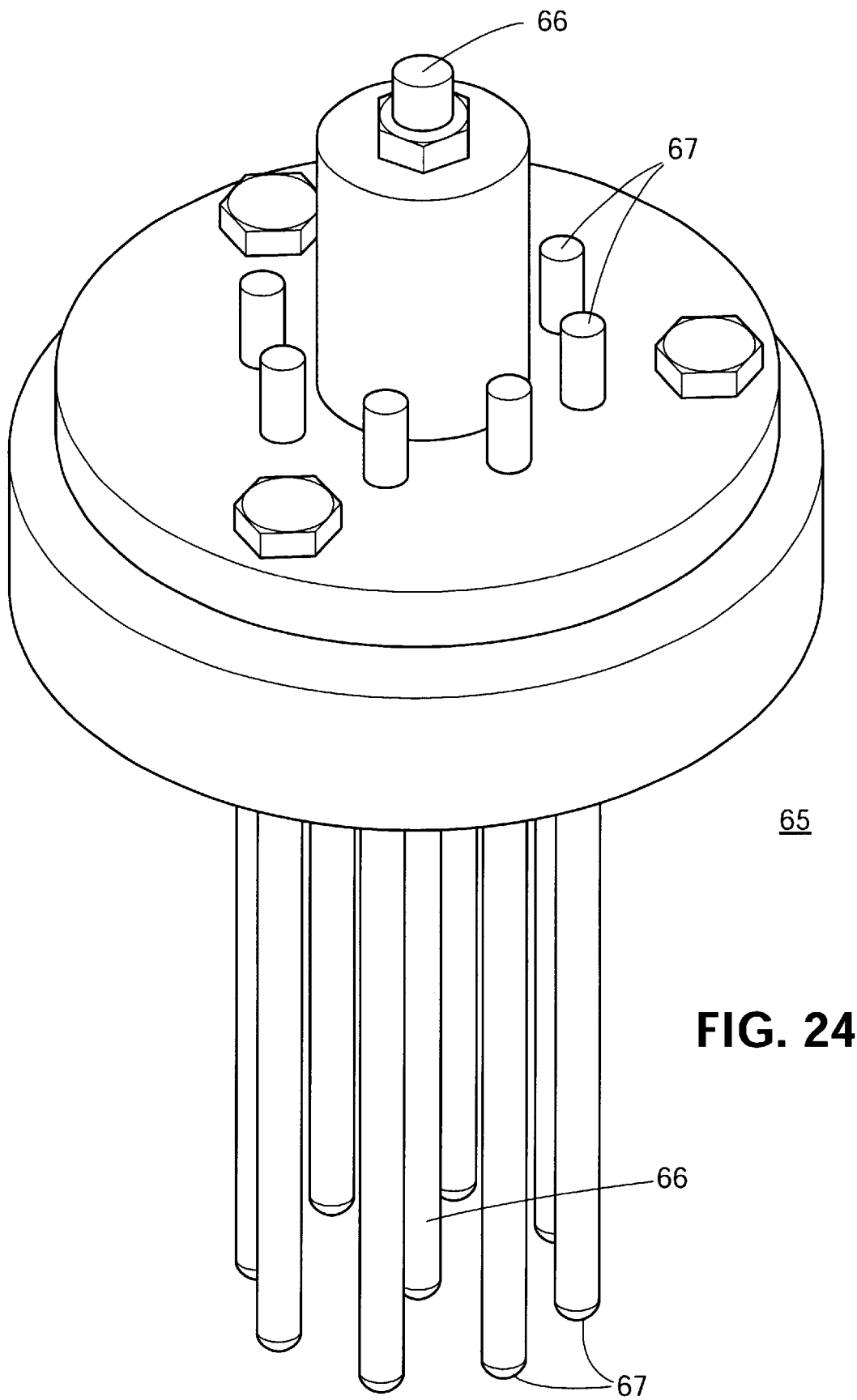
FIG. 24 is a tube cage corona discharge device.
Figure 25:
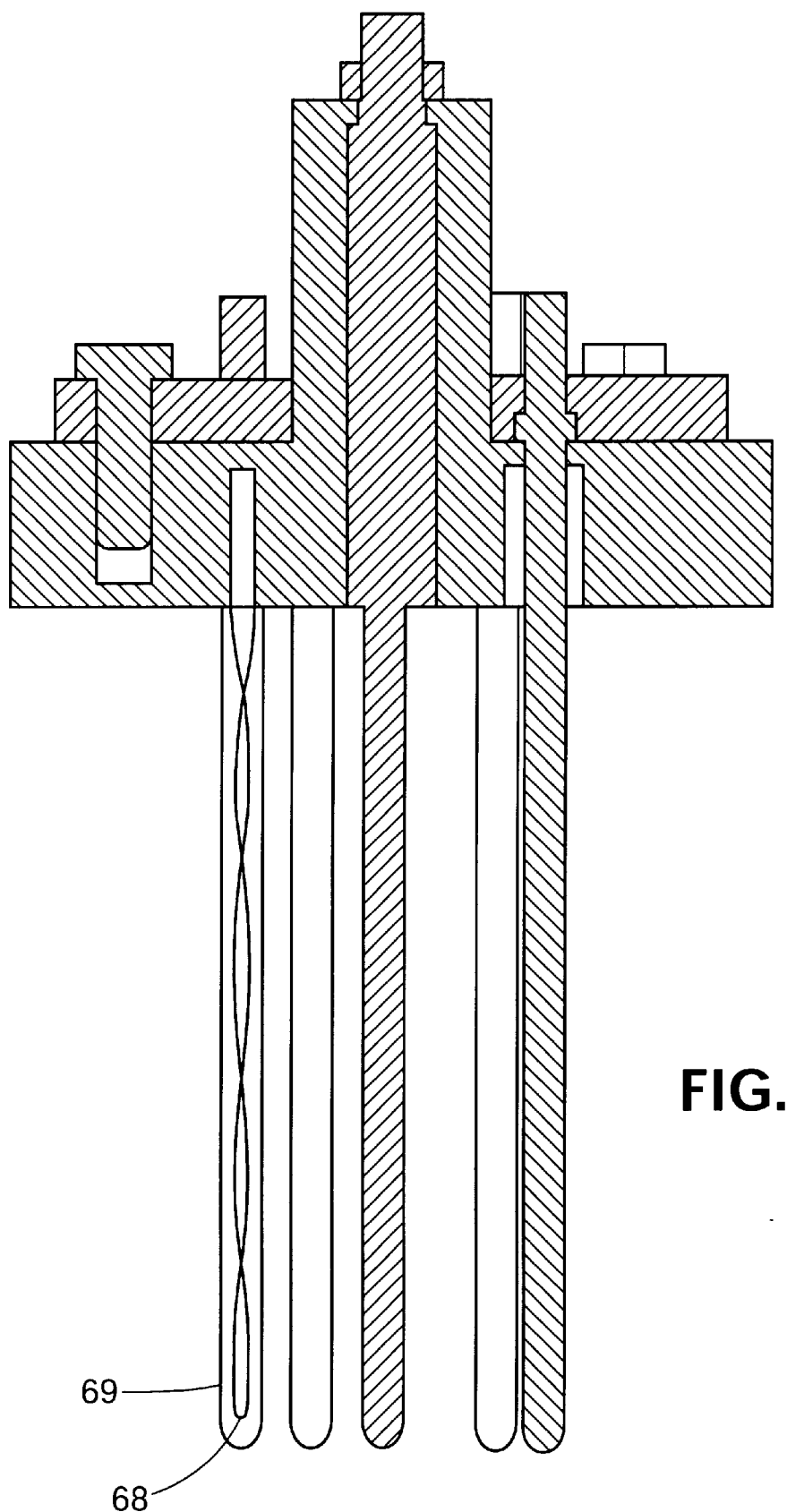
FIG. 25 is a cross-sectional schematic of a tube cage corona discharge device.

FIGS. 24 and 25 illustrate a further embodiment of the corona discharge device of the invention, a "tube cage" corona discharge device 65 that comprises a central electrode 66, surrounded by two or more dielectric tubes 67 comprising a grounded electrode 68 within a dielectric 69. This provides a field strength at the high voltage electrode that is extremely high, and, thus, the voltage necessary for gap breakdown is substantially lower than that required in other designs. The lower voltage improves the efficiency and durability of the corona discharge device and the power supply. As shown in FIG. 24 for the purpose of illustration, central electrode 66 of the "tube cage" corona discharge device is surrounded by eight dielectric tubes 67, as described above. However, any practical number of dielectric tubes can be used. Although, as described above, a high voltage AC signal is typically applied to central electrode 66, while the other electrodes 67 are grounded, this arrangement may be reversed without loss of function.

When a proper voltage is applied, a dielectric barrier discharge is initiated between the central electrode 66 and at least one of the grounded dielectric tubes 67. The gaps between the tubes allows for gas flow to efficiently sweep the radicals out of the discharge region and into the flow of the gas stream, and, thus, the device is an efficient injector of radicals into a flow.

The tube cage design provides several advantages over other designs. First, the size of the central electrode can be reduced compared to other designs, enhancing the electric field at its surface, such that a discharge will be initiated at a lower applied voltage, improving the efficiency of the system. Because the dielectric barriers have a relatively large diameter, the field strength across them will be less for the same thickness, and, thus, either higher powers can be achieved with higher voltages, or lower cost can be obtained using thinner tubes. The tubular design also covers the ground electrode fully, minimizing the chance of sparkover from the high voltage center electrode to the ground electrode. In addition, the tubular design for the outside dielectrics reduces the total amount of material necessary for the system, and is relatively easy to construct It is also possible to generate a discharge along a dielectric surface, even in the absence of a nearby ground plane. In a coaxial situation corona discharge device, the field along the dielectric surface, coaxial to the high potential electrode, is often high enough to initiate breakdown. A dielectric with a high dielectric constant is preferred to maximize the field strength at the surface.

Figure 26:
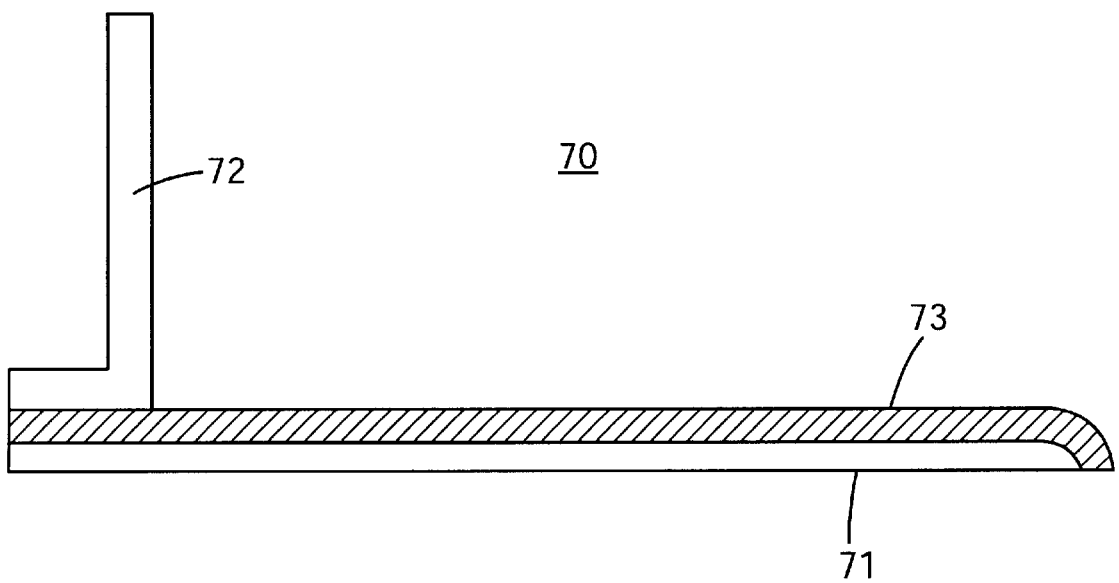
FIG. 26 is a cross-section of a distant ground corona discharge device.

An example of such a distant ground corona discharge device 70, which is less expensive because one less component is required, is illustrated in cross-section in FIG. 26. The corona discharge device illustrated in FIG. 26 differs from other corona discharge devices in that an external ground electrode that extends into the gas flow is not present. The distant ground corona discharge device comprises a high voltage electrode 71 that is separated from a ground electrode 72 by a dielectric 73. As a result, the ground electrode 72 does not extend into the gas flow, there is highly efficient gas exchange, i.e., approaching 100 percent, as there is no cup to block the exchange of radicals with the gas flow, and the field across the dielectric is minimized, thereby reducing the possibility of dielectric breakdown. In addition, no streamer filaments form, due to the more uniform nature of the field along the surface. This prevents both localized overheating of the dielectric surface, as well as overheating of the gas itself. The latter sometimes results in poor efficiency in the generation of radicals.

A distant ground corona discharge device can have a steep power vs. temperature slope, which is advantageous where an application requires more radicals at the higher temperatures typically associated with higher flows, which typically correspond to higher emissions from an engine.

The main disadvantage of a distant ground corona discharge device is the capacitance of the device, which is typically smaller than that of a discharge with a nearby ground. This limits the available power input into the gas, and, thus, the device must be carefully designed if it is to generate as many radicals as a normal design.

Figure 27:
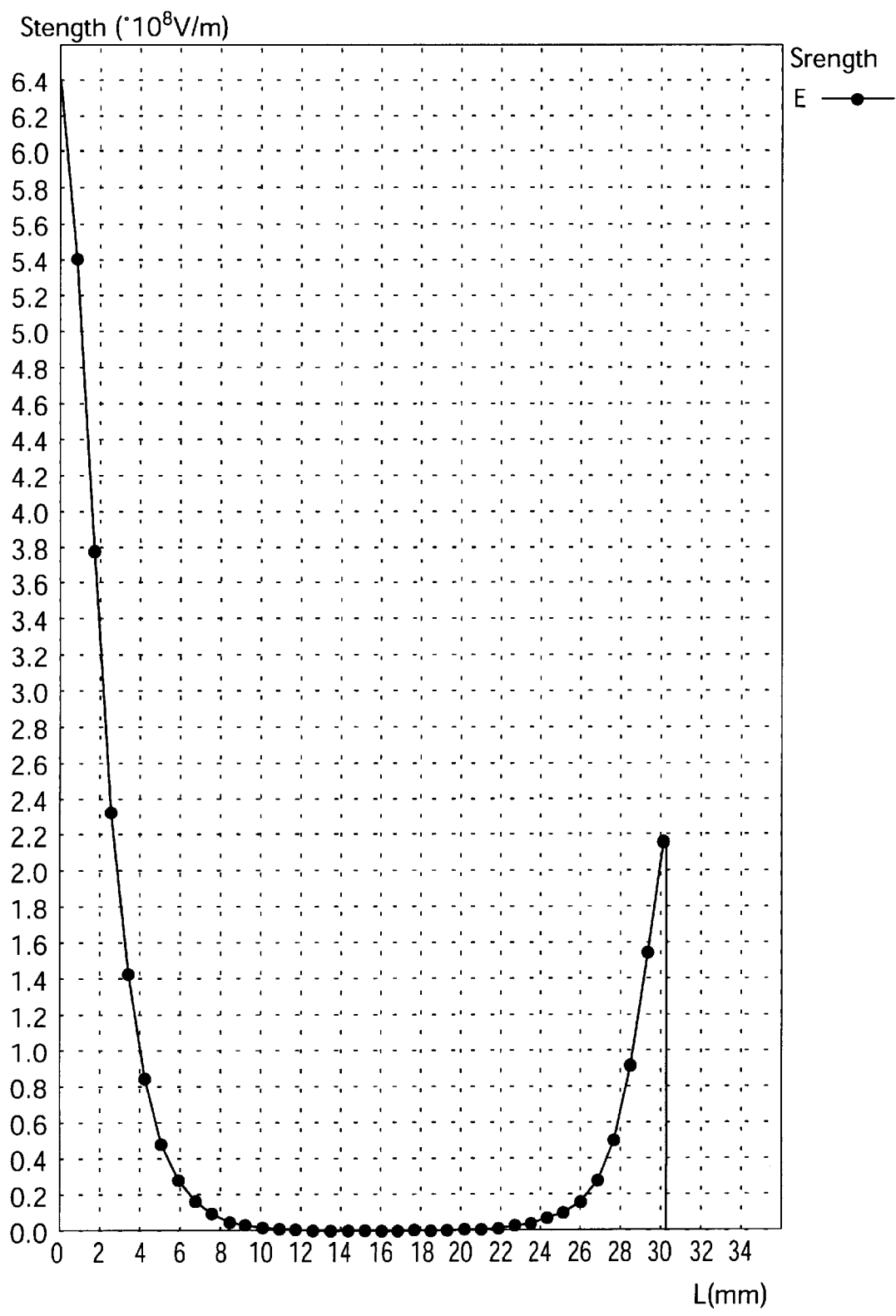
FIG. 27 is an electric field plot of the corona discharge device of FIG. 30.

A typical electric field plot of distant ground corona discharge device is provided in FIG. 27. The corona will form whenever the field is greater than about 28 kV/cm at room temperature, and greater than about 12 kV/cm at 850° C. The very steep slope of the field curve indicates that the corona will drop off quite rapidly, e.g., as shown in the field plot, the corona, even at 850° C., does not penetrate beyond about 4 mm along the surface for about 10 kV applied voltage. Note that a ground plane on the opposite end of the corona discharge device can be used to raise the field strength. The exhaust pipe itself can act as a ground.

The power of a corona discharge formed with a corona discharge device is typically a steep function of temperature. This is due to the variation in breakdown voltage with temperature. Therefore, in applications in which a corona discharge device is subjected to a variable temperature environment, such as a car, the corona discharge power can vary several fold over the temperature range experienced. However, in some cases, this is advantageous, allowing the applied power to be tailored to the temperature of the gas in which the corona is formed. For example, in the exhaust of an engine, higher temperatures are typically indicative of larger flows. The higher temperature of the large flow results in an increase in corona discharge power, which maintains the concentration of radical species produced in the exhaust by the corona discharge.

A number of factors affect the power generated by a typical corona discharge device, with the most important being the geometry of the device. The power input into a corona in such a device may be expressed by the formula:

$$P = 4fC_{dtot}V_{br}(V_{pk}-V_{br}(C_a+C_{dtot})/C_{dtot}),$$

where f is the AC frequency in Hertz, $C_{dtot}$ is the total series capacitance of the dielectric barriers used in the corona discharge device, $V_{br}$ is the breakdown voltage of the air gap of the device, $V_{pk}$ is the peak AC voltage, and $C_a$ is the capacitance of the air gap.

The power is a function of temperature because $V_{br}$ is a function of temperature. For a coaxial geometry, $$V_{br} = r_i * \ln\left(\frac{r_i + t_{air}}{r_i}\right)\left(32.1 * \frac{273}{T+273} + \frac{8.70}{r_i}\right)kV^1,$$

where r is in cm, and T is in K, and $C_a$ is a function of $t_{air}$ as:

$$C_a = 2*\pi*\epsilon_0*L/\ln((r_i+t_{air})/r_i),$$

where L is the length of the discharge region. Therefore, the power applied is a function of both the temperature and the air gap. Assuming the gap is variable over the discharge length L, and assuming a linear function:

$$t_{air} = m*X+t_0,$$

where m is the slope of the gap, x is the distance along the discharge (which varies from 0 L), and $t_0$ is the thickness at x=0, the power can be found as:

$$P(T) = \frac{8f\pi\varepsilon r_i\left(32.1 * \frac{273}{T+273} + \frac{8.70}{r_i}\right)}{\ln(r_i/r_0)} \int_0^L \ln\left(\frac{r_i+(m*x+t_0)}{r_i}\right) *$$
$$\left(V_{pk} - r_i*\ln\left(\frac{r_i+(m*x+t_0)}{r_i}\right)\right)\left(32.1 * \frac{273}{t+273} + \frac{8.70}{r_i}\right) *$$
$$\left(1 + \frac{\ln(r_i/r_0)}{\varepsilon*\ln\left(\frac{r_i+(m*x+t_0)}{r_i}\right)}\right) dx$$

Therefore, in principle, it possible to manipulate m and $t_0$ to obtain the desired relationship of power and temperature, i.e., the desired P(T) curve. The relationship between power and temperature can be varied by changing both the slope of the gap and the size of the initial gap. As a result, a flatter power curve is possible with a variable gap, and peak power can be raised easily with customization of the gap.

Moreover, the variation in the gap need not be linear. Any function that provides the desired result can be used, including, but not limited to, quadratic, exponential, and step functions. A linear function has the advantage of ease of manufacturing. However, this advantage may be offset by the specific power vs. temperature requirements of a given corona application.

Therefore, use of a variable gap in a corona discharge device allows the plasma power vs. temperature curve to be tailored for a specific application. Although the use of a linear gap, i.e., a gap having a constant gradient, provides for ease of manufacturing, other gap shapes may provide advantages in specific applications. The gap may be linear, quadratic, exponential, or a step function, and may even have an arbitrary gradient for the arbitrary tailoring of plasma power vs. temperature curve.

Use of gradient gap enhances low temperature 'light-off' of the discharge, while maintaining appropriate plasma power at higher temperatures, and provides for increased peak plasma power under normal operating conditions. A gap may be graded lengthwise along the dielectric or circumferentially around the dielectric, and the gradient gap may be used to create 'vanes' on oxygen sensor type corona discharge devices in order to increase flow through the device, while simultaneously tailoring plasma power vs. temperature curve.

As discussed above, the normal fluctuations of the exhaust gas pressure may be used to move exhaust gases in and out of the discharge region, resulting in a more efficient mixing of the radicals and other reactive species produced in the discharge with the exhaust gas. An embodiment of the invention that uses the pressure fluctuations to force gas through the discharge region is shown in FIG. 28.

Figure 28:
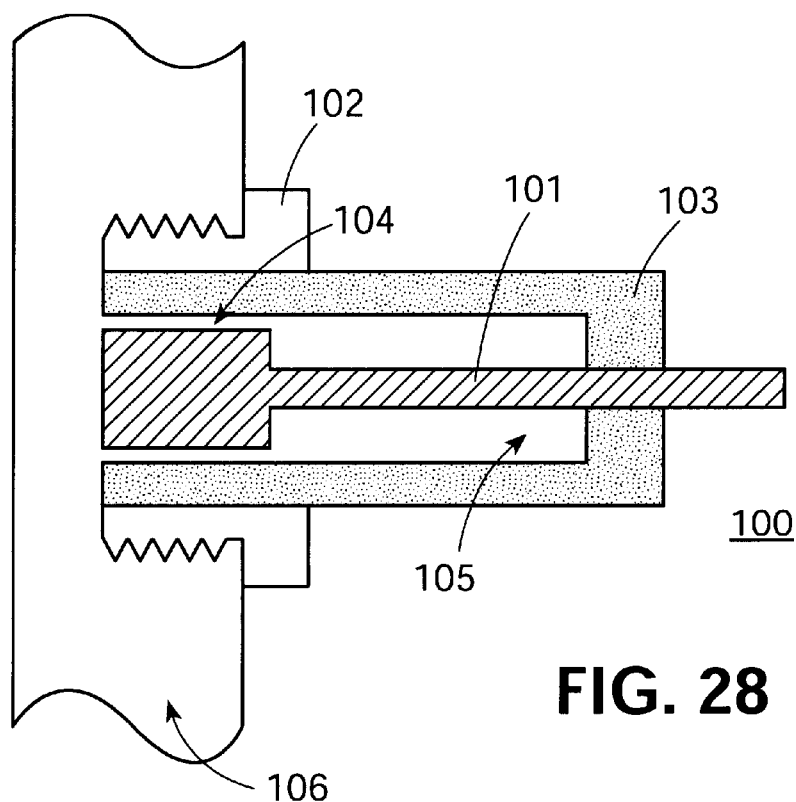
FIG. 28 is a corona discharge device that uses pressure variations outside the corona discharge device to cause gases to move into and out of the corona region.

The corona discharge device 100 illustrated in cross-section in FIG. 28 comprises a central, high voltage electrode 101, a ground electrode 102, and a dielectric material 103, preferably a ceramic, between the high voltage and ground electrodes, 101 and 102. The discharge is formed in the annular region 104 between the high voltage electrode 101 and the surface of the dielectric 103. A ullage volume 105 is provided to allow the pressure fluctuations in the main gas stream 106 to compress and decompress gas within the ullage volume 105, thereby creating an effective gas flow through the discharge region. A typical pressure fluctuation in the exhaust gas stream of an engine is at least about ten percent of the average pressure, which causes a portion of the gas in the ullage volume 105 to move into or out of the discharge region. As a result, when the corona discharge device is operated continuously, resulting in continuous radical production, a portion of the radicals will be swept into the ullage volume 105 when the pressure within the gas stream is higher than that of the ullage volume, where they can be destroyed by recombination reactions. However, when the pressure in the main gas stream is lower than that within the ullage volume 105, gas is drawn from the ullage volume 105, through the discharge region 104, and mixed with the main gas stream. A more effective method of producing radicals, and introducing the radicals into the main gas stream 106, may be to apply the high voltage to the corona discharge device only during those periods when the pressure within the exhaust is 106 less than that within the ullage volume 105. This flow occurs when the pressure within the exhaust is decreasing, and is at a maximum, as the pressure in the exhaust drops from its highest value to the average pressure. Therefore, the most efficient formation of radicals will occur when the driving voltage for the corona discharge device is modulated to correspond with the pressure fluctuations.

The frequency and phase of the pressure fluctuations in the exhaust stream can be directly sensed by either a pressure transducer communicating with the exhaust stream or a temperature sensor on the exhaust system or device that senses the small temperature variations caused by the time varying exhaust flow. The pressure fluctuations can be determined in a predictive sense by keying on information available from the engine controller, such as valve position or commands and RPM, which provide phase and frequency information. This information plus knowledge of the relationship between this data and the frequency and phase of the pressure fluctuation at the device station on the exhaust pipe provides the timing information for modulating the power supply output as indicated above. The relationship between the engine parameter (e.g., value commands and RPM) and the timing for the proper phase and frequency of the power supply modulation can be stored in lookup tables or hardwired in an application specific integrated circuit ("ASIC").

The power supply modulation, which is accomplished by varying the power supply output voltage with the magnitude and phase desired for the proper modulation, can be accomplished by a number of different means. For example in the case in which a resonant transformer is used to generate the high voltage-high frequency output, the voltage output can be controlled by altering the duty cycle of the driver circuit. This circuit is operated at the resonant frequency of the secondary circuit (including the load of the corona discharge device and the high voltage cabling between the power supply and the corona discharge device). Alternatively, changing the drive frequency to a suitable off-resonant frequency or a suitable combination of both can control it. By providing a gradual change in these operating parameters sharp switching transients and their associated EMI are avoided.

Therefore, an improvement in combined radical generation and injection efficiency is accomplished by means of modulation of the frequency and phase of the radical generation and injection, where the frequency and phase for the most effective radical generation and injection are that of the engine induced pressure fluctuations in the exhaust stream, which are used to passively transfer the exhaust gas in and out of the radical generator. Effective generation and injection of radicals into the main exhaust stream may be accomplished by limiting the radical generation to that portion of the pressure variations in the main exhaust stream during which the pressure is decreasing, and optimum generation and transfer of radicals into the main exhaust stream takes place at the mean pressure state in the exhaust system during the half pressure cycle in which there is a decrease in pressure in the main exhaust stream. The pressure information for deriving the frequency and phase of the barrier discharge generator power modulation can be obtained directly by means of an exhaust mounted pressure transducer mounted at or near the generators input station in the exhaust system. In the alternative, the pressure fluctuations can be indirectly sensed by detecting the effect of the fluctuations in the exhaust pipe temperature caused by pressure induced variations in exhaust flow. In addition, an indirect pressure measurement may be made by measuring the temperature of the gas stream using a low heat capacity temperature sensor sensing element positioned directly in the main exhaust flow.

Figure 29:
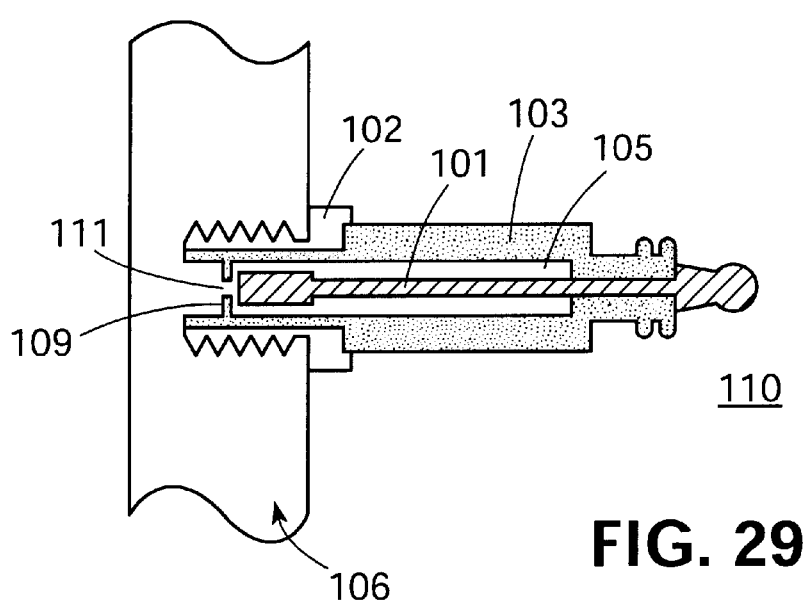
FIG. 29 is a further embodiment of the corona discharge device of FIG. 32.

More robust injection gas mixing into the main gas stream, a reduction in spark breakdown from the high voltage electrode and along the dielectric surface to the ground electrode, and a greater standoff of the dielectric from a hot gas flow are provided in the design illustrated in cross-section in FIG. 29. Similar to the design illustrated in FIG. 28, the corona discharge device 110 illustrated in FIG. 29 has a closure 109 between the end of the high voltage electrode 101 and the gas flow 106, having an orifice 111 that provides a high velocity gas flow containing radicals from the corona discharge device to the main gas flow. The closure also provides a longer path along the dielectric, which reduces the possibility of spark breakdown.

The end of the high voltage electrode 101 is positioned in close proximity to the inner portion of the closure 109 to minimize the amount of space for trapped gas that would otherwise limit the amount of gas transfer from the discharge region 104 to the main gas flow. As a result, the high gas flows out of the corona discharge device provided by this design allow effective radical generation even with a set back orifice, reducing the temperature of the environment to which the dielectric is subjected. As with the design shown in FIG. 28, the design illustrated in FIG. 29 comprises a ullage volume 105 within the corona discharge device to allow compression and decompression of the gas within the ullage volume 105, thereby providing the gas flow through the discharge region that results in the injection of radicals into the main gas stream.

Figure 30:
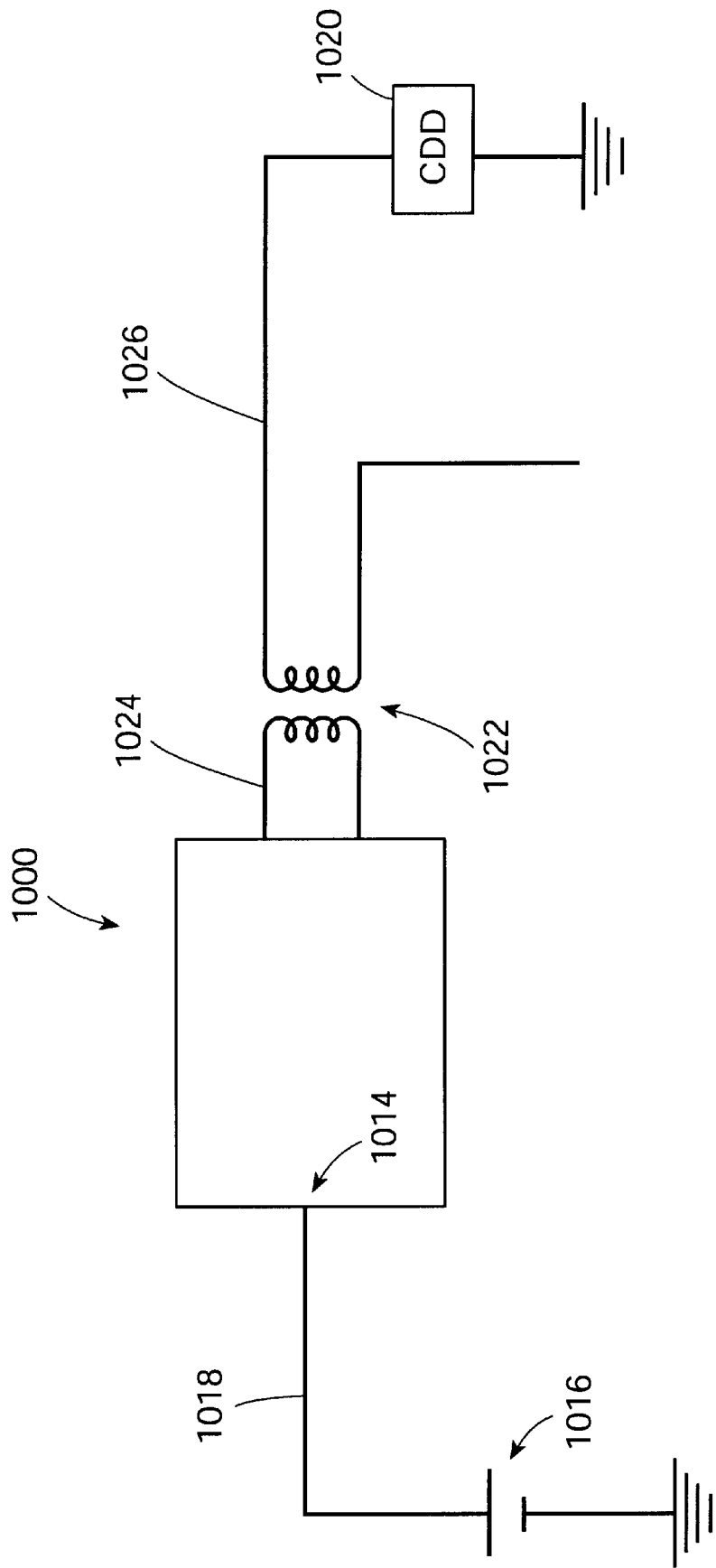
FIG. 30 is a block diagram of a CDD system comprising a power source.

In a preferred embodiment, power for the corona discharge device may be supplied by a power source 1000, shown in FIG. 30. Power source 1000 is preferably provided with an input 1014 connected to a DC voltage source 1016 via a conductor 1018. In a preferred embodiment, DC voltage source 1016 may be an automobile alternator providing a DC voltage that is, on the average, approximately equal to 13.8 volts. Power source 1000 further comprises a transformer 1022 that inductively couples the power source to corona discharge device 1020 via a transformer 1022 and conductors 1024 and 1026.

Power source 1000 provides the necessary power to cause breakdown in the corona discharge device. In a preferred embodiment, power source 1000 provides about a 10 to about 70 watt, high frequency AC waveform with a frequency between approximately 5 KHz and 100 KHz and a peak-to-peak voltage of approximately 12 to 30 kV, depending on the breakdown voltage which is a function of both the geometry of the corona discharge device and other parameters such as the temperature at which the corona discharge device is operating.

Figure 31:
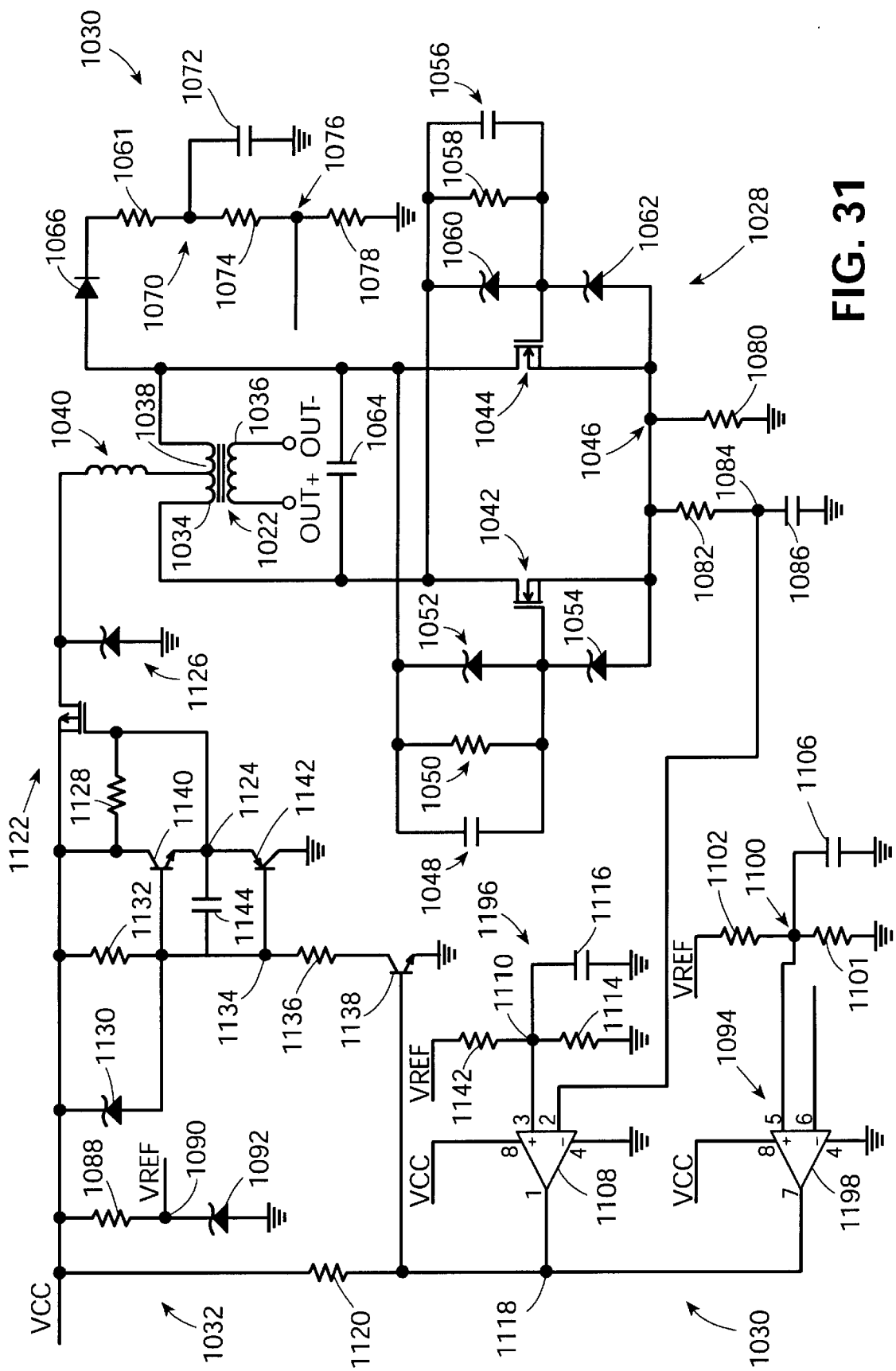
FIG. 31 is a block diagram of a first preferred embodiment of the power source shown in FIG. 30.

A preferred embodiment of power source 1000 is shown in FIG. 31. FIG. 31 illustrates principal elements of power source 1000, but is not intended as a complete circuit schematic for the inverter. In particular, as those skilled in the art will recognize, although FIG. 31 does not specify values for every circuit element shown, values for those elements may be chosen depending on the application. Moreover, listed part numbers may be changed as required to improve performance or vary circuit characteristics.

As shown in FIG. 31, power source 1000 preferably comprises three principle sections: a power oscillator section 1028, a feedback section 1030, and a PWM switch section 1032. In a preferred embodiment, power oscillator section 1028 comprises transformer 1022 having a primary winding 34 and a secondary winding 1036. Primary winding 1034 is provided with a center tap 1038 that is connected to one end of an inductor 1040. Inductor 1040 acts as a current smoothing device that smooths out ripples in the output of DC source 1016. The output of DC source 1016 thus appears as a constant current source to the remaining components of oscillator section 1028.

The secondary winding 1036 of transformer 1022 is connected to a load 1020, preferably a corona discharge device, via a conductor 1026, as shown in FIG. 30. The turns ratio of transformer 1022 is chosen to supply the desired breakdown voltage to the corona discharge device. This turns ratio may be between 225 to 1 and 275 to 1 and, in a preferred embodiment, may be approximately 250.

Power oscillator section 1028 is further provided with first and second MOSFET transistors 1042, 1044. The drain of MOSFETs 1082, 1084 are connected to first and second ends of primary winding 1034, respectively. The sources of MOSFETs 1042, 1044 are connected to a node 1046.

The gate of MOSFET 1042 is connected to the drain of MOSFET 1044 via a parallel combination of a capacitor 1048, a resistor 1050, and a diode 1052. In addition, a zener diode 1054 is connected between the gate of MOSFET 1042 and node 1046. The gate of MOSFET 1044 is similarly connected to the drain of MOSFET 1042 via a parallel combination of a capacitor 1056, a resistor 1058, and a diode 1060. In addition, a zener diode 1062 is connected between the gate of MOSFET 1044 and node 1046. Capacitors 1048, 1056 and resistors 1050, 1058 operate as a compensation circuit that permits MOSFET transistors 1042, 1044 to switch at zero voltage and thus minimize power loss through the transistors during operation of the inverter.

Power oscillator section 1028 is further provided with a capacitor 1064 that is connected between the drains of MOSFETs 1042, 1044. Load 1020, capacitor 1064, and transformer 1022 define a natural frequency for the oscillator. During operation, power oscillator section 1028 oscillates at that natural frequency thus providing an AC output signal to load 1020. A circuit that oscillates at such a natural frequency is desirable because it provides a near sinusoidal output with reduced high frequency, i.e., harmonic frequency, electro-magnetic interference effects. It also tracks changes in natural frequency due to load variations without loss of efficiency.

Feedback section 1030 preferably comprises a diode 1066 connected in series with a resistor 1068 between the drain of MOSFET 1044 and a node 1070. A capacitor 1072 is connected between node 1070 and ground. A resistor 1074 is connected between node 1070 and a node 1076. A voltage feedback signal is taken from node 1076, as described below. A resistor 1078 is connected between node 1076 and ground.

Feedback section 1030 further comprises a resistor 1080 connected between node 1046 and ground. A resistor 1082 is connected between node 1046 and a node 1084. A current feedback signal is taken from node 84, as described below. A capacitor 1086 is connected between node 1084 and ground.

Feedback section 1030 further comprises a resistor 1088 connected between a voltage Vcc, preferably provided by DC voltage source 1016, and a node 1090. A reference voltage Vref is taken from node 1090, as described below. A zener diode 1092 is connected between node 1090 and ground.

Feedback section 1030 further comprises a voltage feedback processing circuit 1094 and a current feedback processing circuit 1096. Voltage feedback processing circuit 1094 comprises an op amp 1098 that receives the voltage feedback signal from node 1076 on its negative input. The positive input of op amp 1098 is connected to a node 1100. A resistor 1102 is connected between node 1110 and constant voltage Vref from node 1090. A resistor 1104 and a capacitor 1106 are connected in parallel between node 1100 and ground.

Current feedback processing circuit 1096 comprises an op amp 1108 that receives the current feedback signal from node 1084 on its negative input. The positive input of op amp 1108 is connected to a node 1110. A resistor 1112 is connected between node 1110 and constant voltage Vref from node 1090. A resistor 1114 and a capacitor 1116 are connected in parallel between node 1100 and ground. The outputs of op amps 1098, 1108 are connected to a node 1118.

PWM switching section 1032 preferably comprises a resistor 1120 connected between node 1118 and Vcc. A MOSFET 1122 has its source connected to Vcc and its drain connected to a second terminal of inductor 1040. The gate of MOSFET 1122 is connected to a node 1124. A Schottky diode 1126 is connected between the drain of MOSFET 1122 and ground.

A resistor 1128 is connected between Vcc and node 1124. A zener diode 1130 and a resistor 1132 are connected in parallel between Vcc and a node 1134. A resistor 1136 connects node 1134 to the collector of a transistor 1138. The gate of transistor 1138 is connected to node 1118 and its emitter is connected to ground.

The gates of two transistors 1140, 1142 are each connected to node 1134. The emitters of each transistor 1140, 1142 is connected to node 1124. The collector of transistor 1140 is connected to Vcc and the collector of transistor 1142 is connected to ground. A capacitor 1144 connects node 1134 to node 1124.

In a preferred embodiment, the values/part numbers for the circuit elements shown in FIG. 31 may be as follows:

| | |
|---|---|
| inductor 1040 | 100 microhenrys |
| MOSFET 1042 | IRF3710S |
| MOSFET 1044 | IRF3710S |
| capacitor 1048 | 2200 pF |
| resistor 1050 | 680 ohms |
| diode 1052 | RS1DB |
| zener diode 1054 | 1SMB5927BT3 |
| capacitor 1056 | 2200 pF |
| resistor 1058 | 680 ohms |
| diode 1060 | RS1DB |

-continued

| | |
|---|---|
| zener diode 1062 | 1SMB5927BT3 |
| capacitor 1064 | 2.2 micro F |
| diode 1066 | RS1DB |
| resistor 1068 | 100 ohms |
| capacitor 1072 | 0.01 micro F |
| resistor 1074 | 51K ohms |
| resistor 1078 | 10K ohms |
| resistor 1080 | 0.1 ohms |
| resistor 1082 | 10K ohms |
| capacitor 1086 | 1000 pF |
| resistor 1088 | TBD |
| zener diode 1092 | TBD |
| op amp 1098 | LM2903 |
| resistor 1102 | TBD |
| resistor 1104 | TBD |
| capacitor 1106 | 0.1 micro F |
| op amp 1108 | LM2903 |
| resistor 1112 | TBD |
| resistor 1114 | TBD |
| capacitor 1116 | 0.1 micro F |
| resistor 1120 | 10K ohms |
| MOSFET 1122 | 1RF4905S |
| Schottky diode 1126 | 8TQ100S |
| resistor 1128 | 10K ohms |
| zener diode 1130 | 1SMB5927BT3 |
| resistor 1132 | 10K ohms |
| resistor 1136 | 470 ohms |
| transistor 1138 | MMBT3904LT1 |
| transistor 1140 | MMBT3904LT1 |
| transistor 1142 | MMBT2907ALT1 |
| capacitor 1144 | 1000 pF |

The principles of operation of the preferred embodiment of inverter 12 shown in FIG. 31 are now described. Oscillator section 1028 provides an AC peak-to-peak output voltage of approximately $2\pi V^*N$ when using a transformer of turns ratio N and a DC input voltage of V (where V is the DC voltage at the upper leg of inductor 1040). To adjust output, therefore, input voltage V must be externally varied. This is accomplished with the remaining circuit elements.

Feedback section 1030 and PWM switch section 1032 together provide a variable frequency, variable duty-cycle voltage input to inductor 1040 (the DC voltage node to oscillator section 1028). PWM switch section 1032 is composed of a high-current P-channel MOSFET 1122 that serves as a power switch, a Schottky diode 1126 to provide a commutation path for inductor current, and a driver network composed of zener diode 1130, resistor 1132, resistor 1128, transistor 1140, transistor 1142, capacitor 1144, resistor 1136, and transistor 1138 to provide fast MOSFET charging and discharging.

Feedback section 1030 monitors both the average oscillator current and peak primary voltage. The average oscillator current is monitored using a network of circuit elements comprising resistor 1080, resistor 1082, and capacitor 1086). The peak primary voltage is monitored using a network of elements comprising diode 1066, resistor 1068, resistor 1074, resistor 1078, and capacitor 1072. When both are below their corresponding preset limits (as governed by resistor 1088, zener diode 1092, resistor 1112, resistor 1114, and capacitor 1116 for current and resistor 1088, zener diode 1092, resistor 1102, resistor 1104, and capacitor 1106 for voltage) both comparator outputs become open-circuit and transistor 1138 is turned on due to pull-up resistor 1120. This, in turn, pulls the gate terminal of MOSFET 1122 low, allowing current to begin ramping up in inductor 1040. When either limit is exceeded, the comparator outputs become low and transistor 1138 is turned off. This, in turn, causes MOSFET 1122 to be turned off. The remaining inductor current is then commutated through Schottky diode 1126.

This feedback control protects power source 1000 against conditions that might otherwise affect system operation or harm the power source. For example, in the absence of current feedback control, corona discharge device 1020 would have the tendency to draw large currents from power source 1000 at the top of the corona discharge device's operational temperature range (typically temperatures in excess of 1000 degrees Centigrade). These large currents could damage power source 1000. The current feedback portion of feedback section 1030, however, monitors current through power oscillator 1028 and shuts off MOSFET 1122 if that current exceeds a desirable level.

Moreover, the use of feedback control to limit output current helps power source 1000 meet the strict standards to which automotive under-hood systems are subject. In particular, limiting output current is advantageous because it allows functional operation of the corona discharge device system throughout the entire operating range of corona discharge device 1020, from −40 degrees to 1100 degrees Centigrade. Furthermore, even as the dielectric resistance changes in corona discharge device 1020, thereby drawing more loss current, the output current of power source 1000 will not increase.

As noted, limiting output current keeps power source 1000 from destroying itself. In addition, it also prevents corona discharge device 1020 from indicating a false error condition due to measured high currents, when, in fact, the measured high currents are due to the fact that the corona discharge device dielectric has gone conductive, rather than being due to a catastrophic failure. It should also be noted that, although limiting current to corona discharge device 1020 causes the plasma power to be reduced as the dielectric loss increases, some corona is still generated, even at the highest temperatures. This has been verified experimentally.

In addition, in the absence of voltage feedback control, power source 1000 would be susceptible to damage caused by voltage spikes in the output of DC voltage source 1016. The voltage feedback control portion of feedback section 1030, however, monitors the voltage at transformer 1022 and shuts off MOSFET 1122 if that voltage exceeds a desirable level.

More specifically, because the circuit of FIG. 31 employs feedback control to limit the output voltage, power source 1000 can withstand any input voltage up to 28 volts DC, while maintaining a constant output voltage, as long as the input voltage remains above the set voltage $V_{ref}$. Moreover, in a preferred embodiment, the set voltage may be chosen to be a relatively low voltage, such as approximately 10V, so that the output voltage supplied by power source 1000 to corona discharge device 1020 will remain constant throughout the typical automotive battery output range of approximately 10–16 volts.

As input conditions and output load conditions vary, the circuit will automatically choose the proper switching frequency and duty cycle. It has been observed that the PWM switching is synchronized with the primary waveform and has a frequency that is a sub-multiple of the oscillator frequency (e.g., 1, ½, ⅓, ¼, etc.). The oscillator frequency is determined by capacitor 1144 and transformer 1022 as well as the load attached to secondary winding 1036.

In an alternative preferred embodiment, the circuit of FIG. 31 may be replaced by a piezoelectric transformer circuit for supplying power at the requisite voltage and frequency to corona discharge device 1020. Such piezoelectric transformers are known in the art and are described, for example, in Ceramic Transformers and Filters, C. A. Rosen, General Electric Company, Syracuse N.Y.; An Advanced Design of Piezoelectric Ceramic Transformer for High Voltage Source, Seiji Hirose & Hiroshi Shinuzu, 1989 Ultrasonics Symposium at 471; Piezo Transducers Replace Transfomers in Backlights, Stephan Ohr; and Ultracompact LCD Backlight Inverters: A Svelte Beast Cuts High Voltage Down to Size, Jim Williams et al., Linear Technology Application Note 81, Sep. 1999, each of which is hereby incorporated by reference in its entirety.

Piezoelectric transformers are an attractive alternate to wire wound magnetic transformers. Now that they are appearing in volume production, for such applications as intermediate high voltage transformers for driving the fluorescent displays for laptop computers, they have decreased in cost to significantly less than Royer type high voltage power supplies. They provide extremely efficient conversion of nearly 95 percent low voltage, i.e., about 12 V, input to a high voltage output. The ceramic piezoelectric transformer was first suggested by Rosen in the form of a thin rectangular bar, half of which is poled in thickness and the other half poled in length. When the thickness poled half is driven at the sinusoidal resonance frequency of the bar the other half (the longitudinal poled half) is driven into resonance by Poisson coupling. This causes an output voltage along its length. Given approximately by the length to thickness ratio of the two halves times a quality factor. The resulting output voltage can be several hundred times the input voltage, operating at about 28 kHz and about 10 kV output, which is in the desirable range for the corona discharge device drive voltage and frequency. The power density in this transformer is about 10 W per in$^3$. This is a much higher power density than the ferrite core/copper winding flyback transformer in a Royer circuit. This voltage ratio can be increased several fold by vertically segmenting the input side (the vertically polarized half and driving the segments in parallel with the input voltage. By such means the output voltage can be more than a thousand times the input voltage. A 16 to 27 kV output may be obtained from a 5 to 20 V sinusoidal input at a transformer frequency of about 30 kHz in a very compact device having a volume of about 1.35 in$^3$ at a maximum output of about 40 W or a power density of a high voltage ferrite flyback transformer. This leads to an equivalently smaller volume for a given output power. Additionally the piezoelectric transformer is flat, which provides for much better packaging efficiency and thus to a much smaller power supply. The Curie temperature of applicable dielectric can exceed 350° C., so that operation of the transformer to temperatures above 200° C. are be quite feasible. Thus, a piezoelectric transformer can be mounted on the corona discharge device unit, thus allowing dispensing with a high voltage cable.

In particular, Hirose and Shimizu describe a piezoelectric transformer design that converts an input voltage of 5 to 20 V to an output voltage of 16 to 27 kV. They indicate a transformer voltage gain of 500 to 2000 depending on input and output conditions. The transformer they describe oscillates at a frequency of about 30 kHz, can handle up to 40 W of power and should have high efficiency. It is a very compact device having a rectangular shape with dimensions of approximately 0.6 in×0.9 in×2.5 in or a volume of about 1.35 in$^3$. A transformer comprising such characteristics would satisfy the power supply requirements for the applications described in this application. Moreover, the volume of such a transformer would be such and its Curie temperature sufficiently high that it may preferably be mounted at the location of the corona discharge device.

A second architectural approach to attaining a high transformer ratio with a simpler piezoelectric transformer design is suggested in the dissertation of Chih-yi Lin. Lin discloses cascading a flyback transformer with a piezoelectric transformer. Here the flyback transformer provides about 500 V of drive voltage to a piezoelectric transformer. A simple Rosen type piezoelectric transformer may be employed to provide the 10:1 voltage gain for the corona discharge device drive voltage in the present application. This circuit is shown on the attachment from Lin's dissertation, where the block labeled HVPT-2 is the piezoelectric transformer. The circuit shown does not have a sufficient flyback output for the applications described herein, but does illustrate the architectural approach.

The advantages of using such a piezoelectric transformer circuit are: High input to output power efficiency; low cost; low volume (small size); and low weight.

Indeed, if the volume, weight, and power dissipation in such a piezoelectric transformer is made small enough, power source 1000 may be mounted integrally with corona discharge device 1020. This would eliminate the need for cable 1026, thereby reducing system cost, power losses, and electromagnetic interference (EMI). Thus, use of a piezoelectric transformer greatly reduces the cost of the power supply. Indeed, it may reduce cost adequately to make it advantageous to provide separate corona discharge device units upstream and downstream of the first brick.

Moreover, as known in the art, the Curie temperatures of higher performance piezoelectric ceramics range to beyond 350° C., so that operation to temperatures up to 200° C. is practicable. Manufacturers of high voltage (~1000 V) power supplies suitable for operation at these high temperatures include Tokin and Delta Electronics.

Another potential piezo-electric power supply is the one described in Linear Technology Application Note 81. It should be noted that although the article describes the transformer as operating at 60 Hz, that appears to be a typo, and should probably read 60 KHz. Such units may provide 4 to 5 Watts of power and may likely be tailored to provide 10 to 15 watts at 7 kV peak to peak. Linear Technology Corp. also builds Royer circuit power supplies that are compact and about 90% efficient and could likely be tailored to constitute a suitable power supply for corona discharge device 1020.

Figure 32:
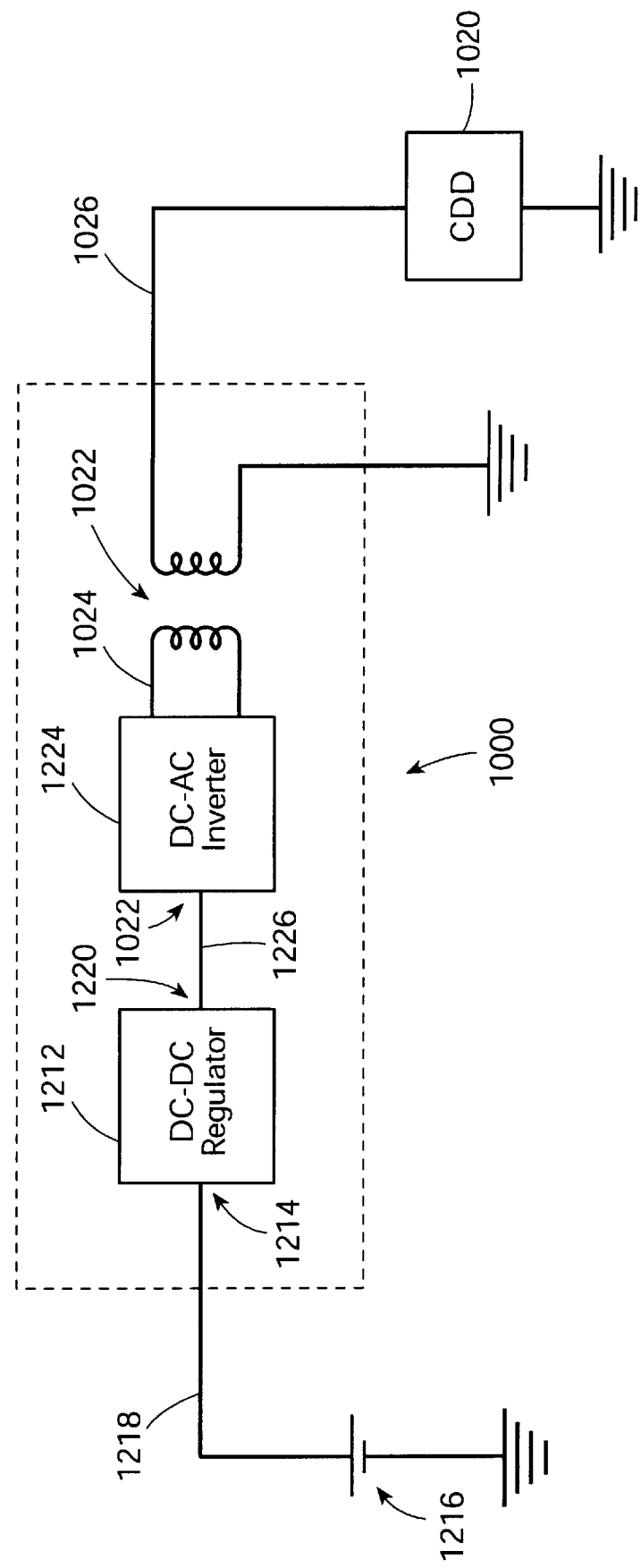
FIG. 32 is a block diagram of a second preferred embodiment of the power source shown in FIG. 30.

In an alternative embodiment, power for the corona discharge device may be supplied by a power source 1000 that does not comprise the feedback control described above. A preferred embodiment of this alternative power source is shown in FIG. 32. As shown in FIG. 32, power source in this embodiment preferably comprises a DC-DC regulator 1212 having an input 1214 connected to a DC voltage source 1216 via a conductor 1218. In a preferred embodiment, DC voltage source 1216 may be an automobile alternator providing a DC voltage that is, on the average, approximately equal to 13.8 volts.

Regulator 1212 further comprises an output 1220 that is connected to an input 1222 of a DC-AC inverter 1224 via a conductor 1226. The purpose of regulator 1212 is to provide a steady DC voltage to input 1222 of inverter 1224 despite fluctuations in the voltage supplied to input 1214 of regulator 1212 by unregulated DC voltage source 1216. As noted, this is necessary because alternative power source 1000 does not comprise the voltage feedback control of the first preferred embodiment described above. A preferred embodiment of regulator 1212 is described in more detail below in connection with FIG. 33.

As further shown in FIG. 32, inverter 1224 is preferably inductively coupled to corona discharge device 1228 via transformer 1022 and conductors 1024 and 1026. Inverter 1224 provides the necessary power to cause breakdown in the corona discharge device. In a preferred embodiment, inverter 1224 provides about a 10 watt to about 70 watt, high frequency AC waveform with a frequency between approximately 5 KHz and 100 KHz and a peak-to-peak voltage of approximately 12 to 30 KV, depending on the breakdown voltage which is a function of both the geometry of the corona discharge device and other parameters such as the temperature at which the corona discharge device is operating. Inverter 1224 is described in more detail below in connection with FIG. 34.

Figure 33:
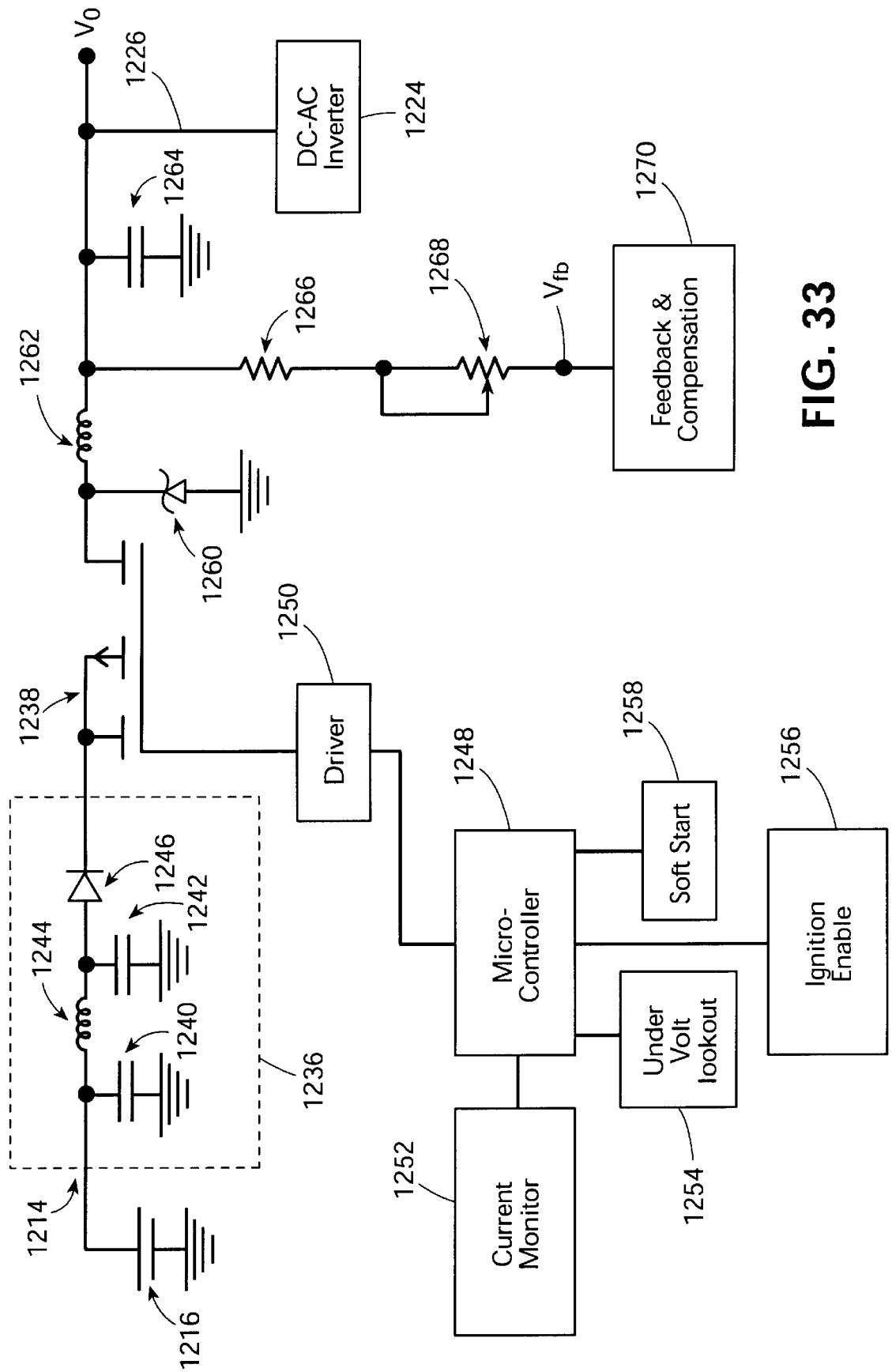
FIG. 33 is a block diagram of a preferred embodiment of the regulator of the power source shown in FIG. 32.

A preferred embodiment of regulator 1212 is shown in FIG. 33. FIG. 33 illustrates principal elements of regulator 1212, but is not intended as a complete circuit schematic for the regulator. As shown in FIG. 33, regulator 1212 preferably comprises a circuit 1236 connected between input 1214 and a MOSFET transistor 1238. Circuit 1236 protects voltage source 1216 against reverse voltages that may be developed in power source 1000. In a preferred embodiment, circuit 1236 may comprise capacitors 1240, 1242 connected between ground and first and second ends of an inductor 1244, respectively. The second end of inductor 1244 is further connected to the input of a diode 1246. In a preferred embodiment, the capacitances of capacitors 1240, 1242 may each preferably be 2.2 nF, and the inductance of inductor 1244 may preferably be 40 microhenrys.

The output of diode 1246 is connected to the source of p-channel MOSFET transistor 1238. A suitable MOSFET transistor is IRF5210S available from International Rectifier. The gate of MOSFET 1238 is controlled by control signals provided by a microcontroller 1248 via a driver circuit 1250. In a preferred embodiment, microcontroller 1248 may comprise a UC1524A chip manufactured by Unitrode, Inc.

In a preferred embodiment, a current monitor 1252 is connected to a first pin of microcontroller 1248. Current monitor 1252 monitors the output current provided by regulator 1212 to inverter 1224 (i.e., the current in conductor 1226), and generates a control signal that disables microcontroller 1248 when the output current drops below a predetermined threshold.

In a further preferred embodiment, a voltage monitor 1254 is connected to a second pin of microcontroller 1248. Voltage monitor 1254 monitors the input voltage provided to regulator 1212 by voltage source 1216, and generates a control signal that disables microcontroller 1248 when the input voltage to regulator 1212 drops below a predetermined threshold.

In a further preferred embodiment, an ignition enabled monitor 1256 is connected to a third pin of microcontroller 1248. Ignition enable monitor 1256 is adapted to receive an "ignition on" signal from the automobiles ignition system and to output a control signal that disables microcontroller 1248 when that "ignition on" signal is absent.

In a further preferred embodiment, a soft-start module 1258 is connected to a fourth pin of microcontroller 1248. Soft-start module 1258 is adapted to output control signals that cause the voltage output of microcontroller 1248 to ramp up in a controlled manner and avoid voltage spikes in the signal output of microcontroller 1248 and driver 1250.

When microcontroller 1248 is enabled, it provides a voltage signal to the gate of MOSFET 1238 via driver circuit 1250 that causes MOSFET 1238 to be turned on. The voltage on the source of MOSFET 1238 (i.e., the input voltage from voltage source 1216 minus the approximately 0.5V dropped across diode 1246) is then seen at its drain and across a schottky diode 1260.

The drain of MOSFET 1238 is also connected to the first end of an inductor 1262. The second end of inductor 1262 is connected in parallel to inverter 1224, a capacitor 1264, and the serial combination of a resistor 1266, a resistor 1268, and a feedback & compensation module 1270. In a preferred embodiment the inductance of inductor 1262 may be 40 microhenrys; the capacitance of capacitor 1264 may be 660 microF; and the resistance of resistor 1266 may be 1 Kohm.

Resistor 1268 is used to control the feedback voltage $V_{fb}$ that is provided to feedback & compensation module 1270. By adjusting the resistance of this resistor 1268, a setpoint voltage may be chosen for regulator 1212 that establishes a maximum output voltage $V_o$ that the regulator can supply to inverter 1224. In particular, the transfer function of regulator 1212 is such that:

if$(V_i-0.5V)$<setpoint voltage, then Vo=input;

if$(V_i-0.5V)$>setpoint voltage, then $V_O$=setpoint voltage,
where $V_i$ is the input voltage supplied to regulator 1212 by, for example, voltage source 1216.

The particular setpoint voltage chosen for a given application may be a function of several factors such as the input voltage provided by voltage source 1216 and the temperature of operation of the corona discharge device. In a typical example, for an automobile alternator providing an input voltage of approximately 13.8 volts, the setpoint voltage for regulator 1212 may be chosen to be approximately 11–12 volts. A proper setpoint may be determined for a given application using a variable resistor adjusted until an appropriate resistance is found. A resistor having this value may then be substituted for the variable resistor in the circuit.

Figure 34:
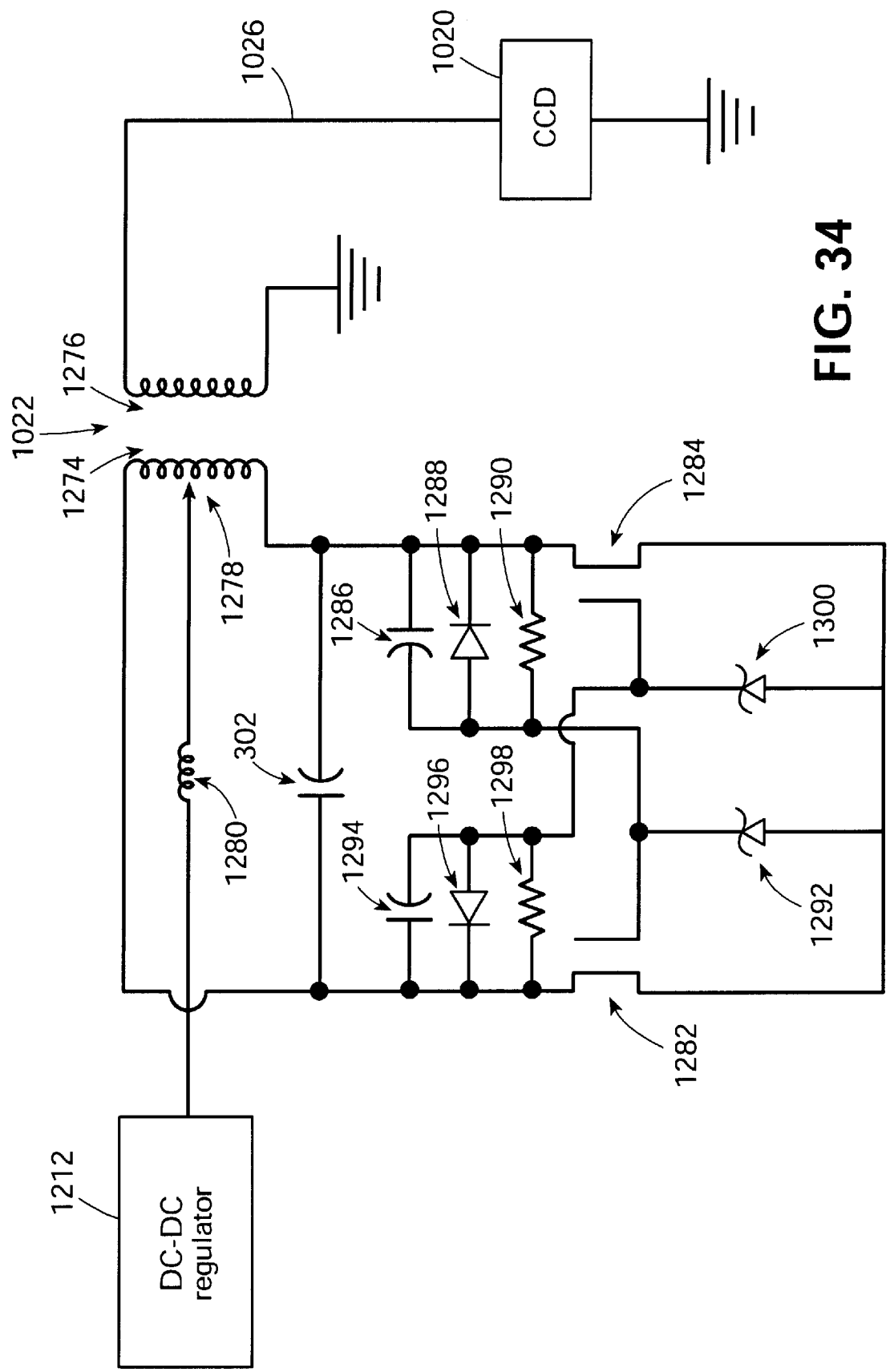
FIG. 34 is a block diagram of a first preferred embodiment of the inverter of the power source shown in FIG. 32.

A preferred embodiment of inverter 1224 is shown in FIG. 34. FIG. 34 illustrates principal elements of inverter 1224, but is not intended as a complete circuit schematic for the inverter. As shown in FIG. 34, inverter 1224 preferably comprises transformer 1230 having a primary winding 1274 and a secondary winding 1276. Primary winding 1276 is provided with a center tap 1278 that is connected to the output of regulator 1212 via an inductor 1280. Inductor 1280 acts as a current smoothing device that smooths out any remaining ripples in the output of regulator 1212. In a preferred embodiment, the inductance of inductor 1280 may be 200 microhenrys. The output of regulator 1212 thus appears as a constant current source to inverter 1224. Secondary winding 1276 is connected to a load 1020, preferably a corona discharge device, via a conductor 1026. The turns ratio of transformer 1230 is chosen to supply the desired breakdown voltage to the corona discharge device. This turns ratio may be between 100 to 1 and 1000 to 1 and, in a preferred embodiment, may be approximately between 200 to 1 and 300 to 1.

Inverter 1224 is further provided with first and second MOSFET transistors 1282, 1284. The drain of MOSFETs 1282, 1284 are connected to first and second ends of primary winding 1274, respectively. The sources of MOSFETs 1282, 1284 are connected to ground.

The gate of MOSFET 1282 is connected to the drain of MOSFET 1284 via a parallel combination of a capacitor 1286, a diode 1288, and a resistor 1290. In addition, a zener diode 1292 is connected between the gate of MOSFET 1282 and ground. The gate of MOSFET 1284 is similarly connected to the drain of MOSFET 1282 via a parallel combination of a capacitor 1294, a diode 1296, and a resistor 1298. In addition, a zener diode 1300 is connected between the gate of MOSFET 1284 and ground. In a preferred embodiment, the capacitance of capacitors 1286, 1294 may be 2.2 nF; the resistance of resistors 1290, 1298 may be 680 Ohms; and zener diodes 1292, 1300 may have a zener breakdown voltage of 10 volts. Capacitors 1286, 1294 and resistors 1290, 1298 operate as a compensation circuit that permits MOSFET transistors 1282, 1284 to switch at zero voltage and thus minimize power loss through the transistors during operation of the inverter.

Inverter 1224 is further provided with a capacitor 1302 that is connected between the drains of MOSFETs 1282, 1284. Load 1228, capacitor 1302, and transformer 1230 define a natural frequency for inverter 1224. During operation, inverter 1224 preferably oscillates at that natural frequency thus providing an AC output signal to load 1028. A circuit that oscillates at such a natural frequency is desirable because it provides a near sinusoidal output with reduced high frequency, i.e., harmonic frequency, electromagnetic interference effects.

It should be noted that although the natural frequency defined by load 1020, capacitor 1302 and transformer 1230 is preferably the dominant one, inverter 1224 may also at times operate at a second, significantly higher natural frequency that is apparently defined primarily by leakage inductance and stray capacitance in the transformer. Power source 1000 is preferably designed so that this high-frequency pole is typically not dominant except under certain load conditions. In particular, if the impedance of the load drops to a value much lower than the normal corona discharge device impedance (e.g., if a short circuit develops), this high-frequency mode can dominate. The alternative power source 1000 of FIG. 32 (as opposed to the one shown in FIG. 30) is susceptible to this high-frequency mode because it does not include the current feedback control described above in connection with FIG. 31.

If undetected, this high-frequency mode may quickly cause power source 1000 to self-destruct due to the higher currents that occur during this mode. A diagnostic circuit for detecting this high frequency mode is described below.

In a preferred embodiment, the capacitance of capacitor 1302 may be 470 nF. In addition, n-channel MOSFETs 1282,1284 may be IRF540NS available from International Rectifier; and transformer 1230 may be a 225:1 turns ratio, 8 primary turn, ETD-49 R-type ferrite core transformer. In a preferred embodiment, shielded cabling may be used to provide a shielded return path from corona discharge device 1228 to the power supply and thereby reduce electromagnetic interference.

Figure 35:
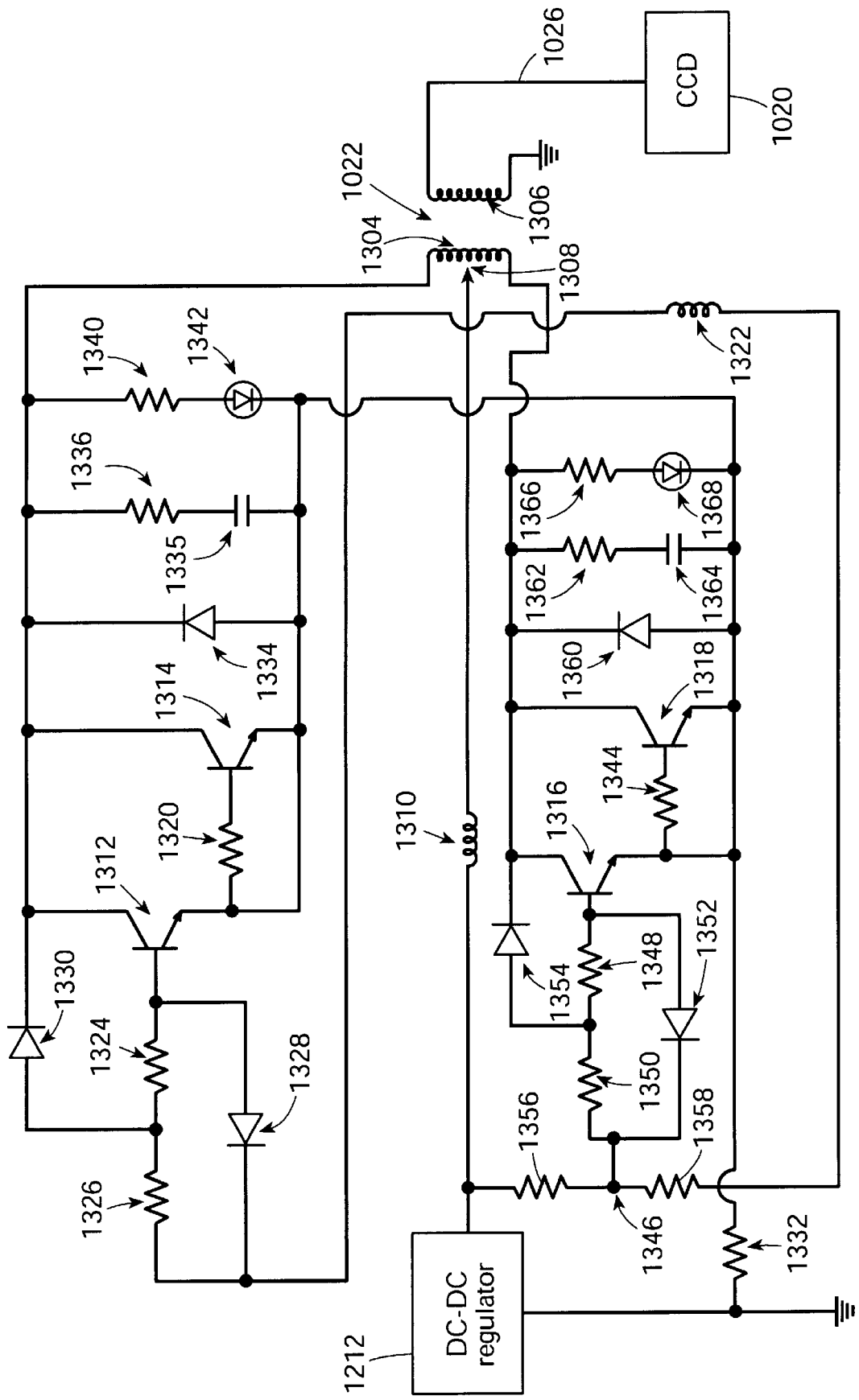
FIG. 35 is a block diagram of a second preferred embodiment of the inverter of the power source shown in FIG. 32.

In a further alternative embodiment, inverter 1224 may employ a Royer topology, such as shown, for example, in FIG. 35. It should be noted that this Royer topology is not as efficient as the topology described above in connection with FIG. 32 and FIG. 34 because it employs a saturating transformer and may therefore suffer from significant core losses. FIG. 35 illustrates principal elements of this alternative embodiment of inverter 1224, but is not intended as a complete circuit schematic for the inverter. As shown in FIG. 35, in this alternative embodiment, inverter 1224 comprises a transformer 1022 having a primary winding 1304 and a secondary winding 1306. Primary winding 1304 is provided with a center tap 1308 that is connected to the output of regulator 1212 via an inductor 1310. Inductor 1310 acts as a current smoothing device that smooths out any ripples in the output of regulator 1212. The output of regulator 1212 thus appears as a constant current source to inverter 1224. Secondary winding 1306 is connected to a load 1020, preferably a corona discharge device, via a conductor 1026.

Inverter 1224 is further provided with two transistors 1312, 1316. The gate of transistor 1312 is connected to one end of a feedback winding 1322 via a network of elements comprising a resistor 1324 and a diode 1328, connected in parallel between the gate of transistor 1312 and a first end of feedback winding 1322. The circuit further comprises a diode 1330 connected between the first end of feedback winding 1322 and the collector of transistor 1312.

The emitter of transistor 1312 is connected to ground. In addition, the circuit is provided with additional circuit elements diode 1334; resistor 1336 connected in serial with capacitor 1338; and resistor 1340 connected in serial with LED 1342, all of which are connected in parallel to transistor 1312.

The gate of transistor 1316 is connected to a node 1346 via a network of elements comprising a resistor 1348 and a diode 1352, connected in parallel between the gate of transistor 1316 and a node 1346. The circuit further comprises a diode 1354 connected between node 1346 and the collector of transistor 1316. Node 1346 is connected to the output of regulator 1212 via a resistor 1356 and to a second end of feedback winding 1322 via a resistor 1358.

The emitter of transistor 1316 is connected to ground. In addition, the circuit is provided with additional circuit elements diode 1360; resistor 1362 connected in serial with capacitor 1364; and resistor 1366 connected in serial with LED 1368, all of which are connected in parallel with transistor 1316.

During operation, the DC input voltage from regulator 1212 is supplied to the circuit through inductor 1210, which, as noted above, acts like a constant current source. This current enters center-tap 1308 of primary winding 1304 of transformer 1230. Due to the asymmetries in the circuit, the current tends to turn one of the two transistors 1312, 1316 "on," and the other "off." The transistor that is "on" conducts current and creates a rising voltage across primary winding 1304. This in turn excites the secondary winding 1306 and load 1228. Since the secondary load (i.e., the capacitive load of the corona discharge device) is a resonant circuit, a resonant oscillation occurs. Near the peak of the oscillation, transformer 1230 enters saturation, which causes the two transistors 1312, 1316 to switch states, turning the transistor that was on, off, and the transistor that was off, on. Thus, an oscillation at a particular frequency which is a function of the load is created. If the properties of the load change, the oscillation frequency of the two transistors 1312, 1316 also changes due to magnetic feedback between load 1228 and inverter 1224.

In a preferred embodiment, the values of the circuit elements shown in FIG. 35 may be as follows:

| | |
|---|---|
| inductor 1310: 0.25 mH | resistor 1324: 200 ohms; |
| resistor 1336: 4.7K ohms; | capacitor 1338: 510 pF; |
| resistor 1340: 100K ohms; | resistor 1348: 200 ohms; |
| resistor 1356: 3.7K ohms; | resistor 1358: 200 ohms; |
| resistor 1362: 4.7K ohms; | capacitor 1364: 510 pF; and |
| resistor 1366: 100K ohms. | |

It has been found that realization of the objects of the present invention is significantly enhanced if power source 1000 provides at least 10 watts of power, and preferably at least 15 watts of power, to the corona discharge device. The amount of power supplied by power source 1000 is primarily a function of four factors: (1) the output frequency of power source 1000; (2) the capacitance of the corona discharge device; (3) the air breakdown voltage of the corona discharge device; and (4) the difference between that breakdown voltage and the voltage applied to the corona discharge device by power source 1000.

The maximum output frequency that may be provided by power source 1000 to the load is a function of the amount of capacitance in the system, and in particular, the amount of stray capacitance between power source 1000 and load 1020. Typically, the primary source of this stray capacitance is the capacitance of conductor 1026, ordinarily a cable, that connects the power source to the corona discharge device. Consequently, in a preferred embodiment, the length of the cable, and hence the capacitance of the system, is minimized by locating the power source close to, and preferably immediately adjacent to, the corona discharge device.

The high voltage transformer is the critical circuit element of power source 1000. It acts not only as a step up of the low voltage input signal, but also is a key component of the self-resonant oscillator circuit that converts the DC input into an AC waveform.

The high voltage transformer, however, is a significant source of power losses. Indeed, the majority of the power lost in the circuit is dissipated in transformer 1022. Keeping the power losses to a minimum, while maintaining a reasonable size and cost is the challenge in the transformer design. There are five main components in these losses:

1. Primary winding loss due to $I_p^2 R_p$ loss where Ip is the primary current (rms) and Rp is the resistance of the primary windings
2. Secondary winding loss due to $I_s^2 R_s$ loss where Is is the secondary current (rms) and Rs is the resistance of the secondary windings
3. Core loss, due to induced magnetic core flux densities.
4. Potting loss due to $(\omega C_x V_s^2) D_f$ loss, where $C_x$ id the stray capacitance of the transformer, $V_s$ is the secondary output voltage, and $D_f$ is the dissipation factor of the pottings.
5. Miscellaneous losses due to eddy currents, magnetostriction, etc.

The sum of all these losses is the total transformer loss. The first four losses can be readily quantified.

The potting loss is due to the capacitive current which flows from the windings to the ground. The potting material has a resistive component by which the capacitive current creates an $I^2R$ (Joule) loss. The resistive component is specified in a materials 'dissipation factor' which is the ratio of the resistive current to the capacitive current. The potting loss can dominate in an improperly designed transformer. Thus, the choice of an appropriate potting compound with a small dissipation factor (<=0.02) is preferred.

In addition, as one of ordinary skill in the art would recognize, the rule of thumb for optimizing a transformer is to choose a design that matches the core loss and the winding loss. More particularly, the core power loss equation for Type R Ferrite Material (from Magnetics data sheet):

$Pcore(Vp, Np, Ap, F, Vc) :=$ $$.000074 \left(\frac{f}{1000\,Hz}\right)^{1.43} \cdot \left[\left(\frac{B(Vp, Np, Ap, f)}{1000\,gauss}\right)^{2.85} \cdot Vc\right] \left(\frac{W}{cm^3}\right)$$

where Vc is the volume of the core. The frequency is a function of the capacitances of the system and the secondary inductance of the core:

$$freq(C, Ns) := \frac{1}{2 \cdot \pi \cdot Ns \sqrt{(C + Cp + Cx) \cdot Al}}$$

where C is cable capacitance.

The capacitive current flowing through the secondary winding of transformer 1022 is:

$I(C, Vs, Ns) := 2\pi \cdot (C + Cp + Cx) \cdot Vs \cdot freq(C, Ns)$

The resistance of the secondary winding of transformer 1022 is:

$Rs(Vp, Vs, Np) := (0.24\,ohm) \cdot Ns(Vp, Vs, Np)$

The resistance of the primary winding of transformer 1022 is:

$Rp(Np) := 0.0015\,ohm \cdot Np$

The above equations assume an 18 gauge primary wire and a 38 gauge secondary wire. Given the above, the primary winding loss may be calculated as:

$Ppriwinding(Vp, Vs, Np, C) :=$ $$\left[I(C, Vs, Ns(Vp, Vs, Np)) \cdot \left(\frac{Ns(Vp, Vs, Np)}{Np}\right)^2\right] \cdot Rp(Np)$$

and the secondary winding loss may be calculated as:

$Psecwinding(Vp, Vs, Np, C): I(C, Vs, Ns(Vp, Vs, Np))^2 \cdot Rs(Vp, Vs, Np)$

Figure 36:
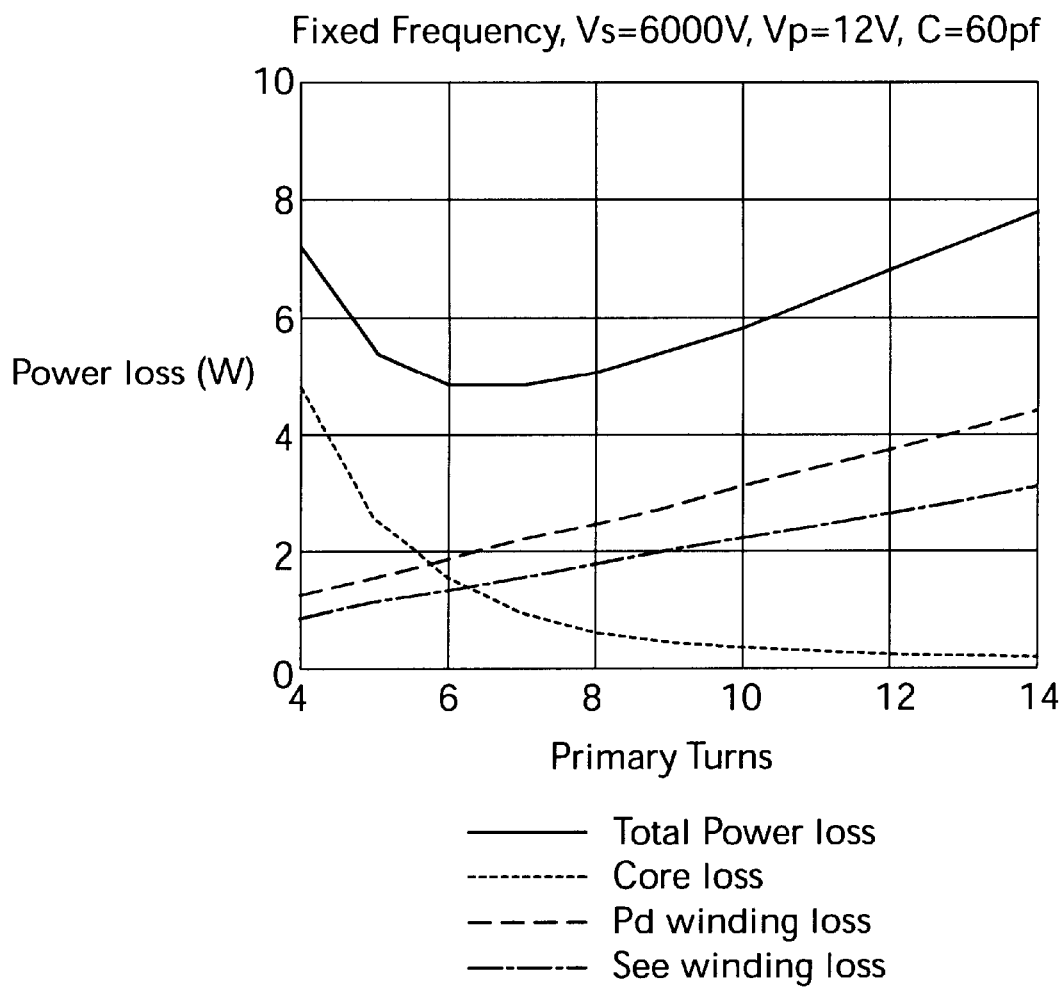
FIG. 36 is a graph that illustrates the optimum conditions for most transformer characteristics that yield a minimum power loss for a given frequency.

The potting loss may be calculated as:

$Ppotting(C, Ns, Vs, DF) := 2 \cdot \pi \cdot DF \cdot freq(C, Ns) \cdot Cx \cdot Vs^2$ Thus, the total power loss is:

$Ptotal\,(Vp, Vs, Np, Ap, C, Vc) := (Psecwinding(VP, Vs, Np, C) + Pcore(Vp, Np, Ap, freq\,(C, Ns\,(Vp, Vs, Np)), Vc)) \ldots + Ppriwinding(Vp, Vs, Np, C) + Ppotting(C, Ns(Vp, Vs, Np), Vs, DF)$ Exemplary values for these power losses are:

$Pcore(12V, 8, 2.15\,cm^2, 20000\,Hz, 18.2\,cm^3) = 0.478W$ $Ppotting(60\,pF, 2000, 6000V, 0.005) = 0.221\,W$ $Psecwinding(12V, 7000V, 8, 60\,pF) = 2.066\,W$ $Ppriwinding(12V, 7000V, 8, 60\,pF) = 3.391\,W$ where typically:

$freq(60\,pF, Ns(12V, 7000V, 8)) = 1.692 \times 10^4\,Hz$ $Rs(12V, 7000V, 8) = 504.177\,A^{-2}\,Ohm$ $Ns(12V, 7000V, 8) = 2.101 \times 10^3$ An example of an optimization calculation is shown in FIG. 36. The number of primary turns is varied, while keeping the other parameters constant.

Variables

Vp:=Primary side DC input voltage
Np:=Number of primary turns
Cp:=Capacitance of CDD
Cload:=Capacitance of load f:=Frequency of oscillation DF:=Dissipation factor of potting material

///

$C_x$=Stray capacitance of the transformer.

Equations $B(Vp, Np, Ap, f)$:=Magnetic inductance through core. $Ap$ is the area of the core, e.g., $B(12V, 8, 2.15 \text{ cm}^2, 20000 \text{ Hz})=1.745 \times 10^3$ gauss Ns (Vp, Vs, Np):=Number of secondary turns needed to generate Vs (rms secondary voltage)

A1:=Inductance per turn.

RperL:=Resistance per turn.

Lperturn:=length per turn

Vc:=Volume of core

Figure 37:
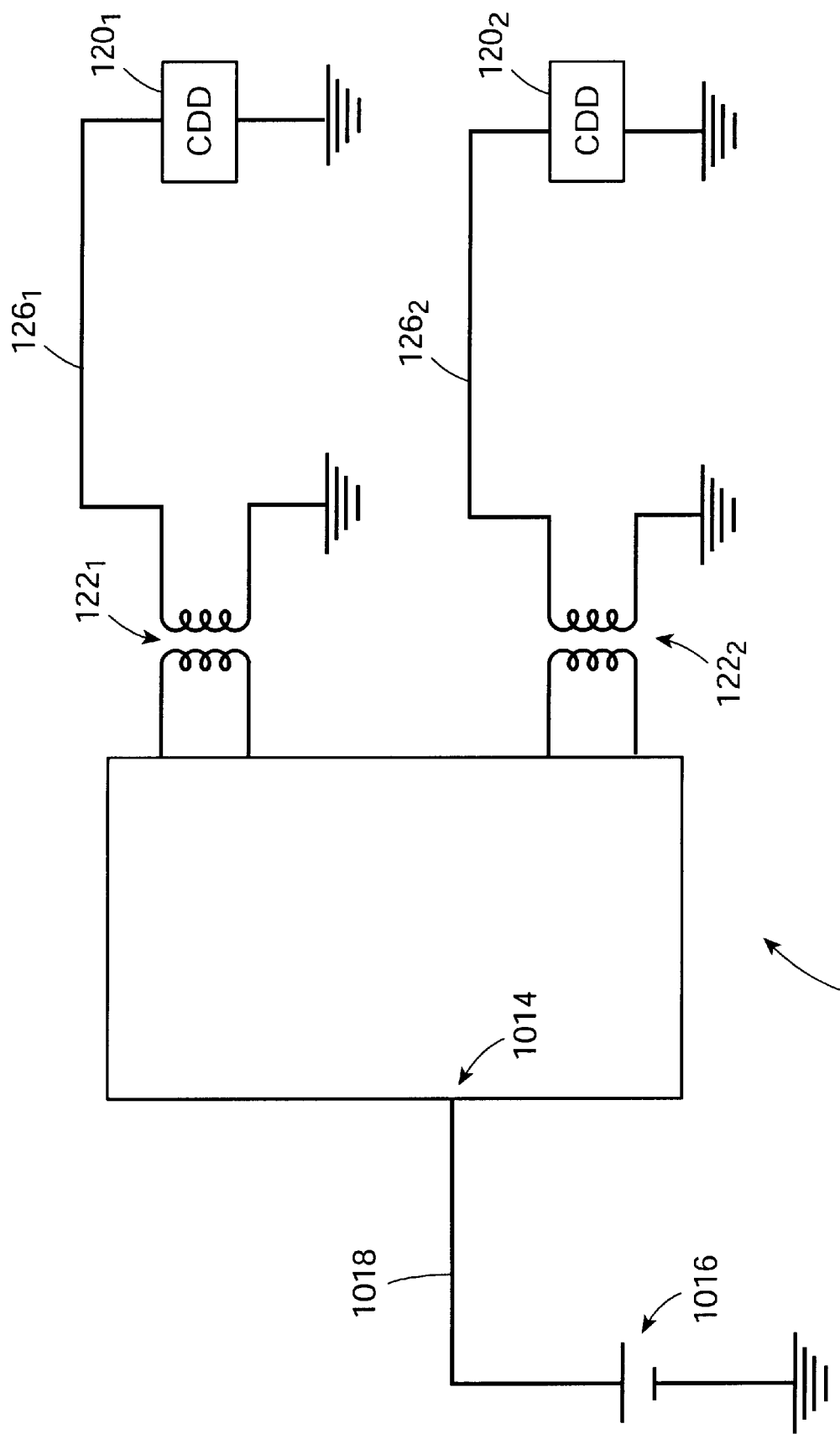
FIG. 37 is a block diagram illustrating a power source comprising two transformers each of which drives a CDD device.

Some ways of reducing the losses in the transformer are:

1. Decrease the primary winding resistance. Decreasing the primary winding resistance can be done by either increasing the size of the primary wire, or, preferably, by using multiple windings in parallel. In fact, due to the small number of primary windings typically used (<10), very little of the 'window area' of the transformer is used. This leaves room for multiple windings, without major modification of the transformer. This is preferred to increasing the size of the primary wire because of radial space constraints. If rectangular wire can be used, such that the radial width is not increased as the cross section is increased, this is a viable option.
2. Decrease the secondary winding resistance. This is difficult to do given the space constraints due to the large number of secondary turns (often >2000). Any increase in the wire size will result in a large increase in the necessary space. In general, the wire chosen is the largest one that will fit in the given space.
3. Improve the core characteristics by choosing a core with either a larger cross section, or a lower inherent loss. The former lowers the magnetic inductance in the core, lowering the loss. However, increasing the size of the core is not desirable from a cost and size perspective. Improving the material is not practical, as ferrites, the presently selected material, are ideal for this application due to their combination of low weight, cost, and loss at the frequencies encountered for the corona discharge device.
4. Optimize the total loss by matching the core and winding losses In an alternative preferred embodiment, power source 1000 may be provided with a pair of transformers 1022 each of which drives a corona discharge device 1020, as shown in FIG. 37. This embodiment may be desirable because it decreases device cost by sharing the cost of power source 1000 between two corona discharge devices 1020. In addition, this embodiment may be desirable because it decreases the amount of heat dissipated in each transformer 1022 and thus helps keep transformers 1022 below their maximum operating temperature which may be, for example, approximately 175° C.

The power module can be used to power one or more corona discharge devices. A power module is designed to drive a maximum capacitance, the system capacitance is dominated by the cable's capacitance and the capacitance of the corona discharge device. The sum of these capacitances, for the number of corona discharge devices in a system, must not exceed the drive capacitance rating of the supply.

When the power supply drives more than one corona discharge device, there are several options available for the system configuration, as shown in FIG. 53. FIG. 53 shows a single power module per corona discharge device system. Multiple corona discharge devices would use multiple systems, beginning with the DC filter block. (B) shows a 1 module, 1 transformer/corona discharge device system. Expansion of this system to multiple corona discharge devices requires increasing the number of transformers, and resizing the DC-AC inverter to handle the increased current. (C) shows a single module/single transformer system. One transformer powers multiple corona discharge devices. The transformer must be sized appropriately to handle the additional corona discharge devices. (D) shows a configuration similar to A. In this case, a separate DC-AC inverter and transformer power each corona discharge device. Only the DC filtering is shared. The battery symbolizes the system power source. It is not necessarily a battery—it could be the alternator (regulator) or another source of DC power.

A corona discharge device system such as those disclosed herein may be subject to a variety of mechanical and electrical failures that seriously degrade performance or, in extreme cases, harm corona discharge device 1020 or other system components. For example, corona discharge device 1020 will receive no power (and hence develop no corona) if, in the embodiment of FIG. 30, conductor 1026 is broken (open circuit) or disconnected from either corona discharge device 1020 or transformer 1022. Moreover, as noted above, if, in the embodiment of FIG. 32, inverter 1224 enters and remains in its high-frequency mode (e.g., if a short circuit to ground develops in power source 1210 or conductor 1234), power source 1210 may quickly burn out due to the high currents that occur in that mode.

Figure 38:
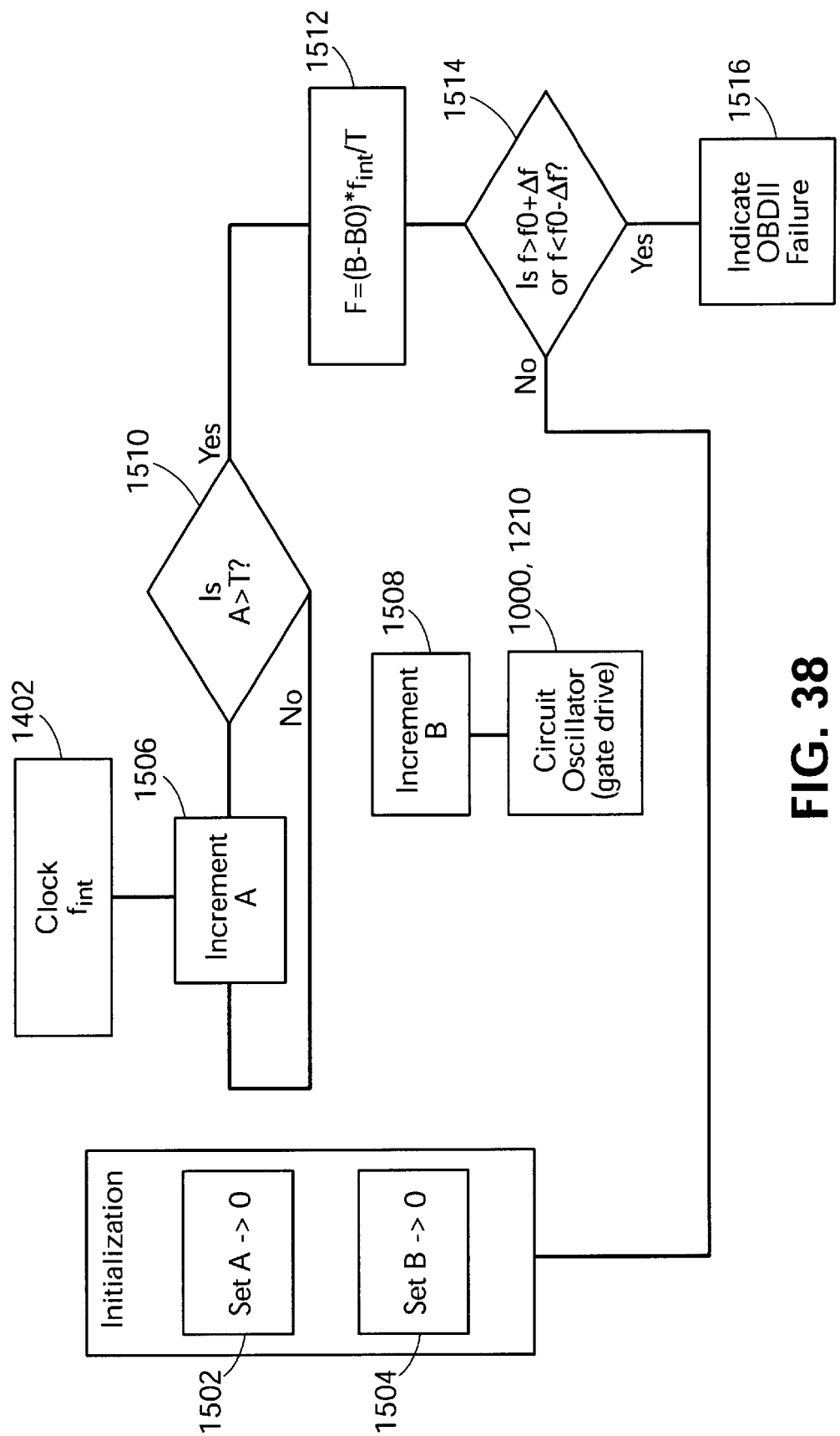
FIG. 38 is a hybrid block/flow diagram of a preferred embodiment of a first on-board-diagnostic system.

Accordingly, in a preferred embodiment, the disclosed corona discharge device system is provided with on-board diagnostic (OBD) tools that recognize and report such system failures to the vehicle's diagnostic computer. A preferred embodiment for a first such OBD system 1400 is shown in FIG. 38. OBD system 1400 preferably diagnoses an open circuit or disconnect of conductor 1026 and a short circuit to ground in power source 1000 or conductor 1026.

As shown in FIG. 38, OBD system 1400 preferably comprises a first counter A that is initialized to 0 at 502 and a second counter B that is initialized to 0 at 504. Counter A is then incremented by a clock 1402 oscillating at a frequency $f_{int}$, as shown at 1506. Counter B is incremented at 1508 once every oscillation of power source 1000. At 1510, after counter A has been incremented T times, the output frequency of power source 1000 is calculated at 1512 as $B/T*f_{int}$.

At 1514, this calculated frequency is compared to the nominal frequency of power source 1000 (i.e., the oscillation frequency when no error condition is present), plus or minus some acceptable delta f. If the calculated frequency of power source 1000 is outside this window, then a failure condition is detected and an error bit set at 1516 to indicate the failure. Otherwise, no error is detected, and the system returns to 1502.

The theory of operation of OBD system 1400 is as follows. If an open circuit occurs in conductor 1026 or if conductor 1026 becomes disconnected from power source 1000 or corona discharge device 1020, then the capacitance of the load on power source 1000 changes significantly. Since the oscillation frequency of, for example, inverter 1224 in FIG. E is: $1/(2*pi*sqrt(LC))$, where L is the inductance of transformer 1022 and C is the capacitance of load 1020, the oscillation frequency of inverter 1224 will change significantly if such an open circuit or disconnect occurs. Thus, by detecting the shift in output frequency from power source 1000 one can detect the occurrence of this failure.

Moreover, as noted above, if a short circuit to ground occurs in, for example, conductor 1034, then inverter 1224 in FIG. 34 may switch to its high-frequency pole. Experimental results indicate that this shift may be on the order of a change in frequency from 15 KHz to a frequency greater than 75 KHz. By detecting this frequency shift, such a short circuit failure may be detected. It should also be noted that the output voltage typically drops by a significant amount when this failure occurs. Thus, another technique for detecting this failure would be to compare the expected output voltage to the actual output voltage. This second technique may be used on its own or as a complement to OBD system 1400.

Figure 39:
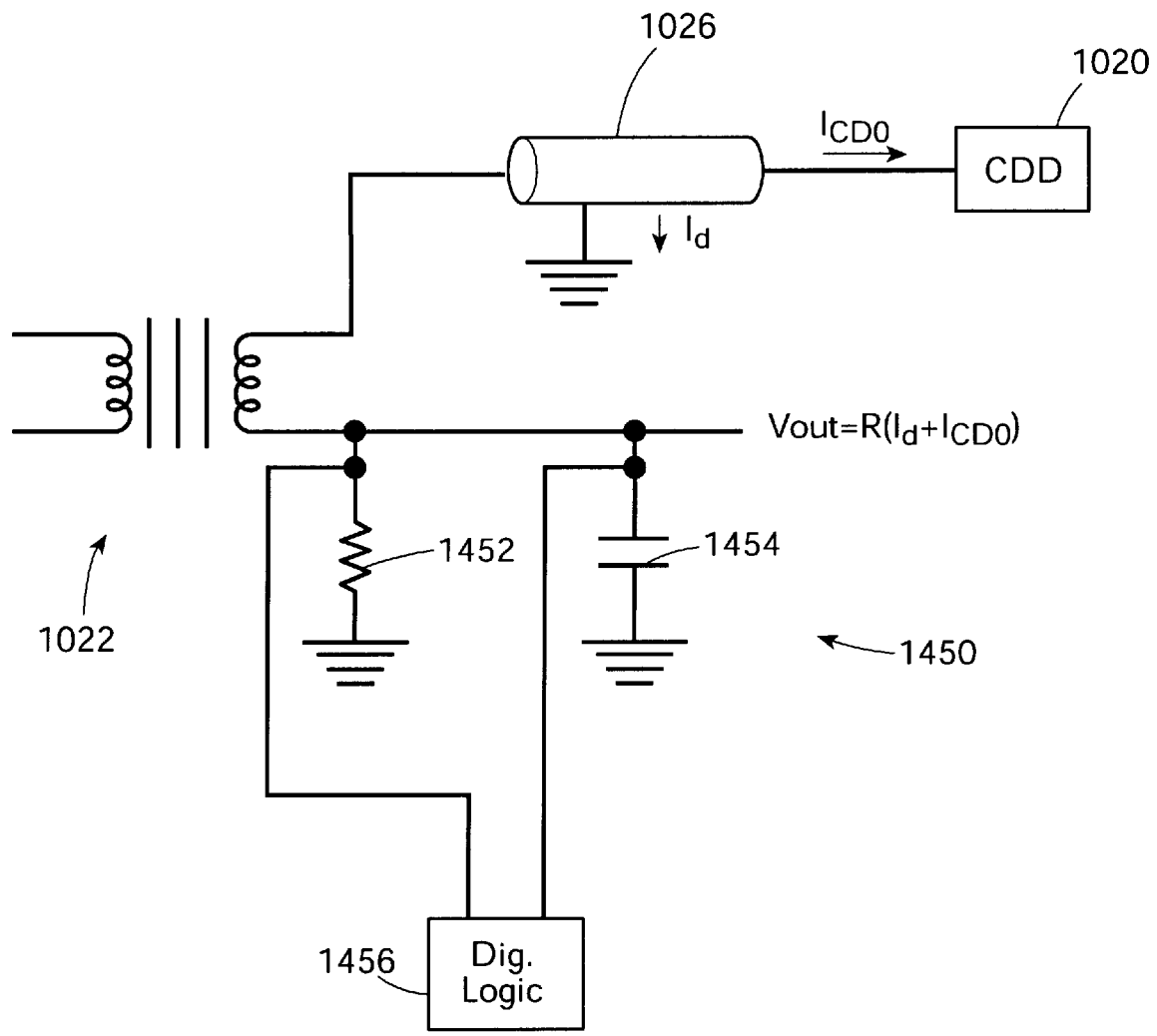
FIG. 39 is a block diagram of a first preferred embodiment of a second on-board-diagnostic system.

A second OBD system 1450 for detecting cable breakdown or failure of corona discharge device 1020 is shown in FIG. 39. As shown in FIG. 39, OBD system 1450 preferably comprises a resistor 1452 and a capacitor 1454 connected between the ground side of the secondary winding of transformer 1022 and ground. Appropriate values for resistor and capacitor may be 100 ohms and 0.5 pF, respectively. At these values, each of resistor 1452 and capacitor 1454 exhibits a voltage of 3V assuming an output current of 30 mA and an output frequency of 20 KHz through the secondary winding of transformer 1022. This output voltage may be read directly by digital logic 1456. Significant variations from this output voltage may be interpreted as demonstrating a system failure.

Figure 40:
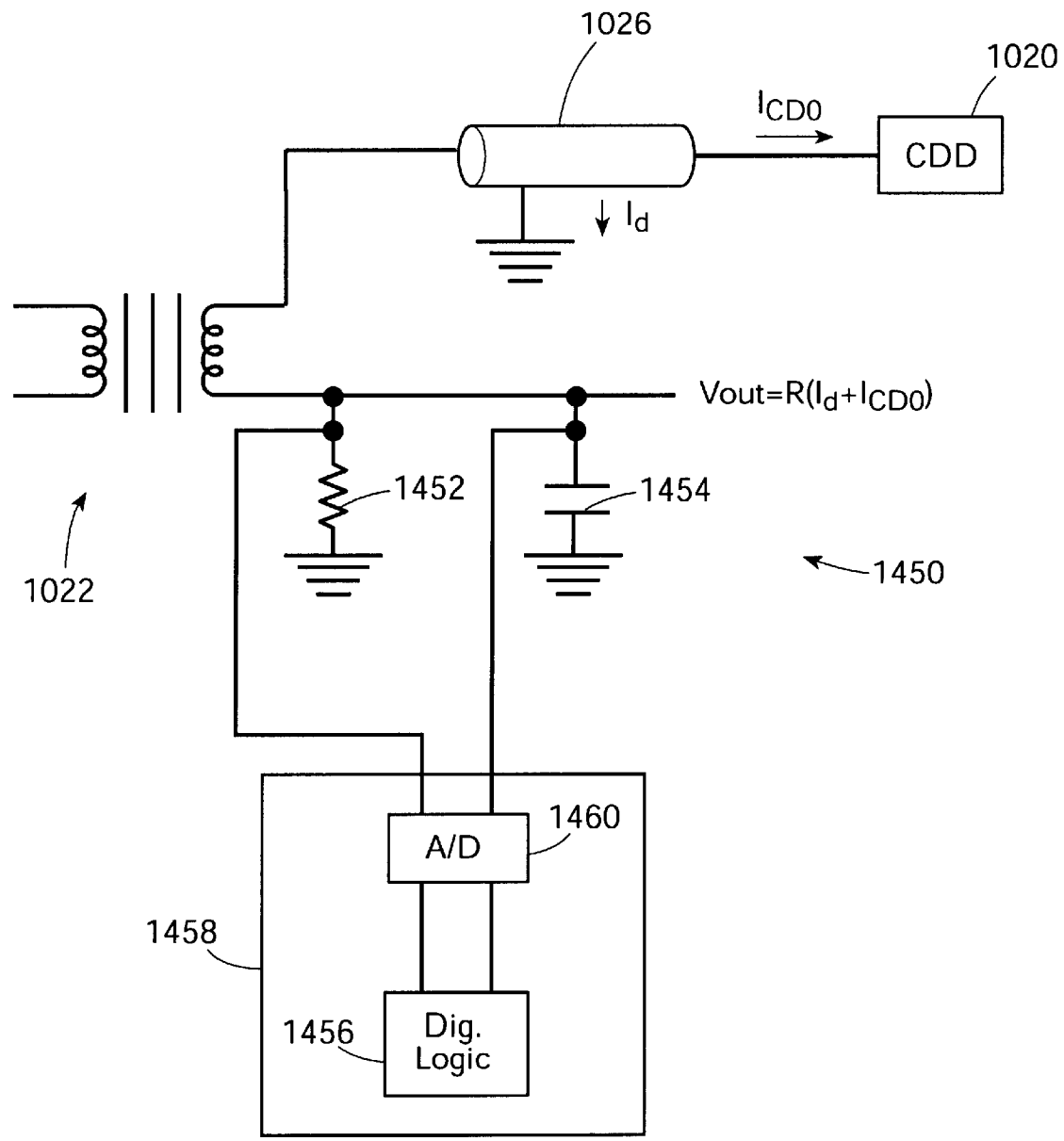
FIG. 40 is a block diagram of a second preferred embodiment of the second on-board-diagnostic system.

A further preferred embodiment of this second OBD system 1450 is shown in FIG. 40. Several of the components in FIG. 40 are the same as in FIG. 39, and like components are designated by like numerals. In addition, the preferred embodiment shown in FIG. 40 further comprises a processor 1458 comprising an A/D converter 1460 that reads the output voltage of resistor 1452 and capacitor 1454. A/D converter 1460 may preferably be approximately a 4 to 6 bit A/D converter. The output of A/D converter is supplied to digital logic 1456 for further processing and failure identification. This arrangement provides sufficient precision to detect cable breakdown or failure of corona discharge device 1020.

Moreover, since the voltage output of resistor 1452 depends on the output current in secondary winding 1076 and since the output voltage of capacitor 1454 depends on both that current and the output frequency of power source 1000, the use of both resistor 1452 and capacitor 1454 along with processor 1458 allows both the current through the secondary winding of transformer 1022 and the output frequency of power source 1000 to be measured. This is a preferred combination because frequency shifts provide a much more sensitive means of detecting degradation or failure in the system than current changes.

A further preferred embodiment of this second OBD system 1450 that also measures the plasma power delivered to the load is described in connection with FIGS. 41 to 46. The plasma power is reflected in the phase difference between the output voltage and the output current. The output voltage of transformer 1022 may be measured using either a resistive or capacitive voltage divider network to provide a workable output voltage.

Figure 41:
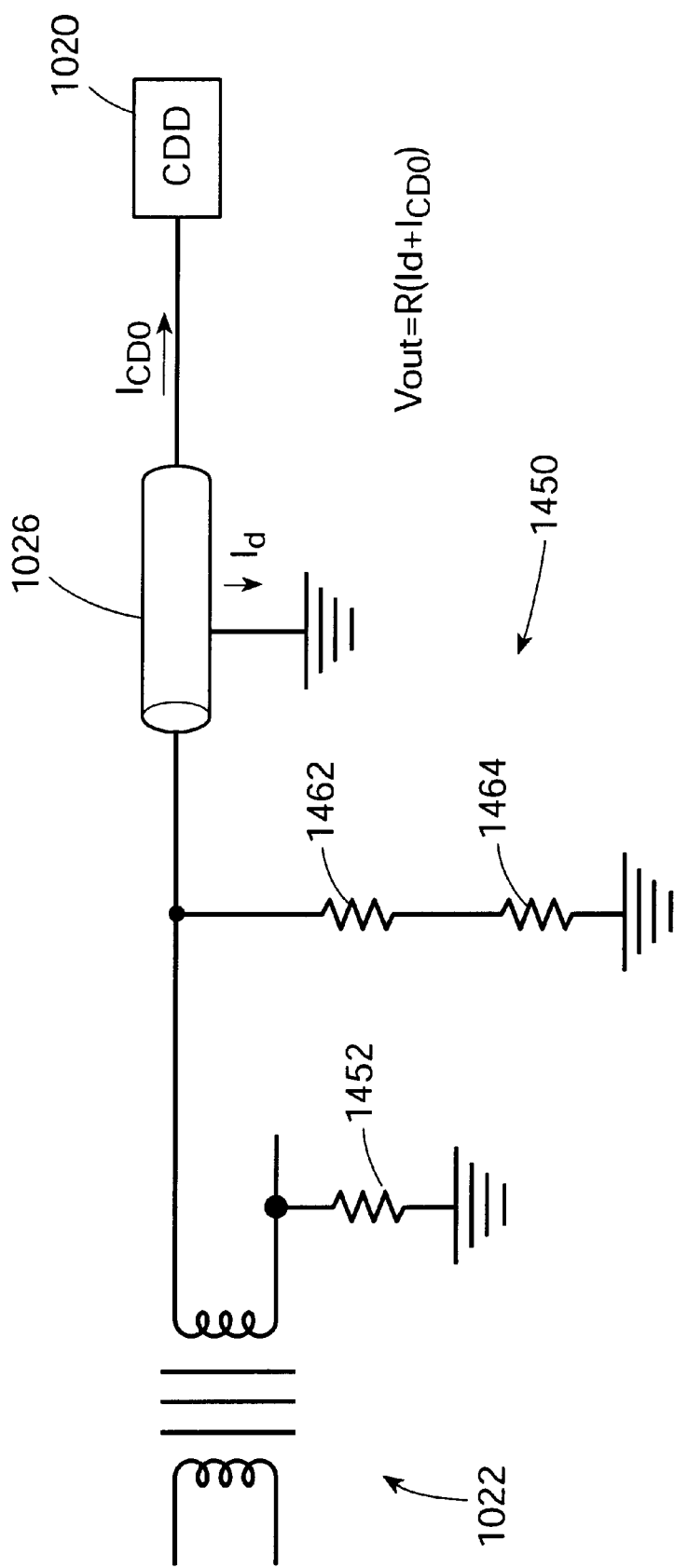
FIG. 41 is a block diagram of a third preferred embodiment of the second on-board-diagnostic system.

Several of the components in FIG. 41 are the same as in FIG. 39, and like components are designated by like numerals. In addition to those components, the further preferred embodiment shown in FIG. 41 comprises a first resistor 1462 and a second resistor 1464 connected in series between the second terminal of secondary winding 1076 and ground. In a preferred embodiment (for the case where the output voltage delivered to the load is approximately 25 volts) resistor 1462 may preferably be approximately $10^8$ ohms, resistor 1464 may be approximately $4\times10^5$ ohms, and resistor 1452 may be approximately 300 ohms.

Figure 42:
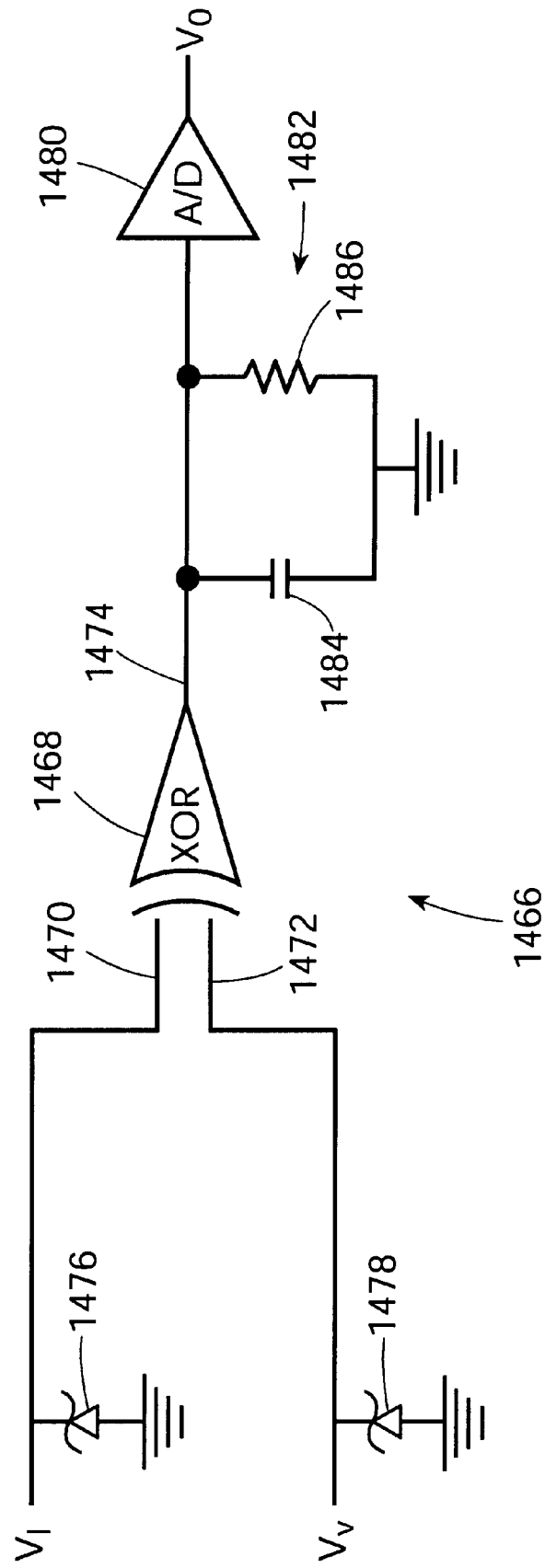
FIG. 42 is a block diagram of a phase shift determining circuit for use with the third preferred embodiment of the second on-board-diagnostic system.

The voltage across resistor 1452 (designated $V_I$) and the voltage across resistor 1464 (designated $V_v$) are fed to a phase shift determining circuit 1466 shown in FIG. 42. As shown in FIG. 42, phase shift determining circuit 1466 preferably comprises an XOR gate 1468 having a first input 1470, a second input 1472, and an output 1474. A first zener diode 1476 is connected between first input 1470 and ground and a second zener diode 1478 is connected between second input 1472 and ground. Output 1474 is connected to an A/D converter 1480. An RC filter 1482 comprising a capacitor 1484 and a resistor 1486 is connected between output 1474 and ground.

The theory of operation of this preferred embodiment of second OBD system 1450 is now explained in connection with FIGS. 43 to 46. The original voltage and current output waveforms are shown in FIG. 43 as solid and broken waveforms, respectively. Those waveforms are clamped to a voltage of approximately 3–5 V by zener diodes 1476, 1478 creating the waveform shown in FIG. 44. The clamped waveforms are then input to XOR gate 1468 which outputs a signal only where the clamped waveforms do not overlap, as shown in FIG. 45. The output of XOR gate 1468 is filtered by RC filter 1482 and converted by A/D converter 1480 which generates an output voltage $V_O$. Output voltage $V_O$ is a function of the phase shift between the current and voltage provided to the load, as shown in FIG. 46, and, thus, a measure of the plasma power.

Knowledge of the plasma power is useful because it is a direct indicator of system failure, and because it permits calculation of the exhaust pressure. In particular, the expression for the plasma power is:

$$P=4*C_d*f*V_s*\{V_o-((C_d+C_g)/C_d)*V_s\}$$

Where:
 P is the plasma power;
 $C_d$ is the dielectric capacitance;
 $C_g$ is capacitance of the air gap;
 f is the frequency;
 $V_s$ is the breakdown voltage of the gap; and
 $V_o$ is the output voltage described above As the equation above demonstrates, if P, f, $C_d$, $C_g$, and $V_o$ are known then the voltage $V_s$ may be determined. The exhaust gas density (N) may then be determined from the well known Paschen breakdown curve of $V_s$ versus N, as found in Meeks and Craggs, ELECTRICAL BREAKDOWN OF GASES. Then, if the exhaust temperature is determined (using, for example, a temperature sensor or the engine/exhaust operating parameters), the exhaust pressure may be determined from N, T, and the Ideal Gas Law. From this, any anomalous back pressure may be detected, based on knowledge of normal operating pressure. The ability to determine exhaust pressure may be of particular importance in diesel exhaust system applications where particle traps are employed.

In a preferred embodiment, the D/A capability necessary to implement the above-described circuits may be provided by the motor vehicle's on-board diagnostic system which typically includes built-in D/A capability. Typically, the on-board diagnostic system will comprise a multiplexed data bus over which it may address OBD system 1450 and receive corona discharge device power supply status data collected by OBD system 1450.

Figure 47:
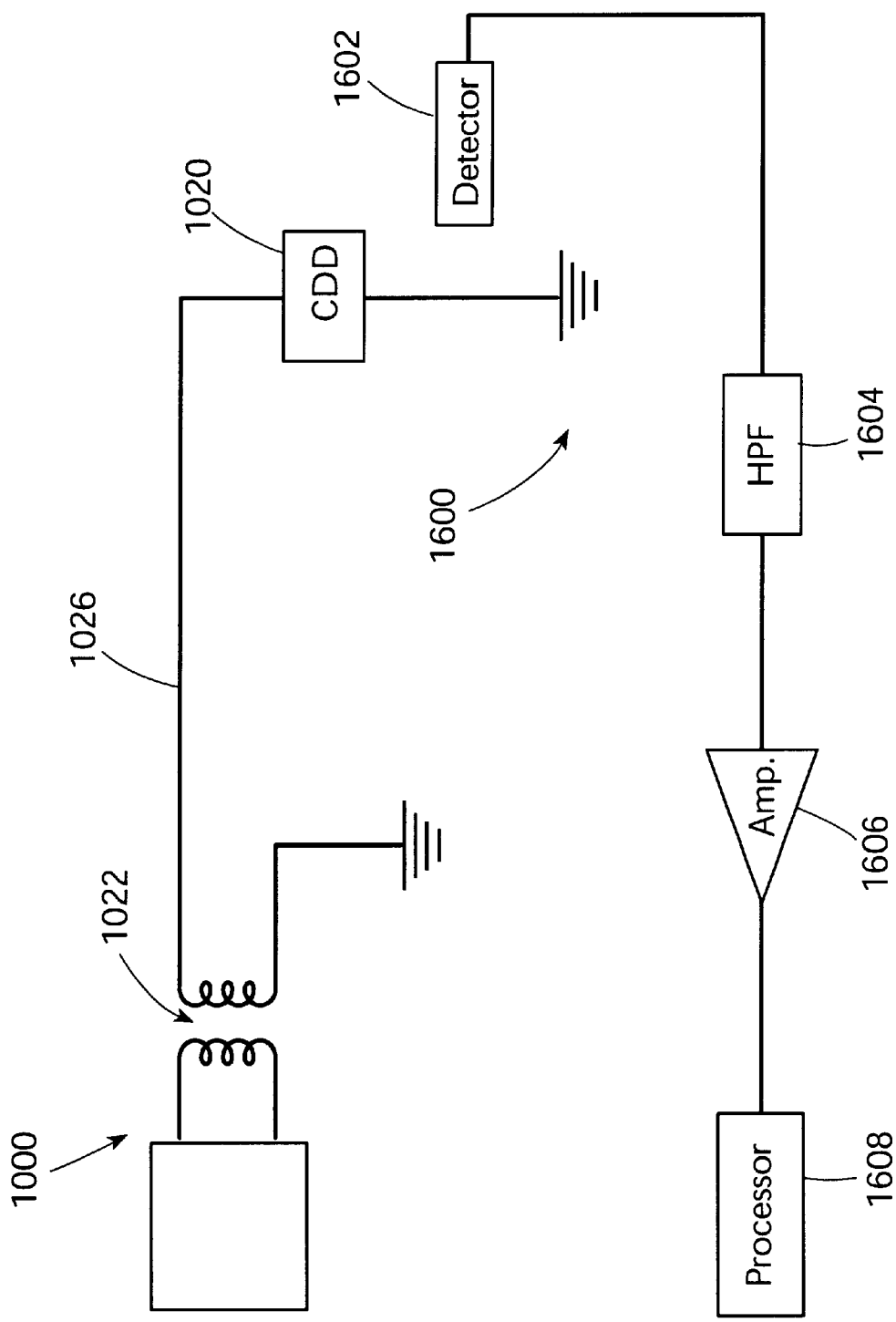
FIG. 47 is a block diagram of a preferred embodiment of a third on-board-diagnostic system.

A third OBD system 1600 is shown in FIG. 47. The purpose of OBD system 1600 is to detect high frequency ground currents in the vicinity of the point where corona discharge device 1020 is located, such as where corona discharge device 1020 is threaded into the exhaust pipe. It has been determined that such high frequency ground currents are correlated to the actual current delivered to corona discharge device 1020. Thus, OBD system 1600 provides a mechanism for more accurately assessing the current actually delivered to corona discharge device 1020 than simply measuring the current supplied by power source 1000 or running through cable 1026. Measurements of these other currents may not accurately reflect the amount of current actually delivered to corona discharge device 1020 if, for example, a short circuit exists between the point where the current is measured and corona discharge device 1020.

As shown in FIG. P, OBD system 1600 preferably comprises a detector 1602 located near the point where corona discharge device 1020 is connected to ground for detecting high frequency currents. Detector 1602 may, for example, comprise an antenna or inductive coil. Alternatively, high frequency currents may be detected by placing a resistor or probe on the ground loop.

As further shown in FIG. 47, OBD system 1600 may further preferably comprise a high pass filter 1604 to filter out the high frequency ground currents from other frequencies that may be present such as signals at the oscillation frequency of power source 1000. The filtered signals may then preferably be amplified by an amplifier 1606 and provided to a processor 1608. Processor 1608 processes the received signals to determine the actual current delivered to corona discharge device 1020. Threshold values may be set by processor 1608, below which a diagnostic light may be set indicating lack of sufficient corona. It should be noted that this technique may, in some cases, fail to discriminate against strong stray coronas that might be caused, for example, by a broken cable.

Figure 48:
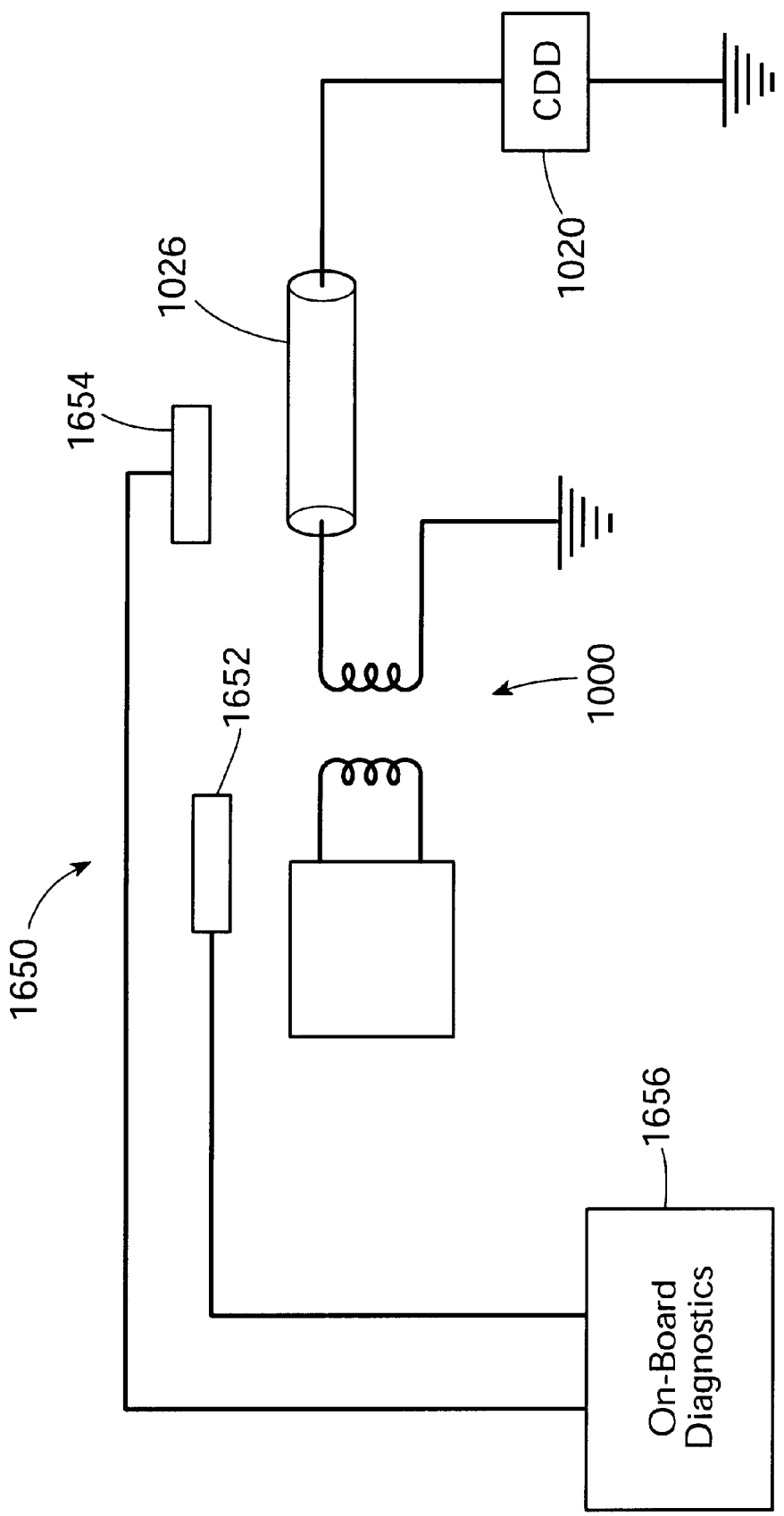
FIG. 48 is a block diagram of a preferred embodiment of a fourth on-board-diagnostic system.

A fourth OBD system 1650 is shown in FIG. 48. The purpose of OBD system 1650 is to detect even small amounts of high-frequency electro-magnetic interference (EMI) that may leak out of power source 1000. As shown in FIG. 48, OBD system 1650 comprises a detector 1652 located near power source 1000. In a preferred embodiment, detector 1652 may be an antenna or inductive coil. The output of detector 1652 may be supplied to the vehicle's on-board diagnostics 1656. In addition, as in OBD system 1600, OBD system 1650 may employ high-pass filtering, amplification, and a processor to further process detected signals before forwarding them to the vehicle's on-board diagnostics.

As will be readily understood by one of skill in the art, in a typical application, some sort of electrical connection between the required high voltage power supply and the corona discharge device, such as a high voltage cable and connector, is necessary to transmit power from the high voltage power supply to the corona discharge device. Although, in some applications, it could be desirable to directly couple the power supply to the corona discharge device, the high temperature environment and the limited space available around the corona discharge device in a typical vehicular application makes the direct coupling of the power supply or transformer to the corona discharge device extremely difficult, although not impossible. However, it is typically simpler to mount the high voltage power supply remotely, and use a cable to connect the power supply to the corona discharge device. This requires a cable capable of transmitting high voltage and current from the high voltage power supply to the corona discharge device, and preferably provides a compact, robust, watertight cable assembly. Such a compact, robust, watertight cable assembly is shown attached to one embodiment of a corona discharge device in FIG. 49.

Figure 49:
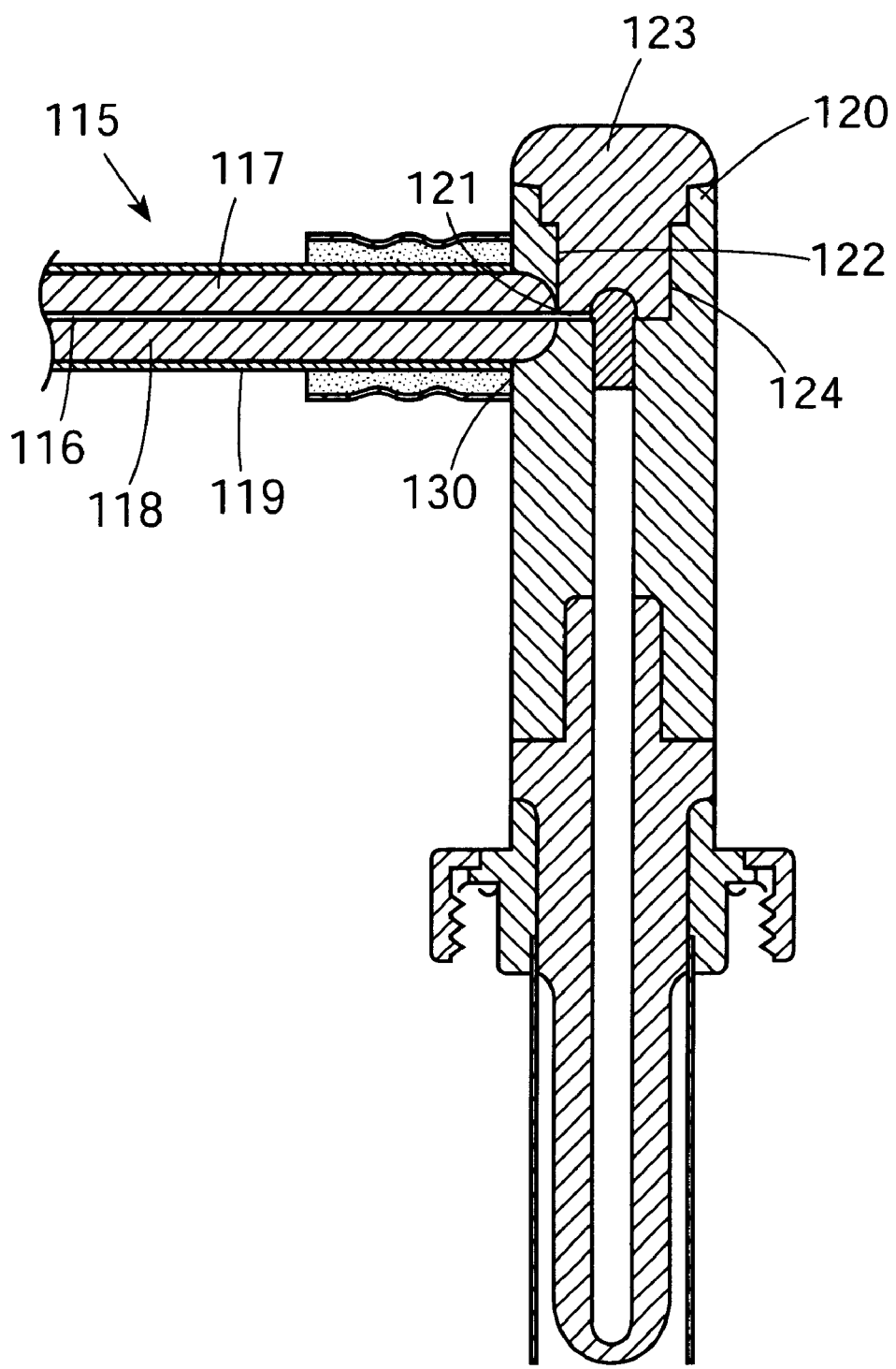
FIG. 49 is the preferred cable and connector.

For a 200 horsepower engine, an example of a corona discharge device of the invention uses about 10 to about 30 kV peak-to-peak, at about 10 to about 30 kHz, and about 15 W to about 40 W, preferably about 25 to about 30 W, of power. There often two or more corona discharge devices on such an engine. As shown in FIG. 49, the cable 115 required to transmit that amount of power at that voltage and frequency in a vehicular application should have a center conductor 116 capable of handling 15 W to 40 W of real power, and 200 W of reactive power, sufficient breakdown strength to transmit 30 kV for at least about 5000 hours at 225° C., EMI shielding, corona suppression, low capacitance to minimize circuit and material loss, a dissipation factor of less than about one percent, resistance to chemical attack, the ability to mate with a suitable weatherproof connector, and temperature resistance, i.e, 125° C. on transformer side, and 225° C. on corona discharge device side, and 40° C. on both sides. In addition, the cable 115 should be compact, flexible, and relatively low cost.

As noted above, the cable 115 must handle voltages of about 30 kV peak to peak, and, thus, the insulation material 117 used in the cable should therefore not break down under these conditions. Therefore, a 50 percent margin is typically provided to insure durability. Breakdown generally occurs because the electrical field strength in the insulation material 117 surpasses the breakdown field strength of the material, such that a conductive path forms in the insulator, forming a destructive arc that irreparably damages the insulator.

To avoid breakdown, the following equation must be satisfied:

$$V_{app}/a * 1n(b/a) < M * E_{br} \tag{1}$$

where $E_{br}$ is the breakdown energy, a is the radius of the inner conductor, b is the radius of the outer insulator, and M is the inverse of the safety margin desired, e.g., for a safety margin of a factor of two, M=0.5. This equation places a limit on how small an inner conductor 116 can be. This in turn affects the choice of a capacitance of the cable.

Whenever the electric field in air is above the breakdown threshold, which is 28 kV/cm at room temperature, and 16 kV/cm at 225 C. (both for planar geometries). In the cable, the corona typically occurs where small air gaps exist between conductor and insulator. This can be at either the high voltage conductor or ground side conductor. In order to avoid these air gaps the conductor and the insulator are preferably bonded. The bonding can occur naturally around the center conductor if care is taken during the cable extrusion process and the appropriate materials are used. However, the outside of the insulator is generally not bonded to the ground shield. The field strength at the outer surface of the insulator is given by the equation:

$$(V_{app}/b) * 1n(b/a)) \tag{2}$$

where $V_{app}$ is the applied peak voltage, b is the radius of the outer surface, and a is the radius of the inner conductor. When no shielding is present, or if the shielding is loose, corona will occur wherever the breakdown field strength of air is exceeded. This may be prevented by bonding an outer shield 118 to the insulator 117. However, with existing technology, this is not readily achieved with a metal shield. However, it is possible to bond a partially conductive polymer shield to the insulator, eliminating the air gaps between the insulator and shield. The conductivity of this shield 118 should be high enough to reduce the field strength, but it is not typically high enough to provide adequate EMI shielding. An additional metallic shield layer 119 is used to suppress EMI. This metallic shield 119 need not be tightly bound to the partially conductive shield 118, however, as that layer has already eliminated the high fields that can cause corona. Therefore, by applying a partially conductive, tightly bound polymer layer 118 to the insulator 117, and over-wrapping it with a good metallic shield 119, a corona-free, shielded cable can be constructed.

High-frequency, high-voltage signals, such as those transmitted down the cable 115, are capable of generating significant amounts of electrical noise, i.e., EMI, which, if not shielded, will couple to surrounding metal surfaces, including grounds and signal lines. Such noise can affect the performance of nearby electronic equipment, and, thus, is preferably significantly reduced or eliminated. Preferably, this noise is suppressed or eliminated by fully shielding the cable with a metallic shield 119, such as a braid, which allows the cable to remain flexible. More preferably, the shield surrounds a corona-suppressing layer 118, such as that described above, which is tightly bound to the insulator 117. The braid is preferably fairly tightly bound, so as to cause good EMI suppression, and highly conductive, so to prevent the emission of EMI by the braid.

Because high frequency, high-voltage is being sent through the cable 115, any cable capacitance will generate 'reactive power'. The amount of reactive power generated by the cable is given by the equation:

$$P_{reactive}=2\pi f^* C_{cable} V_{rms}^2, \quad (3)$$

which corresponds to a 'reactive current' given by the equation $$I_{reactive}=2\pi f^* C_{cable} V_{rms}. \quad (4)$$

The reactive power generates loss in the cable due to the dissipation factor of the cable. The dissipation factor, DF, is a measure of the AC loss of a cable. The total cable loss is a function of the dissipation factor, and is given by the equation $$P_{loss}=DF^* P_{reactive} \quad (5)$$

The reactive current induces loss in the transformer due to $I^2_{reactive} R_s$ loss, as described previously. Therefore, the lower the capacitance, the lower the loss. The capacitance of the cable can be described as:

$$C_{cable}=2\pi L \epsilon \epsilon_0 / \ln(b/a) \quad (6)$$

where L is the length of the cable, $\epsilon$ is the relative dielectric constant of the cable, and $\epsilon_0$ is the permittivity of free space.

To minimize the capacitance per unit length, $\epsilon$ should be minimized, which may only be accomplished with material selection. Materials such as TEFLON® and silicon are preferred due to their characteristics, such as low $\epsilon$ and high temperature resistance. Increasing the b/a ratio will also lower the capacitance. This may be accomplished by increasing b, which is undesirable, since the cable then becomes large and expensive, or by decreasing a, which is limited by the internal field strength as discussed above.

In practice, the physical limitations placed on the wire size limit the value of a. Construction of coaxial cables with internal conductors smaller than 24 gauge is very difficult. It is also difficult to mate a small conductor to the connectors. These practical concerns fix the value of a to as small as possible. The value of b is then chosen to minimize the capacitance. This determines the size of the cable, while keeping the field strength around the internal conductor below the breakdown strength of the insulator material. Silicone is an excellent material as discussed above, and has advantages over TEFLON®, being both bondable and lower in cost. However, silicon has a disadvantage relative to TEFLON® in that it has a higher $\epsilon$ (2.8 to 3.8 v. 2.1) than TEFLON®.

From equation 3, given above, it can be shown that the reactive power is proportional to the cable capacitance. Thus, to minimize this loss, a low capacitance and a low dissipation factor material are preferred. TEFLON® provides the lowest loss dielectric, but problems with corona and cost precludes its use. Therefore, a silicone is typically chosen having a DF of less than about one percent to minimize the loss.

To handle the necessary current, which is a combination of the reactive current and the real current, the center conductor must be sized accordingly. Typically, the capacitance of the system is sufficiently low to maintain the reactive current at no more than about 100 to about 200 mA. As the real current is in typically very low, i.e., less than about 1 mA, the reactive current dominates. A current of 200 mA typically requires a wire having a gauge of greater than about 31, which is significantly smaller than the physical limitations imposed by cable construction and handling, and, thus, the current handling capability of the cable is not a factor in the design.

Any product put under the hood of a motor vehicle should be capable of resisting chemical attack from a variety of substances found in and around the vehicle, typically ranging from fuel to road salt. Therefore, the cable is preferably protected by an outer insulation that covers the shielding braid, is resistant to chemical attack, and is not permeable to fluids. Useful materials include, but are not limited to, TEFLON® and specially processed silicones and/or fluorosilicones. The thickness of the jacket is preferably selected as the minimum required to adequately protect the cable for the projected life of the cable, maximizing cable flexibility and minimizing cost.

The cost of the cable is a function of the cable material, the cable volume, and the cable construction. Typically, the material is the driving force in cable cost, with TEFLON® costing three to four times as much as silicone. The volume of material directly affects the cost, so that a smaller TEFLON® cable could be the same price as a larger silicone cable. The construction of the cable, i.e. the number of corona suppressing layers, the conductor material, the shield material, and the jacket material all play key roles in determining cost. The choice of cable construction is first made on a technical basis, with the prevention of corona and breakdown primary goals, and the reduction in capacitance also important. The jacket is chosen as discussed above.

As in the case of chemical attack, the cable materials are preferably chosen to survive temperature extremes, which can range from as low as about −40° C. to as high as about 225° C. depending on where the vehicle is stored and used. Such temperature extremes result in severe temperature cycling, that can cause premature failure in a cable. A silicone material is generally preferred as it is resistance to temperature extremes. However, silicone has a large coefficient of thermal expansion that can cause problems if not factored into the design of the cable.

The physical flexibility of the cable is important for packaging considerations. It is likely that the exact location of the power supply, relative to the corona discharge device will be known in advance for a particular application.

Therefore, the cable must be flexible enough to be routed to the corona discharge device under most circumstances, and a minimum bend radius must be specified, which is typically about eight times the diameter of the cable. Therefore, the cable size is preferably minimized to obtain the desired bend radius. Silicone typically has a lower bend radius than an equivalently sized Teflon cable.

The mating of the cable 115 to a suitable weatherproof connector 120 is important for integrating the cable into a system. The cable must be easily strippable and processable to facilitate construction of the cable, which prevents the use of certain types of corona suppressing layers because they are too tightly bonded from the inner insulator, and, thus, cannot be removed separately. The center conductor 116 should sufficiently large to allow mating to a pin 121 possible, and the jacket material 117 must take a crimp, so that the connector 120 will stay attached to the cable 115. Most jacket materials, including Teflon and silicone, take the required crimp.

A connector from the cable 115 to the power supply (not shown) is necessary to provide serviceability and flexibility in installation. This connector is preferably weatherproof, corona-free, durable at the voltage levels and frequencies encountered during operation, able to withstand temperature variation from about −40° C. to about 125° C., and easy to actuate.

As shown in FIG. 49, a basic connector design 120 useful with the invention mates to the high voltage cable 115 described above on one end, and the other mates to the power module, and the power module has a mating connector that interfaces to the high voltage transformer. The cable 115 and the connector 120 interface via a crimp 130. The crimping surface is part of the connector 120, but the crimp 130 is designed with an underlying crimp ring, which protects the cable 115 from damage during the crimping process.

Crimping is accomplished by first stripping the jacket 117 from cable. The Crimp ring is then positioned over cable, the braid is pulled over crimp ring, and the heat shrink is placed over cable 115, which is followed by the connector shell 120. The stripping of the exposed cable end is finished as desired, and a receptacle 122 is soldered to end of cable. The cable is inserted into a pre-assembled connector 120, bottoming out the cable against a silicone plug 123. The connector flange is then crimped, forming a uniform crimp, having at least six points of contact, i.e., hex. The heat shrink is brought over flange, and shrunk. The resulting crimp is weatherproof, and can withstand more than about 40 pounds of pull force.

The connector 120 itself comprises a silicone plug 123, fitted inside a slotted can 124. The plug 123 is designed to fill as much air space as possible inside the can 124, with small pockets of air space remaining to allow for the thermal expansion as the can 124 heats up. The pockets are preferably sized and placed in such a way that the field strength inside the pockets is less than the corona onset voltage of air, even at 125° C., thereby preventing stray corona from forming.

The slotted can 124 consists of three slots at the bottom of the can 124, which fit over pins on the mating connector, and keep the cable 115 from rotating, as cable rotation can couple into a rotation of the central conductor, which can cause the wire to break. A one quarter turn shell, having three wedges cut out in its side, fits over the can. The wedges mate with the pins on the mating connector, so that rotating the shell a half turn forces the wedge to contact the pin, pulling the entire cable assembly down. The wedge has a small step, so that after a half turn, the step captures the pin, and keeps the shell from counter-rotating. The plug is forced downward, onto the mating surface of the mating connector, creating an air-tight, arc-free seal. The design of the plug is such that this seal is air-tight under the lowest temperature conditions, and under the worst possible tolerance stack-ups.

In its simplest form, the transformer side mating connector comprises a base having three pins equally spaced around its perimeter. The pins fit into slots in the connector can, and provide a surface against which the wedges in the outer shell push to force the connector down. The base has an interior surface that mates flush with the silicone plug. The interior surface of the base is contoured to extend the surface path length from the center electrode to the outer shell, minimizing the probability of arc formation along the surface.

Figure 50:
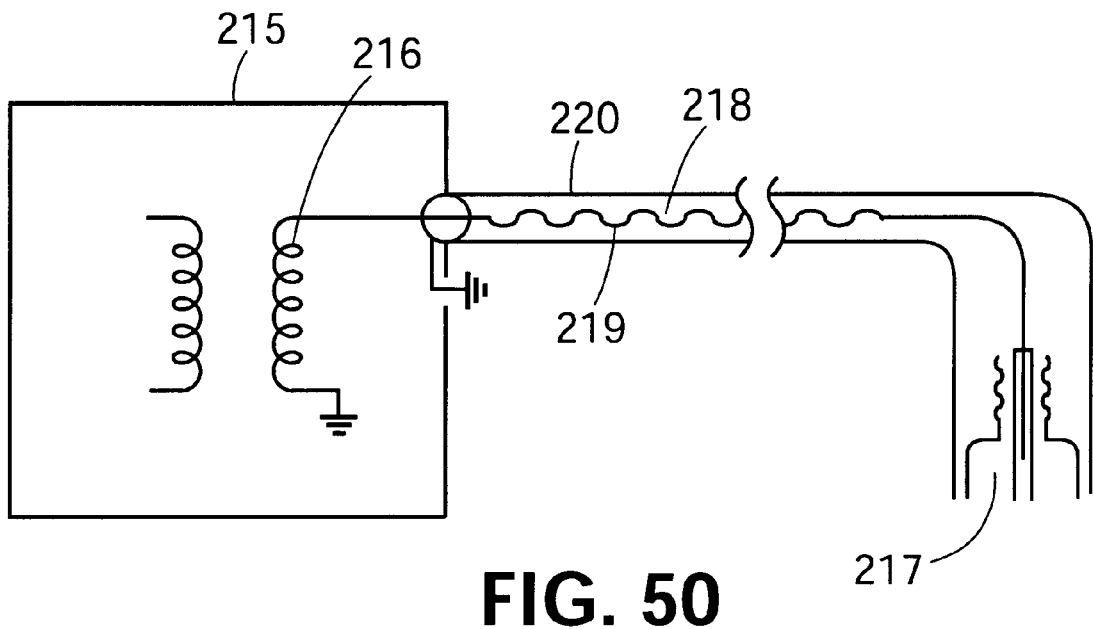
FIG. 50 is a corona discharge device and power supply connected by a cable with a distributed resistor.
Figure 51:
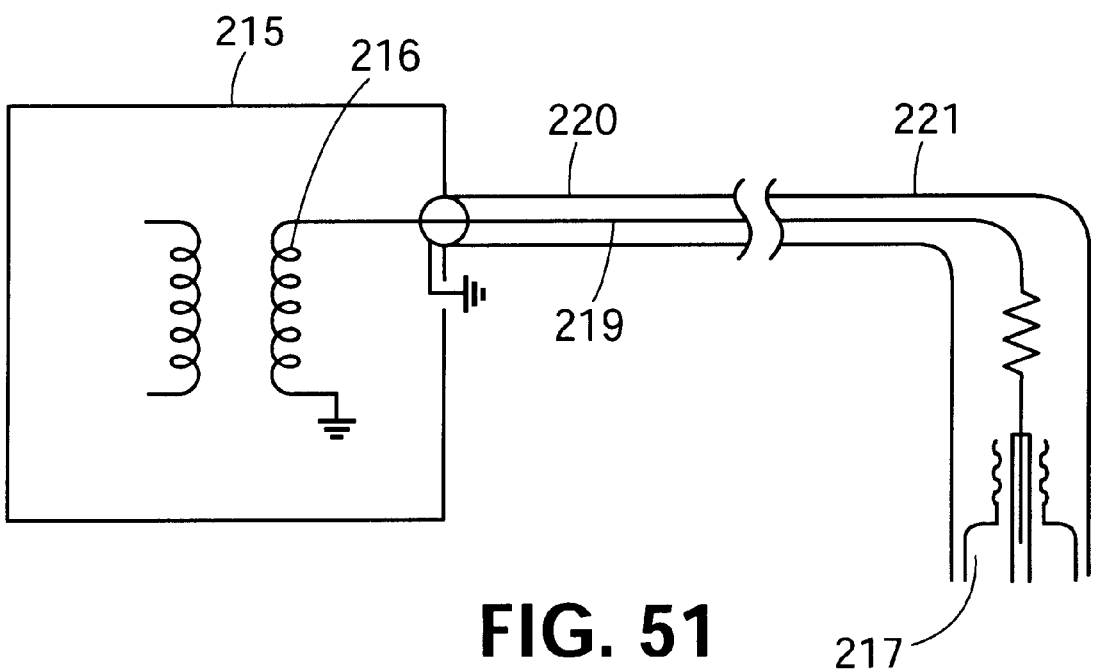
FIG. 51 is a corona discharge device and power supply connected by a coaxial cable with a resistor on the corona discharge device.

A particular concern in vehicular applications of the corona discharge device of the invention is the suppression of electromagnetic interference ("EMI") that may be generated by the corona discharge device, power supply, or high voltage cable required to transmit the power from the supply to the corona discharge device. The use of wire with a distributed resistence is illustrated in FIG. 50, which provides a schematic illustration of a power supply 215, comprising a high voltage transformer 216, connected to the high voltage electrode of a corona discharge device 217, by a resistive wire 218, comprising a high voltage lead 219 and a grounded shield 220. The resistor is about 1 kOhm. An alternate configuration, as shown in FIG. 51, is to use a no resistance wire, i.e., less than one ohm, in series with a one kOhm resistor in line with the high voltage electrode of the corona discharge device 217, creating a low-pass filter having the intrinsic capacitance of the corona discharge device, with a low-pass 3 dB cut-off frequency of $1/(2\pi RC)$. For example, assuming an intrinsic capacitance of 12 pF for the corona discharge device, a resistor of 500 Ohms results in a 3 dB low-pass cut off frequency of 16 MHZ.

The low-pass filter works by suppressing the high frequency content (greater than about 10 MHZ) of the high voltage spikes due to the corona discharge that would normally propagate down the high voltage cable. Care must be taken in choosing the resistor for the low-pass filter. A resistance that is too large can result in a cut-off frequency that is sufficiently low that the spikes themselves are attenuated. This occurs, for example, where the repetition rate of the spikes exceeds the low frequency cutoff. In that case, new spikes form at lower voltages than would normally occur, and, thus, lower the power into the corona.

In addition, too large a resistance results in excessive $I^2R$ losses in the resistor. In particular, the rms current through the resistor is $2\pi fCV_{rms}$, and, thus, the $I^2R$ loss is $(2\pi fCV_{rms})^2 2R$. Therefore, assuming $V_{rms}$ is 7 kV, f is 20 kHz, and C is 12 pF, the power lost in Watts is $$P_{loss}=(10^{-4} \text{ W/Ohm})*R.$$

Therefore for a resistance of 2 kOhm, the loss is only 0.2 W, a small percentage of the total power. However, in a preferred embodiment, for a resistance of 15 kOhm, the loss is 1.5 W, a noticeable percentage of the total corona power. When the resistor is positioned properly on a corona discharge device, a significant reduction in radiated EMI is observed, e.g., EMI improvements were observed for from 100 to 2,500 Ohms.

Figure 52:
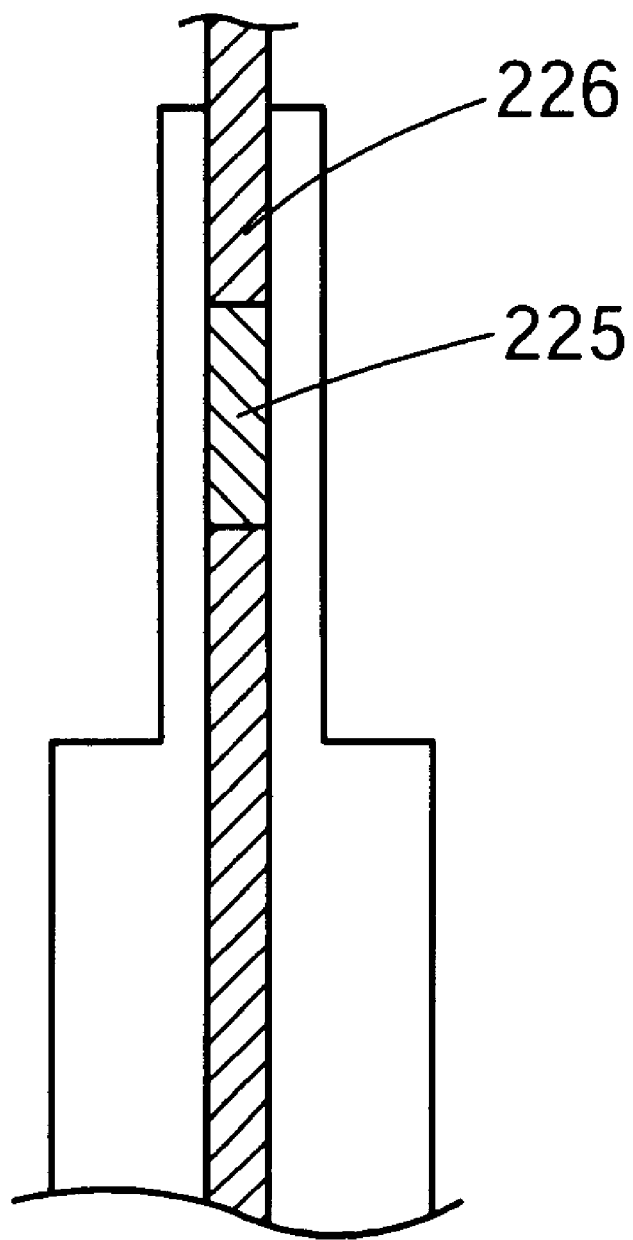
FIG. 52 is a cross-sectional schematic of a corona discharge device with a resistor in the high voltage lead.

The resistor 222 is preferably able to withstand high temperatures, i.e., over 300° C., and maintain good contact with the electrodes. One embodiment, which is similar to the resistor in spark plug arrangement currently used on many models of spark plugs, is illustrated in FIG. 52, where an internal, in-line resistor 225 is integrated into the high voltage electrode 226 of the corona discharge device. The tolerance in the resistor value is not crucial, as changes of plus or minus 30 percent for a baseline resistance of 1.25 kOhm have a minimal impact of both the EMI and the power draw.

It should be noted that the only requirement of the preceding embodiments of the present invention is that free radicals or gaseous reactive species, in particular, hydroxyl radical, are added to the combustion gas stream at a point upstream of the outlet of the catalytic converter, for example, the air intake duct to the carburetor or fuel-injection systems of the combustion chamber, the air/fuel intake manifold to the combustion chamber, the combustion chamber directly or the exhaust manifold of the combustion chamber, the exhaust pipe, or at a point within the catalytic converter..

Moreover, while the present invention has been described with reference to a catalytic converter, it is contemplated that only the high surface area provided by the converter in conjunction with the introduction of radicals would be required to reduce the pollutants in the exhaust gases of a combustion engine.

Although the present invention has been described with particular reference to its preferred embodiments, it should be understood that many variations and modifications will now be obvious to those skilled in that art, and, therefore, the scope of the invention should not be limited by the specific disclosure herein, but only by the appended claims.

What is claimed is:

1. An apparatus for reducing at least one pollutant in a gas stream containing gas formed from the oxidation of fuel, the apparatus comprising:
    a catalyst, having an inlet and an outlet, wherein the catalyst is positioned such that at least a portion of the gas stream passes through the catalyst;
    a corona discharge device for producing a corona discharge in the gas stream, the corona discharge device comprising a first electrode, a second electrode positioned a distance from the first electrode, and a dielectric material positioned between the first electrode and the second electrode; and
    a high frequency power supply having an operational frequency of at least about 1,000 Hz adapted to provide electrical power to the corona discharge device, wherein
    at least a portion of the gas stream is exposed to the corona discharge to produce radicals from gaseous species in the gas stream, and the radicals are introduced into the gas stream at a point upstream of the outlet of the catalyst.

2. The apparatus of claim 1, wherein only a portion of the exhaust gas stream is exposed to the corona discharge.

3. The apparatus of claim 1, wherein the power supply produces from about 10 to about 50 W of average power per corona discharge device during normal operations.

4. The apparatus of claim 1, wherein the power supply produces from about 50 to about 1000 W for a period of up to about 120 seconds after engine startup.

5. The apparatus of claim 1, wherein the gas stream is the exhaust gas stream of an engine having one or more combustion chambers and at least one exhaust port in fluid communication with each combustion chamber for removing exhaust gas from the combustion chambers, and wherein the catalyst is a part of a catalytic converter.

6. The apparatus of claim 5, further comprising at least one flame arrester positioned to prevent flame from propagating in the exhaust pipe.

7. The apparatus of claim 6, wherein at least one flame arrester is positioned downstream of the corona discharge device and upstream of the outlet of the catalytic converter.

8. The apparatus of claim 5, wherein the corona discharge device is positioned such that naturally occurring pressure fluctuations in the exhaust stream provide a pumping action that forces exhaust gas into the corona discharge device, and scavenges gases containing radicals produced in the corona discharge from the corona discharge device.

9. The apparatus of claim 8, further comprising a plenum positioned adjacent to the corona discharge device, such that exhaust gas pass from the exhaust pipe, through the corona discharge, into the plenum, and back into the exhaust pipe.

10. The apparatus of claim 5, wherein the exhaust pipe functions as a distant ground for the corona discharge device.

11. The apparatus according to claim 5, further comprising a device for injecting air into the exhaust stream during fuel rich operating conditions, such that the corona discharge causes the combustion of excess fuel in the exhaust stream.

12. The apparatus of claim 5, further comprising an exhaust pipe attached to the inlet of the catalytic converter, a tailpipe attached to the outlet of the catalytic converter, such that at least a portion of the exhaust stream passes from the exhaust pipe to and through the catalytic converter and through the tailpipe,
    the tailpipe having an exhaust gas takeoff for conveying a portion of the exhaust stream to a remote radical generator, which comprises the corona discharge device, for producing radicals in the exhaust gas in the portion of the exhaust stream conveyed to the remote radical generator, and
    a remote radical generator output for returning the exhaust gas containing radicals from the remote radical generator to the exhaust stream at a point upstream of the outlet of the catalytic converter, where the exhaust gas containing radicals is injected into the exhaust stream.

13. The apparatus of claim 12, further comprising an oxygen sensor positioned between the inlet of the catalytic converter and the point upstream of the outlet of the catalytic converter where the exhaust gas containing radicals is introduced into the exhaust stream.

14. The apparatus of claim 5, wherein the catalytic converter is a three way catalyst.

15. The apparatus of claim 5, wherein a corona discharge is positioned within each combustion chamber of the engine.

16. The apparatus of claim 15, wherein the corona discharge devices are positioned within the combustion chambers adjacent to the exhaust ports.

17. The apparatus of claim 5, wherein the corona discharge device is positioned within at least one of the exhaust ports.

18. The apparatus of claim 5, wherein the engine is a non-stoichiometric engine.

19. The apparatus of claim 18, wherein the engine is a gasoline engine.

20. The apparatus of claim 18, wherein the engine is a lean burn engine.

21. The apparatus of claim 5, further comprising an exhaust pipe attached to the inlet of the catalytic converter, such that at least a portion of the exhaust gas stream passes through the exhaust pipe to and through the catalytic converter, wherein the exhaust pipe comprises a fitting for positioning the corona discharge device in the exhaust stream or a portion thereof, so that a corona discharge is produced in the exhaust stream upstream of the outlet of the catalytic converter.

22. The apparatus of claim 21, further comprising a diverter within the exhaust pipe configured and adapted to divert flow of the gas stream to the corona discharge when the engine is cold.

23. The apparatus of claim 21, further comprising an oxygen sensor positioned between the corona discharge device and the inlet of the catalytic converter.

24. The apparatus of claim 21, wherein corona discharge device is positioned in a shunt attached to the exhaust pipe, such that at least a portion of the exhaust gas stream enters the shunt from the exhaust pipe at a first point, and re-enters the exhaust pipe at a second point upstream of the outlet of the catalytic converter.

25. The apparatus of claim 24, further comprising a diverter within the exhaust pipe configured and adapted to divert flow of the gas stream to the shunt when the engine is cold.

26. The apparatus of claim 25, wherein the diverter diverts the gas stream when the engine is cold.

27. The apparatus of claim 24, wherein the shunt comprises one or more extended surfaces for removing heat from the shunt.

28. The apparatus of claim 1, wherein the corona discharge device comprises generally concentric electrodes, configured and adapted to form the corona discharge in an air gap defined by the electrodes.

29. The apparatus of claim 28, wherein the concentric electrodes comprise an inner electrode having a surface, an outer electrode having an inner surface and an outer surface, and a dielectric material, which forms a layer adjacent to at least one of the surface of the inner electrode or the inner surface of the outer electrode.

30. The apparatus of claim 29, wherein the dielectric material has a dielectric constant in the range of from about 2 to about 10.

31. The apparatus of claim 29, wherein the dielectric forms a layer adjacent to the surface of the inner electrode and forms a layer adjacent to the inner surface of the outer electrode, wherein the dielectric layer adjacent to the surface of the inner electrode and the dielectric layer adjacent to the inner surface of the outer layer define the air gap between the inner and outer electrodes.

32. The apparatus of claim 31, wherein the dielectric layer adjacent to the surface of the inner electrode and the dielectric layer adjacent to the inner surface of the outer layer form a single continuous piece of dielectric material.

33. The apparatus of claim 29, wherein the outer electrode is generally cylindrical, and defines at least one hole to allow the exchange of gas between the air gap and the gas stream.

34. The apparatus of claim 33, wherein the at least one hole is in the form of a slot.

35. The apparatus of claim 34, where in the at least one hole is associated with at least one louver extending from the outer surface of the outer electrode.

36. The apparatus of claim 29, wherein the outer electrode comprises a wire or mesh.

37. The apparatus of claim 36, wherein the outer electrode includes a wire screen or mesh top portion, such that the air gap is totally enclosed by the electrodes and the dielectric, and the wire screen or mesh portion of the outer electrode acts as a flame arrester.

38. The apparatus of claim 1, wherein the power source comprises:
   a DC-DC regulator having an input and an output;
   the input of the DC-DC regulator being adapted to be coupled to an output of a DC voltage source;
   a DC-AC inverter having an input and an output;
   the output of the DC-AC inverter being adapted to be coupled to the corona discharge device.

39. The apparatus of claim 38, wherein the DC-DC regulator is adapted to provide at least about 25 watts to the input of the DC-AC inverter, the DC-AC inverter providing an AC waveform with a frequency of from about 5 to about 100 kHz and a peak-to-peak voltage of from about 12 to about 30 kV, wherein the waveform frequency and voltage depend upon load conditions.

40. The apparatus of claim 38, wherein the DC-AC inverter is adapted to provide an approximately 10 watt output having an AC waveform with a frequency between approximately 5 KHz and 100 KHz and a peak-to-peak voltage of approximately 12–30 KV.

41. The apparatus of claim 38, wherein the power provided by the power source is approximately at least about 5 watts.

42. The apparatus of claim 38, wherein the power source comprises a transformer having a primary winding and a secondary winding, wherein the ratio of the primary to the secondary is approximately between 100 to 1 and 1000 to 1.

43. The apparatus of claim 42, wherein the ratio is approximately between 200 to 1 and 300 to 1.

44. The apparatus of claim 42, wherein the ratio is approximately 200 to 1.

45. The apparatus of claim 38, wherein the power source comprises components that define a natural frequency of operation to provide an output signal substantially without high frequency components.

46. The apparatus of claim 38, wherein the power source comprises a Royer topology.

47. The apparatus of claim 38, wherein the DC-AC inverter provides an AC waveform to the corona discharge device that generates a corona power of from about 5 watts to about 500 watts.

48. A method for the reduction of at least one pollutant in a gas stream containing gas formed from the oxidation of fuel, the method comprising:
   passing the exhaust gas stream through a catalyst having an inlet and an outlet;
   forming radicals in at least a portion of the gas stream using a corona discharge, produced by a corona discharge device, which comprises a first electrode, a second electrode positioned a distance from the first electrode, and a dielectric material positioned between the first electrode and the second electrode;
   providing electrical power to the corona discharge device with a high frequency power supply having an operational frequency of at least about 1,000 Hz; and
   introducing the radicals into the exhaust gas stream upstream of the outlet of the catalyst.

49. The method according to claim 48, further comprising producing the radicals from at least one of water or $O_2$ in the exhaust gas.

50. The method of claim 48, further comprising producing a corona discharge whenever fuel is oxidized.

51. The method of claim 48, further comprising introducing the radicals into the gas stream such that the radicals react with pollutants in at least one of the gas stream upstream of the catalyst or in the catalyst.

52. The method of claim 48, wherein the radicals react with the at least one pollutant within the catalyst.

53. The method of claim 48, further comprising reacting the radicals with at least one pollutant in the gas stream.

54. The method of claim 48, further comprising forming the radicals in only a portion of the gas stream.

55. The method according to claim 48, wherein the radicals are produced from at least one of water or $O_2$ in the gas stream.

56. The method according to claim 48, further comprising reacting the radicals with gaseous species in the exhaust stream to form gaseous reactive species.

57. The method according to claim 56, further comprising forming radicals and gaseous reactive species that comprise at least one of OH, O, H, $HO_2$, $H_2O_2$, $NO_2$, or $O_3$.

58. The method according to claim 48, further comprising forming the radicals in the gas stream at a point upstream of the outlet of the catalyst.

59. The method according to claim 48, further comprising oxidizing the fuel in a combustion chamber of an engine, forming an exhaust gas in the gas stream, and passing the gas stream containing the exhaust gas through an exhaust pipe connected to the inlet of a catalytic converter containing the catalyst.

60. The method according to claim 59, further comprising positioning an oxygen sensor in the exhaust pipe between the catalytic converter and the point upstream of the outlet of the catalyst where the radicals are introduced into the gas stream.

61. The method according to claim 48, further comprising diverting at least a portion of the gas stream, conveying the diverted gas stream to a remote radical generator, forming radicals in the diverted exhaust gas stream using a corona discharge in the radical generator, and injecting the radicals into the gas stream at a point upstream of the outlet of the catalyst.

62. The method according to claim 61, further comprising oxidizing the fuel in a combustion chamber of an engine, forming an exhaust gas in the gas stream, passing the gas stream containing the exhaust gas through an exhaust pipe connected to the inlet of a catalytic converter containing the catalyst, and positioning an oxygen sensor in the exhaust pipe between the catalytic converter and the point upstream of the outlet of the catalyst where the radicals are injected into the exhaust stream in the exhaust pipe.

63. The method according to claim 48, further comprising removing catalytic poisons from surfaces of the catalyst by the reaction of the poisons with at least one of the radicals or gaseous reactive species formed from the reaction of radicals and gases in the gas stream.

64. The method according to claim 63, wherein the catalytic poisons comprise at least one of compounds of sulfur, phosphorus, or carbon.

65. The method according to claim 48, further comprising aiding combustion of fuel or hydrocarbons in the exhaust stream with the corona discharge during cold start or misfire conditions.

66. The method according to claim 65, further comprising injecting a controlled amount of air into the exhaust gas stream during cold start conditions to provide oxygen required for the combustion.

* * * * *